US012134170B2

(12) United States Patent
Kawai

(10) Patent No.: US 12,134,170 B2
(45) Date of Patent: Nov. 5, 2024

(54) IMPACT TOOL

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/302,069

(22) Filed: Apr. 18, 2023

(65) Prior Publication Data

US 2023/0364751 A1 Nov. 16, 2023

(30) Foreign Application Priority Data

May 11, 2022 (JP) ................................. 2022-078030
May 11, 2022 (JP) ................................. 2022-078048

(51) Int. Cl.
*B25B 21/02* (2006.01)

(52) U.S. Cl.
CPC .................................. *B25B 21/026* (2013.01)

(58) Field of Classification Search
CPC .................................................... B25B 21/026
See application file for complete search history.

(56) References Cited

U.S. PATENT DOCUMENTS

| | | | | |
|---|---|---|---|---|
| 3,734,205 A * | 5/1973 | Maurer | B25B 21/026 173/93.5 |
| 6,446,735 B1 * | 9/2002 | Chen | B25B 21/02 173/93.5 |
| 9,636,808 B2 * | 5/2017 | Ho | B25B 21/02 |
| 2008/0099217 A1 * | 5/2008 | Seith | B25B 21/026 173/1 |
| 2015/0041169 A1 * | 2/2015 | Kumagai | B25D 17/26 173/93.7 |
| 2019/0134800 A1 | 5/2019 | Kumagai et al. | |

FOREIGN PATENT DOCUMENTS

JP 2015-33738 A 2/2015

* cited by examiner

*Primary Examiner* — Nathaniel C Chukwurah
(74) *Attorney, Agent, or Firm* — Oliff PLC

(57) ABSTRACT

An impact tool includes a motor, a spindle configured to rotate by a rotational force of the motor, a tool holding shaft at least a part of which is disposed in front of the spindle, a movable anvil movably supported by the tool holding shaft; and a hammer supported by the spindle and striking the movable anvil in a rotation direction without being displaced in an axial direction.

19 Claims, 33 Drawing Sheets

D-D

C-C

D-D

E-E

F-F

G-G

C-C

G-G

C-C

G-G

C-C

G-G

C-C

G-G

X-X

W-W

T-T

S-S

IMPACT TOOL

CROSS-REFERENCE

This application is based upon and claims the benefit of priority from Japanese Patent Applications No. 2022-078030 and No. 2022-078048, both filed on May 11, 2022, the entire contents of all of which are incorporated herein by reference.

TECHNICAL FIELD

The technology disclosed in the present specification relates to an impact tool.

BACKGROUND ART

In a technical field related to impact tools, there is known an impact tool as disclosed in JP 2015-033738 A.

An impact tool is used, for example, for screw fastening operation. When the impact tool unnecessarily vibrates in an axial direction, the screw fastening operation may not be smoothly performed, or an operator may feel uncomfortable.

In addition, in order to improve workability using an impact tool, a technique for suppressing an increase in size of the impact tool is required.

An object of the present disclosure is to suppress occurrence of vibration in an axial direction in an impact tool.

In addition, an object of the present disclosure is to suppress an increase in size of an impact tool.

SUMMARY OF THE INVENTION

In one non-limiting aspect of the present disclosure, an impact tool may include: a motor; a spindle that is rotated by a rotational force of the motor; a tool holding shaft at least a part of which is disposed forward of the spindle; a movable anvil that is movably supported by the tool holding shaft; and a hammer that is supported by the spindle and impacts the movable anvil in a rotation direction without being displaced in an axial direction.

In one non-limiting aspect of the present disclosure, an impact tool may include: a motor; a spindle that includes a spindle shaft and a flange provided at a rear portion of the spindle shaft and that is rotated by a rotational force of the motor; a tool holding shaft at least a part of which is disposed forward of the spindle; a hammer that is supported by the spindle shaft and that impacts the tool holding shaft in a rotation direction; and a cam ring that is coupled to the flange via a ball such that the cam ring is rotatable relative to the flange, and coupled to the hammer such that the cam ring is movable relative to the hammer in an axial direction and is not rotatable relative to the hammer.

DETAILED DESCRIPTION OF THE INVENTION

Figure 1:
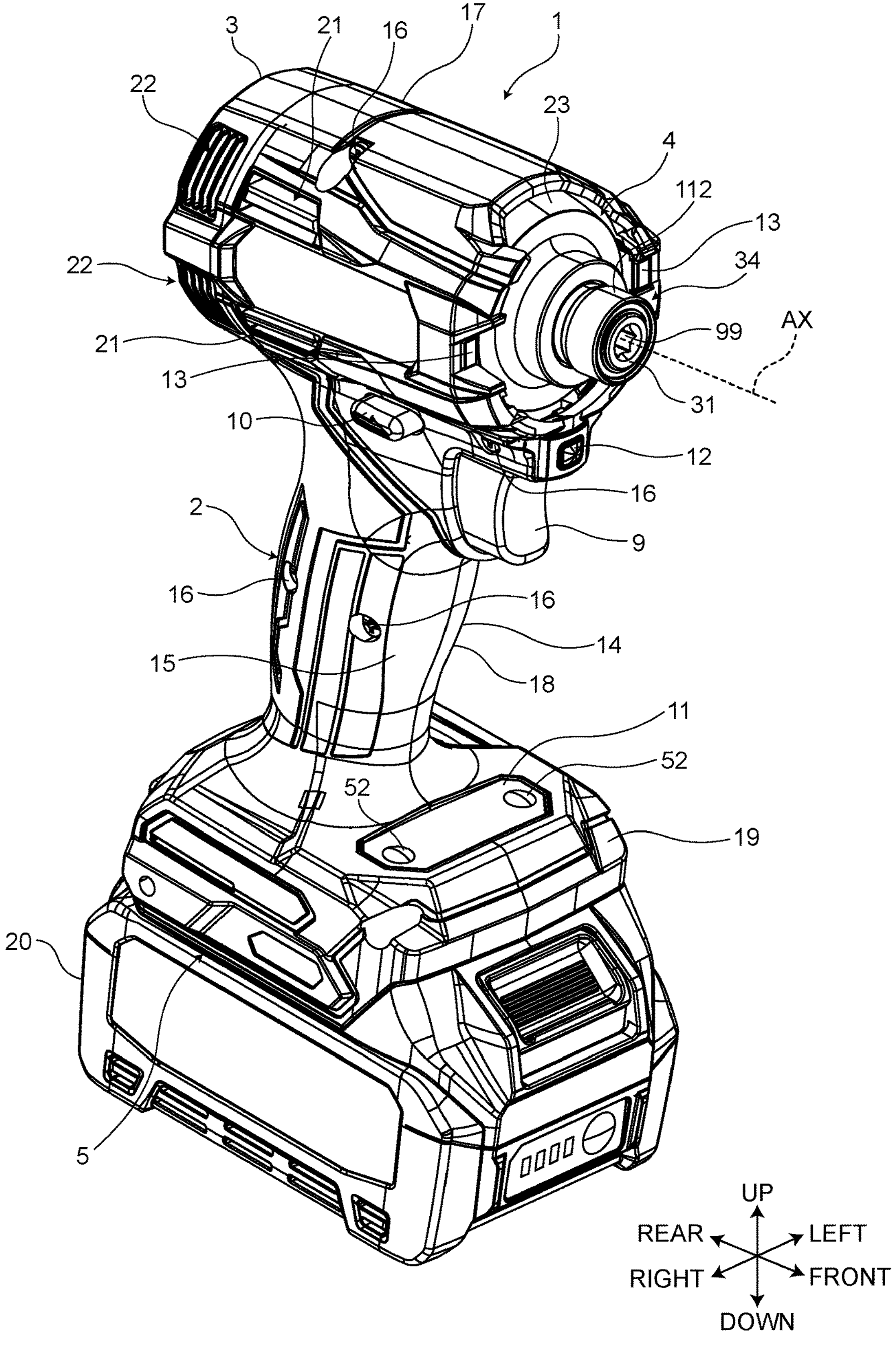
FIG. 1 is an oblique view, viewed from the front, which illustrates an impact tool according to a first embodiment.

In one or more embodiments, an impact tool may include a motor, a spindle that is rotated by a rotational force of the motor, a tool holding shaft at least a part of which is disposed forward of the spindle, a movable anvil that is movably supported by the tool holding shaft, and a hammer that is supported by the spindle and impacts the movable anvil in a rotation direction without being displaced in an axial direction.

According to the above configuration, since the movable anvil movably supported by the tool holding shaft is provided, the hammer can impact the movable anvil in the rotation direction without being displaced in the axial direction. Since the hammer is not displaced in the axial direction, occurrence of vibration in the axial direction is suppressed in the impact tool.

In one or more embodiments, the movable anvil may move only in the radial direction.

According to the above configuration, complication of the structure of the impact tool is suppressed, and the hammer can impact the movable anvil in the rotation direction without being displaced in the axial direction.

In one or more embodiments, the movable anvil may move so as to change between a first state in which at least a part of the movable anvil protrudes radially outward from an outer circumferential surface of the tool holding shaft and a second state in which the movable anvil is positioned radially inside with respect to the outer circumferential surface of the tool holding shaft.

According to the above configuration, the hammer can impact the movable anvil in the rotation direction without being displaced in the axial direction.

In one or more embodiments, the hammer may impact the movable anvil in the first state and rotate around the spindle in the second state.

According to the above configuration, the hammer can impact the movable anvil in the rotation direction without being displaced in the axial direction.

In one or more embodiments, the tool holding shaft may have a recess recessed forward from the rear end surface of the tool holding shaft. The spindle may include a spindle projection protruding radially outward from a front end of an outer circumferential surface of the spindle. The front end of the spindle including the spindle projection may be disposed in the recess, and the movable anvil changes from the second state to the first state when the spindle projection and the movable anvil come into contact with each other in the rotation of the spindle.

According to the above configuration, the movable anvil can move in the radial direction by the rotation of the spindle.

In one or more embodiments, the tool holding shaft may include a tool holder that holds the tool accessory, and an anvil portion disposed rearward of the tool holder. The recess may be formed to be recessed forward from the rear end surface of the anvil portion. The movable anvil may be movably supported on the anvil portion.

According to the above configuration, by the rotation of the spindle, the movable anvil can move in the radial direction in a state of being supported by the anvil portion.

In one or more embodiments, the recess may be defined by an inner circumferential surface of the anvil portion and a facing surface connected to a front end of the inner circumferential surface of the anvil portion.

According to the above configuration, the front end of the spindle is disposed in the recess defined by the inner circumferential surface and the facing surface of the anvil portion.

In one or more embodiments, the anvil portion may include an anvil hole penetrating an outer circumferential surface of the anvil portion and the inner circumferential surface of the anvil portion. The movable anvil may move in the radial direction while being guided by the anvil hole.

According to the above configuration, the movable anvil can smoothly move in the radial direction.

In one or more embodiments, the movable anvil may have a columnar shape. The movable anvil may be disposed in the anvil hole such that a central axis of the movable anvil and a rotation axis of the tool holding shaft are parallel to each other.

According to the above configuration, the spindle can smoothly rotate in a state in which the spindle projection and the movable anvil are in contact with each other.

In one or more embodiments, the impact tool may include a support ball supported at the front end of the spindle. The support ball may be in contact with the facing surface.

According to the above configuration, the spindle and the tool holding shaft can smoothly rotate relative to each other.

In one or more embodiments, a support recess having a hemispherical shape is provided on the front end surface of the spindle, and the support ball may be disposed in the support recess.

According to the above configuration, the support ball is prevented from falling off between the spindle and the tool holding shaft.

In one or more embodiments, the facing surface may be a flat surface.

According to the above configuration, since a contact area between the support ball and the facing surface is reduced, the spindle and the tool holding shaft can smoothly rotate relative to each other.

In one or more embodiments, the impact tool may include a rotation ball disposed between the spindle and the hammer.

According to the above configuration, since the rotation ball functions as a bearing of the hammer, the spindle and the hammer can smoothly rotate relative to each other.

In one or more embodiments, a plurality of the rotation balls may be disposed around a rotation axis of the spindle.

According to the above configuration, the spindle and the hammer can smoothly rotate relative to each other.

In one or more embodiments, the hammer may include: an inner cylindrical portion having a ball groove in which the rotation ball is disposed; a front outer cylindrical portion disposed radially outside with respect to the inner cylindrical portion and disposed forward of the inner cylindrical portion; and a hammer projection protruding radially inward from an inner circumferential surface of the front outer cylindrical portion. The movable anvil may be impacted by the hammer projection.

According to the above configuration, the movable anvil is impacted in the rotation direction by the hammer projection.

In one or more embodiments, the tool holding shaft may include: a tool holder that holds the tool accessory; an anvil portion disposed rearward of the tool holder; a recess recessed forward from a rear end surface of the anvil portion; and an anvil hole which penetrates an outer circumferential surface of the anvil portion and an inner circumferential surface of the anvil portion and in which the movable anvil is disposed. The spindle may include a spindle projection protruding radially outward from a front end of an outer circumferential surface of the spindle. A front end of the spindle including the spindle projection may be disposed in the recess. The movable anvil may change from the second state to the first state while being guided by the anvil hole, when the spindle projection and the movable anvil come into contact with each other in the rotation of the spindle. The hammer may include: an inner cylindrical portion supported by the spindle; a front outer cylindrical portion disposed radially outside with respect to the inner cylindrical portion and disposed forward of the inner cylindrical portion; and a hammer projection protruding radially inward from an inner circumferential surface of the front outer cylindrical portion. The hammer may rotate around the spindle in the first state, and impact the movable anvil with the hammer projection in the second state.

According to the above configuration, the hammer can impact the movable anvil in the rotation direction without being displaced in the axial direction.

In one or more embodiments, in a low load state in which a load applied to the tool holding shaft is low, the spindle projection and the movable anvil may come into contact with each other, the movable anvil and the hammer projection may come into contact with each other, and the tool holding shaft may rotate together with the hammer and the spindle via the movable anvil by a rotational force of the motor.

According to the above configuration, the spindle, the hammer, and the tool holding shaft can rotate together in the low load state of the tool holding shaft.

In one or more embodiments, in a high load state in which a load applied to the tool holding shaft is high, rotation of the spindle may be continued in a state in which rotation of each of the tool holding shaft and the hammer is stopped, the spindle projection may be moved away from the movable anvil, and the movable anvil may move radially inward to release a lock on the hammer set by the movable anvil.

According to the above configuration, the spindle, the hammer, and the tool holding shaft can rotate relative to each other in the high load state of the tool holding shaft. After the spindle, the hammer, and the tool holding shaft rotate relative to each other, the lock on the hammer is released, and the hammer becomes a rotatable state, so that the hammer can impact the movable anvil.

In one or more embodiments, after the lock on the hammer is released, the spindle projection may come into contact with the movable anvil, the movable anvil may move radially outward, and the hammer projection may impact the movable anvil.

According to the above configuration, after the lock on the hammer is released and the hammer is in a state capable of impacting the movable anvil, the movable anvil is impacted by the hammer projection.

In one or more embodiments, two movable anvils may be provided. Two spindle projections may be provided. Two hammer projections may be provided. The hammer projections may impact the movable anvils twice while the spindle rotates once.

According to the above configuration, the hammer projections impact the movable anvils twice while the spindle rotates once.

In one or more embodiments, an impact tool may include: a motor; a spindle that includes a spindle shaft and a flange provided at a rear portion of the spindle shaft and that is rotated by a rotational force of the motor; a tool holding shaft at least a part of which is disposed forward of the spindle; a hammer that is supported by the spindle shaft and that impacts the tool holding shaft in a rotational direction; and a cam ring that is coupled to the flange via a ball so as to be rotatable relative to the flange and coupled to the hammer so as to be movable relative to the hammer in the axial direction but so as not to be rotatable relative to the hammer.

According to the above configuration, the cam ring is coupled to the flange of the spindle via the ball so as to be rotatable relative to the flange. Furthermore, the cam ring is coupled to the hammer so as to be movable relative to the hammer in the axial direction but not to be rotatable relative to the hammer. As a result, the hammer can impact the tool holding shaft in the rotation direction in a state in which an increase in size of the impact tool is suppressed. In particular, an axial length of the impact tool is shortened. When the impact tool has a motor housing, a rear cover disposed at a rear end portion of the motor housing, and an output assembly disposed at a front portion of the motor housing; the axial length of the impact tool refers to a distance in the axial direction between a rear end of the rear cover and a front end of the output assembly.

In one or more embodiments, the impact tool may include a movable anvil that is movably supported by the tool holding shaft. The hammer may impact the movable anvil in the rotation direction without being displaced in the axial direction.

According to the above configuration, since the hammer is not displaced in the axial direction, the axial length is shortened. In addition, since the hammer is not displaced in the axial direction, the occurrence of vibration in the axial direction is suppressed in the impact tool.

In one or more embodiments, the movable anvil may move to change between a first state in which at least a part of the movable anvil protrudes radially outward from an outer circumferential surface of the tool holding shaft and a second state in which the movable anvil is positioned radially inside with respect to the outer circumferential surface of the tool holding shaft. The hammer may impact the movable anvil in the first state and rotate around the spindle shaft in the second state.

According to the above configuration, the hammer can impact the movable anvil in the rotation direction without being displaced in the axial direction.

In one or more embodiments, the ball may be disposed between a spindle groove provided in the flange and a cam groove provided in the cam ring.

According to the above configuration, the ball can move to roll between the spindle groove and the cam groove.

In one or more embodiments, a plurality of spindle grooves may be provided in a circumferential direction. A plurality of cam grooves may be provided in the circumferential direction.

According to the above configuration, the flange and the cam ring can smoothly rotate relative to each other.

In one or more embodiments, each of the spindle groove and the cam groove may have an arc shape. At least a part of the spindle groove may be inclined rearward toward one side in the circumferential direction. At least a part of the cam groove may be inclined rearward toward the one side in the circumferential direction.

According to the above configuration, when the flange and the cam ring rotate relative to each other, the cam ring can move in a front-rear direction.

In one or more embodiments, in the relative rotation of the flange and the cam ring, the ball may move toward an end of the spindle groove on the one side in the circumferential direction, so that the cam ring moves forward.

According to the above configuration, when the flange and the cam ring rotate relative to each other, the cam ring can move forward.

In one or more embodiments, the spindle groove may include a first portion inclined rearward from a central portion of the spindle groove toward the end of the spindle groove on the one side in the circumferential direction, and a second portion inclined rearward from the central portion of the spindle groove toward an end of the spindle groove portion on the other side in the circumferential direction.

According to the above configuration, the cam ring can move forward when moving while rotating in both a forward rotation direction and a reverse rotation direction.

In one or more embodiments, when the flange and the cam ring start relative rotation due to a decrease in rotational speed of the cam ring in a state in which the flange and the cam ring rotate together in the forward rotation direction, the ball may move through the second portion toward an end of the second portion on the other side in the circumferential direction, so that the cam ring may move forward. When the flange and the cam ring start relative rotation due to a decrease in rotational speed of the cam ring in a state in which the flange and the cam ring rotate together in the reverse rotation direction, the ball may move through the first portion toward an end of the first portion on the one side in the circumferential direction, so that the cam ring may move forward.

According to the above configuration, the cam ring can move forward when moving while rotating in both a forward rotation direction and a reverse rotation direction.

In one or more embodiments, the hammer may have a guide portion that guides the cam ring in the axial direction.

According to the above configuration, the cam ring can smoothly move relative to the hammer in the axial direction.

In one or more embodiments, the cam ring may have a cam slide portion protruding radially outward from an outer circumferential surface of the cam ring. The guide portion may include a guide groove which is provided on the inner circumferential surface of the hammer and in which the cam slide portion is disposed.

According to the above configuration, the cam ring can smoothly move relative to the hammer in the axial direction.

In one or more embodiments, the hammer may include: an inner cylindrical portion supported by the spindle; a front outer cylindrical portion disposed radially outside with respect to the inner cylindrical portion and disposed forward of the inner cylindrical portion; and a rear outer cylindrical portion disposed radially outside with respect to the inner cylindrical portion and disposed rearward of the front outer cylindrical portion. The guide groove may be provided to extend in the axial direction on the inner circumferential surface of the rear outer cylindrical portion.

According to the above configuration, the cam ring can smoothly move relative to the hammer in the axial direction.

In one or more embodiments, the guide groove may be provided to extend forward from a rear end portion of the rear outer cylindrical portion.

According to the above configuration, the cam ring can smoothly move relative to the hammer in the axial direction.

In one or more embodiments, a plurality of guide grooves may be provided at intervals around a rotation axis of the hammer.

According to the above configuration, the cam ring can smoothly move relative to the hammer in the axial direction.

In one or more embodiments, a plurality of cam slides may be provided at intervals around a rotation axis of the cam ring. One cam slide may be disposed in one guide groove.

According to the above configuration, the cam ring can smoothly move relative to the hammer in the axial direction.

In one or more embodiments, the impact tool may include: an elastic member disposed between a front surface of the cam ring and a support surface of the hammer disposed forward of the cam ring in the axial direction. The elastic member may generate an elastic force that moves the cam ring rearward.

According to the above configuration, the cam ring can move rearward by the elastic force of the elastic member.

In one or more embodiments, the tool holding shaft may include a tool holder that holds the tool accessary; an anvil portion disposed rearward of the tool holder; a recess recessed forward from a rear end surface of the anvil portion; and an anvil hole which penetrates an outer circumferential surface of the anvil portion and an inner circumferential surface of the anvil portion and in which the movable anvil is disposed. The spindle may include a spindle projection protruding radially outward from a front end portion of an outer circumferential surface of the spindle. A front end of the spindle including the spindle projection may be disposed in the recess. The movable anvil may change from the second state to the first state while being guided by the anvil hole, when the spindle projection and the movable anvil come into contact with each other in the rotation of the spindle. The hammer may include: an inner cylindrical portion supported by the spindle; a front outer cylindrical portion disposed radially outside with respect to the inner cylindrical portion and disposed forward of the inner cylindrical portion; and a hammer projection protruding radially inward from an inner circumferential surface of the front outer cylindrical portion. The hammer may rotate around the spindle in the first state and impact the movable anvil with the hammer projection in the second state.

According to the above configuration, the hammer can impact the movable anvil in the rotation direction without being displaced in the axial direction.

In one or more embodiments, in a low load state in which a load applied to the tool holding shaft is low, the spindle projection and the movable anvil may come into contact with each other, the movable anvil and the hammer projection may come into contact with each other, and the tool holding shaft may rotate together with the hammer and the spindle via the movable anvil by a rotational force of the motor.

According to the above configuration, the spindle, the hammer, and the tool holding shaft can rotate together in the low load state of the tool holding shaft.

In one or more embodiments, in a high load state in which a load applied to the tool holding shaft is high, rotation of the spindle may be continued in a state in which rotation of each of the tool holding shaft, the hammer, and the cam ring is stopped. The cam ring may receive a force from the ball and move forward against the elastic force of the elastic member. The spindle projection may be moved away from the movable anvil, and the movable anvil may move radially inward to release a lock on the hammer set by the movable anvil.

According to the above configuration, the spindle, the hammer, and the tool holding shaft can rotate relative to each other in the high load state of the tool holding shaft. After the spindle, the hammer, and the tool holding shaft rotate relative to each other, the lock on the hammer is released, and the hammer becomes a rotatable state, so that the hammer can impact the movable anvil.

In one or more embodiments, after the lock on the hammer is released, the spindle projection may contact the movable anvil to move the movable anvil radially outward. The cam ring may rotate while moving rearward by the elastic force of the elastic member. The hammer may rotate by the rotation of the cam ring to impact the movable anvil in the rotation direction by the hammer projection.

According to the above configuration, after the lock on the hammer is released and the hammer is in a state capable of impacting the movable anvil, the movable anvil is impacted by the hammer projection.

Hereinafter, embodiments will be described with reference to the drawings. Components of the embodiments described below can be appropriately combined. In addition, some components may not be used.

In the embodiments, the positional relationships among parts will be described using the terms "left", "right", "front", "rear", "up", and "down". These terms indicate the relative positions or directions, using the center of the impact tool as a reference. The impact tool includes a motor 6 as a power supply.

In the embodiment, a direction parallel to a rotation axis AX of the motor 6 is appropriately referred to as an axial direction. A direction around the rotation axis AX is appropriately referred to as a circumferential direction or a rotation direction. A radiation direction of the rotation axis AX is appropriately referred to as a radial direction.

A direction away from or a position far from the center of the impact tool toward a defined direction in the axial direction is appropriately referred to as one side in the axial direction, and a side opposite to the one side in the axial direction is appropriately referred to as the other side in the axial direction. A direction defined in the circumferential direction is appropriately referred to as one side in the circumferential direction, and a side opposite to the one side in the circumferential direction is appropriately referred to as the other side in the circumferential direction. A direction away from or a position far from the rotation axis AX in the radial direction is appropriately referred to as a radial outside. A side opposite to the radial outside is appropriately referred to as a radial inside.

In the embodiment, the axial direction coincides with the front-rear direction. The one side in the axial direction may be regarded as a front side. The other side in the axial direction may be regarded as a rear side.

First Embodiment

A first embodiment will be described.

Outline of Impact Tool

Figure 2:
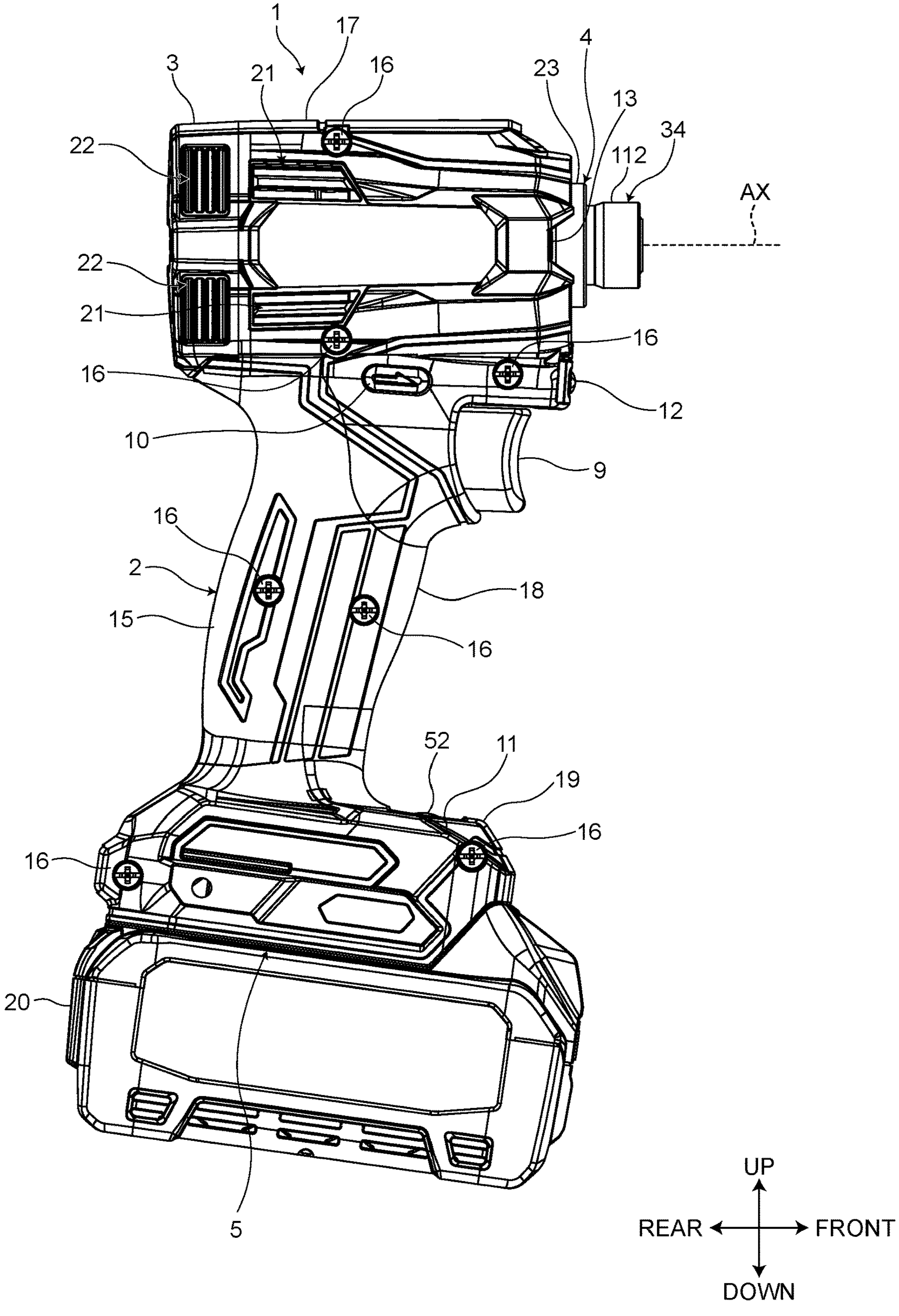
FIG. 2 is a side view illustrating the impact tool according to the first embodiment.
Figure 3:
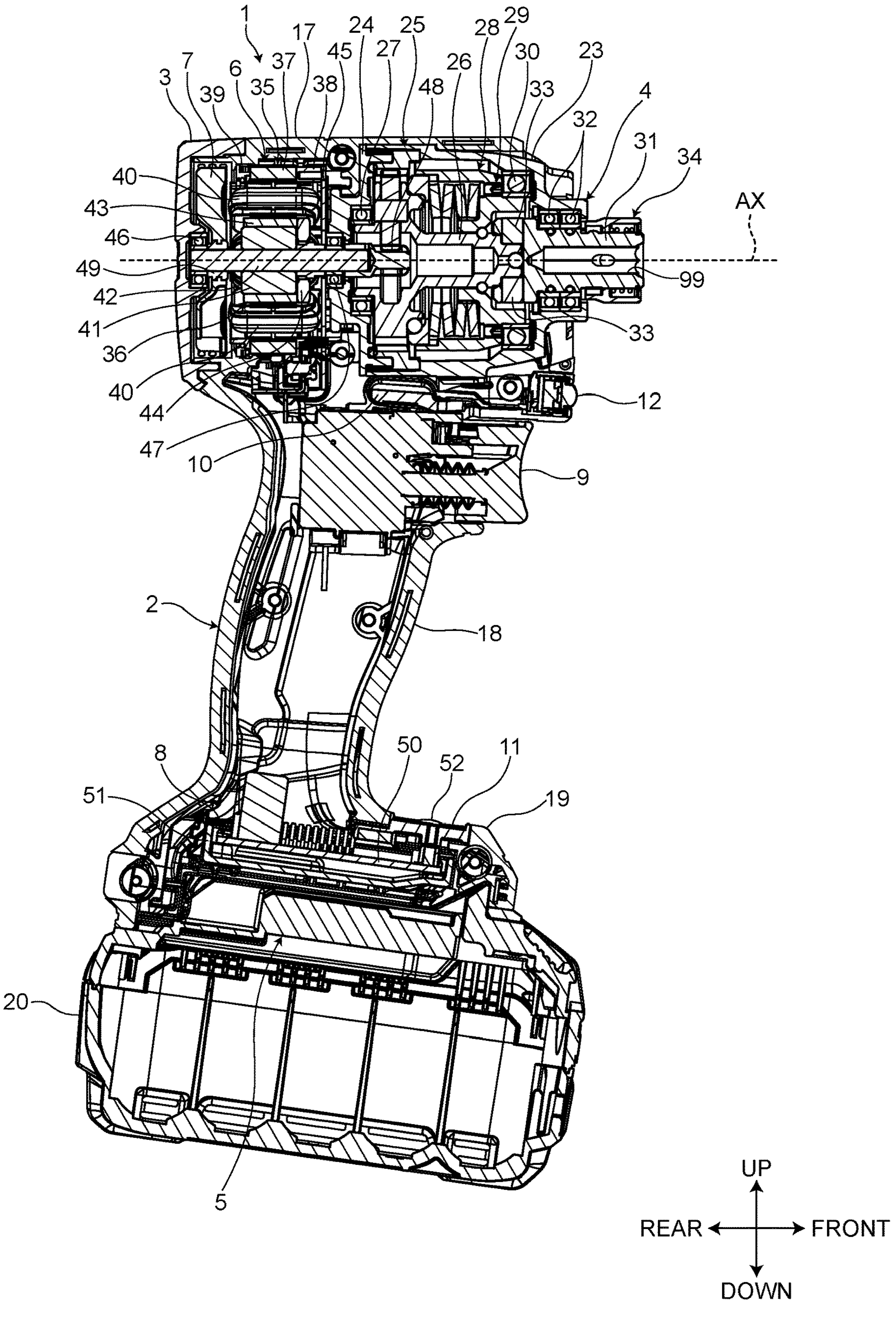
FIG. 3 is a cross-sectional view illustrating the impact tool according to the first embodiment.

FIG. 1 is an oblique view, viewed from the front, which illustrates an impact tool 1 according to the embodiment. FIG. 2 is a side view illustrating the impact tool 1 according to the embodiment. FIG. 3 is a cross-sectional view illustrating the impact tool 1 according to the embodiment.

In the embodiment, the impact tool 1 is an impact driver, which is a type of screw fastening tool. The impact tool 1 includes a housing 2, a rear cover 3, an output assembly 4, a battery mounting unit 5, a motor 6, a fan 7, a controller 8, a trigger lever 9, a forward/reverse rotation switching lever 10, an interface unit 11, a mode switching switch 12, and a light 13.

The housing 2 houses at least some of the components of the impact tool 1. The housing 2 is made of synthetic resin. In the embodiment, the housing 2 is made of nylon. The housing 2 includes a pair of half-split housings. The housing 2 includes a left housing 14 and a right housing 15 disposed to the right of the left housing 14. The left housing 14 and the right housing 15 are fixed by a plurality of housing screws 16.

The housing 2 includes a motor housing 17, a grip 18, and a battery holder 19.

The motor housing 17 houses the motor 6. The motor housing 17 houses at least a part of the output assembly 4. The motor housing 17 has a tubular shape.

An operator grips the grip 18. The grip 18 extends downward from the motor housing 17.

The battery holder 19 holds a battery pack 20 via the battery mounting unit 5. The battery holder 19 houses the controller 8. The battery holder 19 is connected to a lower end of the grip 18.

The rear cover 3 covers an opening at a rear end of the motor housing 17. The rear cover 3 is disposed rearward of the motor housing 17. The rear cover 3 is made of synthetic resin. The rear cover 3 is fixed to the rear end of the motor housing 17 by two screws. The rear cover 3 houses at least a part of the fan 7.

The motor housing 17 has air-intake ports 21. The rear cover 3 has an air-exhaust ports 22. Air from outside of the housing 2 flows into the internal space of the housing 2 via the air-intake ports 21. Air from the internal space of the housing 2 flows out to the outside of the housing 2 via the air-exhaust ports 22.

The output assembly 4 is disposed forward of the motor 6. The output assembly 4 includes a hammer case 23, a bearing box 24, a speed reduction mechanism 25, a spindle 26, a spindle bearing 27, an impact mechanism 28, an elastic force adjusting mechanism 29, a hammer bearing 30, a tool holding shaft 31, shaft bearings 32, movable anvils 33, and a tool holding mechanism 34.

The hammer case 23 is made of metal. In the embodiment, the hammer case 23 is made of aluminum. At least a part of the hammer case 23 is disposed forward of the motor housing 17. The hammer case 23 has a tubular shape. The bearing box 24 is fixed to a rear end of the hammer case 23. The bearing box 24 and a rear portion of the hammer case 23 are disposed inside the motor housing 17. The bearing box 24 and the rear portion of the hammer case 23 are sandwiched between the left housing 14 and the right housing 15. Each of the bearing box 24 and the hammer case 23 is fixed to the motor housing 17.

The speed reduction mechanism 25, the spindle 26, the impact mechanism 28, the movable anvils 33, the spindle bearing 27, the hammer bearing 30, and the shaft bearings 32 are disposed in the internal space of the output assembly 4 defined by the hammer case 23 and the bearing box 24. At least a part of the tool holding shaft 31 is disposed in the internal space of the output assembly 4.

The battery pack 20 is mounted on the battery mounting unit 5. The battery mounting unit 5 is disposed below the battery holder 19. The battery pack 20 is detachable from the battery mounting unit 5. The battery pack 20 functions as a power source of the impact tool 1. The battery pack 20 is mounted on the battery mounting unit 5 by being inserted into the battery mounting unit 5 from the front of the battery holder 19. The battery pack 20 is detached from the battery mounting unit 5 by being removed forward from the battery mounting unit 5. The battery pack 20 includes one or more secondary batteries. In the embodiment, the battery pack 20 includes one or more rechargeable lithium-ion batteries. The battery pack 20 can supply power to the impact tool 1 by being mounted on the battery mounting unit 5. The motor 6 is driven based on the electric power (current) supplied from the battery pack 20. Each of the controller 8 and the interface unit 11 operates based on the power supplied from the battery pack 20.

The motor 6 is a power supply of the impact tool 1. The motor 6 is an electric motor that is driven based on power supplied from the battery pack 20. The motor 6 is an inner-rotor-type brushless motor. The motor 6 includes a stator 35 and a rotor 36. The motor housing 17 supports the stator 35. At least a part of the rotor 36 is disposed inside the stator 35. The rotor 36 rotates with respect to the stator 35. The rotor 36 rotates about a rotation axis AX extending in the front-rear direction.

The stator 35 includes a stator core 37, a front insulator 38, a rear insulator 39, and coils 40.

The stator core 37 is disposed radially outside with respect to the rotor 36. The stator core 37 includes a plurality of laminated steel plates. The steel plates are plates made of a metal containing iron as a main component. The stator core 37 has a cylindrical shape. The stator core 37 includes teeth that respectively support the coils 40.

The front insulator 38 is fixed to the front portion of the stator core 37. The rear insulator 39 is fixed to the rear portion of the stator core 37. Each of the front insulator 38 and the rear insulator 39 is an electrically insulating member made of a synthetic resin. The front insulator 38 is disposed so as to cover some of the teeth surfaces. The rear insulator 39 is disposed so as to cover some of the teeth surfaces.

The coils 40 are mounted on the stator core 37 via the front insulator 38 and the rear insulator 39. The coils 40 are disposed around the teeth of the stator core 37 via the front insulator 38 and the rear insulator 39. The coils 40 and the stator core 37 are electrically insulated from one another by the front insulator 38 and the rear insulator 39. The coils 40 are electrically connected via a short-circuit member.

The rotor 36 rotates about the rotation axis AX. The rotor 36 includes a rotor core 41, a rotor shaft 42, at least one rotor magnet 43, and at least one sensor magnet 44.

Each of the rotor core 41 and the rotor shaft 42 is made of steel. The rotor shaft 42 is fixed to the rotor core 41. The rotor core 41 has a cylindrical shape. The rotor shaft 42 is disposed radially inside with respect to the rotor core 41. A front portion of the rotor shaft 42 protrudes forward from a front end surface of the rotor core 41. A rear portion of the rotor shaft 42 protrudes rearward from a rear end surface of the rotor core 41.

The rotor magnet 43 is fixed to the rotor core 41. The rotor magnet 43 has a cylindrical shape. The rotor magnet 43 is disposed around the rotor core 41.

The sensor magnet 44 is fixed to the rotor core 41. The sensor magnet 44 has a circular ring shape. The sensor magnet 44 is disposed on the front end surface of the rotor core 41 and the front end surface of the rotor magnet 43.

A sensor substrate 45 is attached to the front insulator 38. The sensor substrate 45 is fixed to the front insulator 38 with at least one screw. The sensor substrate 45 includes a circular circuit board and a magnetic sensor supported by the circuit board. At least a part of the sensor substrate 45 faces the sensor magnet 44. The magnetic sensor detects a position of the rotor 36 in a rotation direction by detecting a position of the sensor magnet 44.

The rear portion of the rotor shaft 42 is rotatably supported by a rotor bearing 46. The front portion of the rotor shaft 42 is rotatably supported by a rotor bearing 47. The rotor bearing 46 is held by the rear cover 3. The rotor bearing 46 is held by the bearing box 24 holds. A front end of the rotor shaft 42 is disposed in the internal space of the output assembly 4 through an opening of the bearing box 24.

A pinion gear 48 is fixed to the front end of the rotor shaft 42. The pinion gear 48 is coupled to at least a part of the speed reduction mechanism 25. The rotor shaft 42 is coupled to the speed reduction mechanism 25 via the pinion gear 48.

The fan 7 generates an air flow for cooling the motor 6. The fan 7 is disposed rearward of the motor 6. The fan 7 is disposed between the rotor bearing 46 and the stator 35. The fan 7 is fixed to at least a part of the rotor 36. The fan 7 is fixed to the rear portion of the rotor shaft 42 via a bush 49. The fan rotates when the rotor 36 rotates. When the rotor shaft 42 rotates, the fan 7 rotates together with the rotor shaft 42. When the fan 7 rotates, air from outside of the housing 2 flows into the internal space of the housing 2 through the air-intake ports 21. The air that has flowed into the internal space of the housing 2 flows through the internal space of the housing 2, thereby cooling the motor 6. The air that has flowed through the internal space of the housing 2 flows out to the outside of the housing 2 via the air-exhaust ports 22 while the fan 7 is rotating.

The controller 8 outputs control signals, which control the motor 6. The battery holder 19 houses the controller 8. The controller 8 changes the control mode of the motor 6 based on the work contents required to be performed by the impact tool 1. The control mode of the motor 6 refers to a control method or a control pattern of the motor 6. The controller 8 includes a circuit board 50 and a case 51. A plurality of electronic components are mounted on the circuit board 50. The case 51 houses the circuit board 50. Examples of the electronic components mounted on the circuit board 50 include: a processor such as a central processing unit (CPU); a nonvolatile memory such as a read only memory (ROM) and a storage; a volatile memory such as a random access memory (RAM); transistors, and resistors.

The trigger lever 9 is operated by an operator to start the motor 6. The trigger lever 9 is provided on the grip 18. The trigger lever 9 protrudes forward from an upper portion of a front portion of the grip 18. Driving and stopping of the motor 6 are switched by operating the trigger lever 9.

The forward/reverse rotation switching lever 10 is operated by an operator for switching the rotation direction of the motor 6. The forward/reverse rotation switching lever 10 is provided at an upper portion of the grip 18. In response to the operation of the forward/reverse rotation switching lever 10, the rotation direction of the motor 6 is changed from one of a forward-rotational direction and a reverse-rotation direction to the other. When the rotation direction of the motor 6, the rotation direction of the spindle 26 is changed. When the forward/reverse rotation switching lever 10 is disposed at a neutral position, the trigger lever 9 cannot be operated.

The interface unit 11 includes a plurality of operation buttons 52 operated by an operator. The interface unit 11 is provided in the battery holder 19. The interface unit 11 is provided, forward of the grip 18, on an upper surface of the battery holder 19. An operation mode of the motor 6 is changed in response to the operation of the operation buttons 52 by an operator.

The mode switching switch 12 is operated by an operator for changing the control mode of the motor 6. The mode switching switch 12 is disposed above the trigger lever 9.

The light 13 emits illumination light. The light 13 illuminates the surroundings of the tool holding shaft 31 and the front of the tool holding shaft 31 with the illumination light.

Output Assembly

Figure 4:
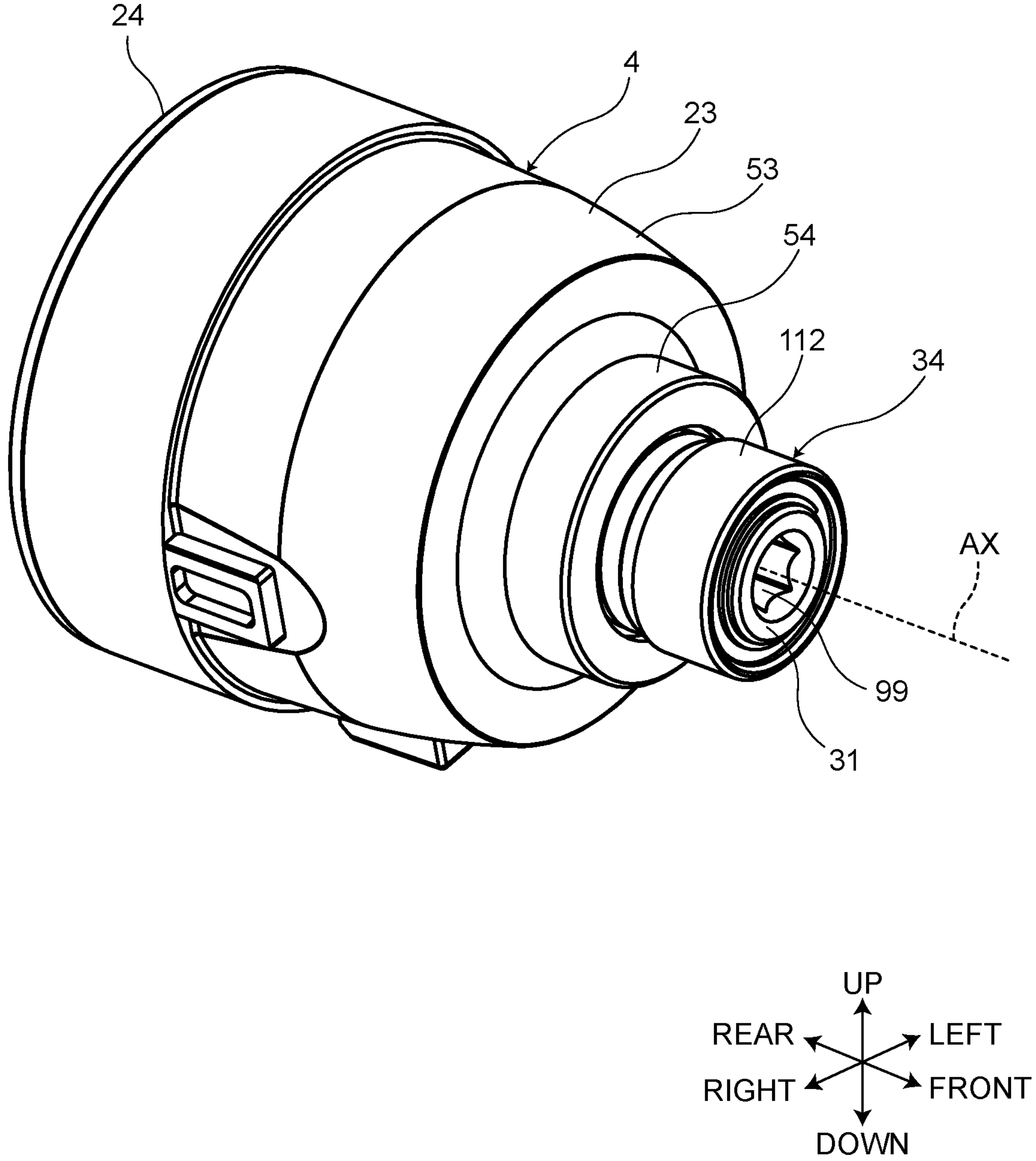
FIG. 4 is an oblique view, viewed from the front, which illustrates an output assembly according to the first embodiment.
Figure 5:
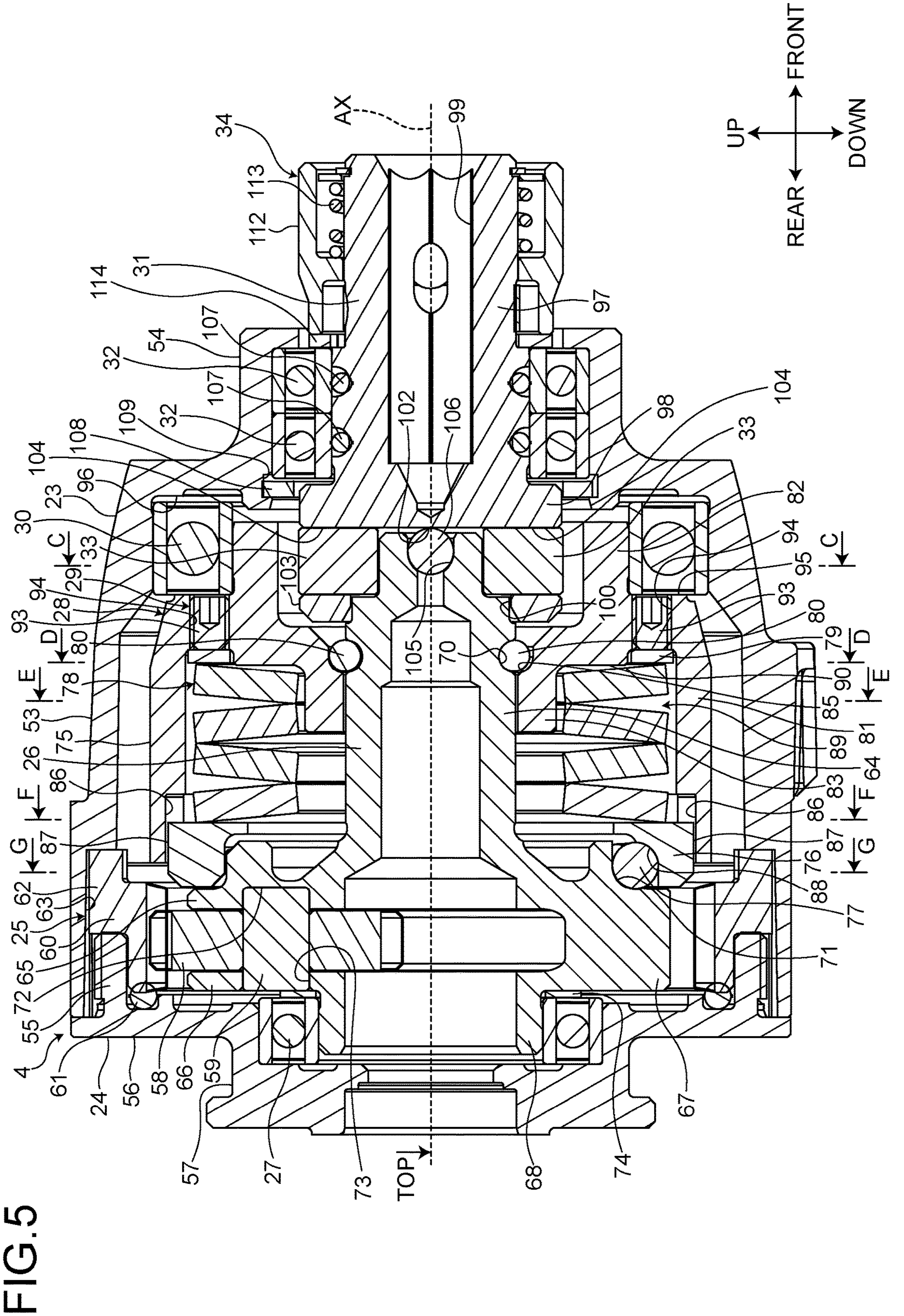
FIG. 5 is a longitudinal sectional view illustrating the output assembly according to the first embodiment.
Figure 6:
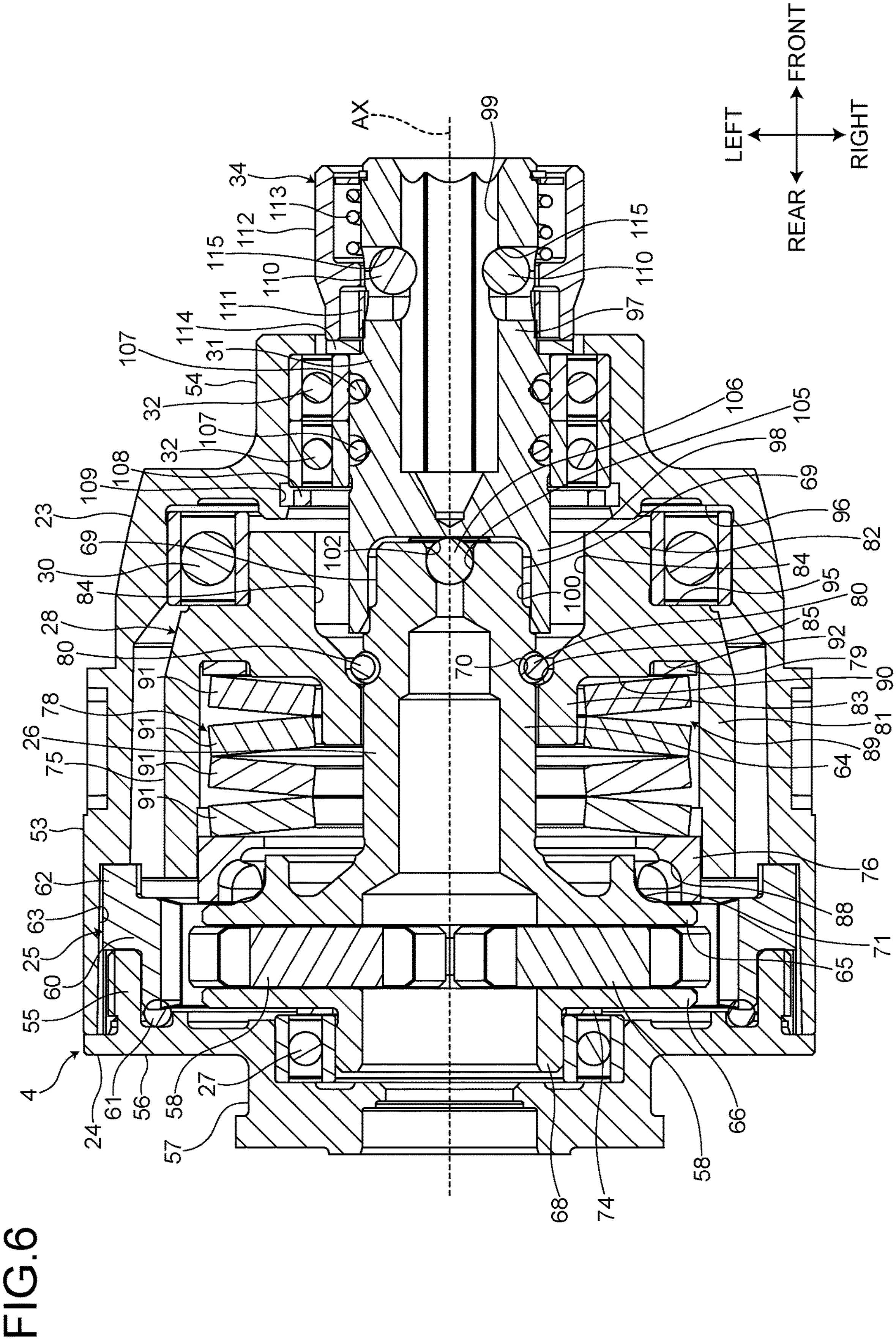
FIG. 6 is a transverse sectional view illustrating the output assembly according to the first embodiment.
Figure 7:
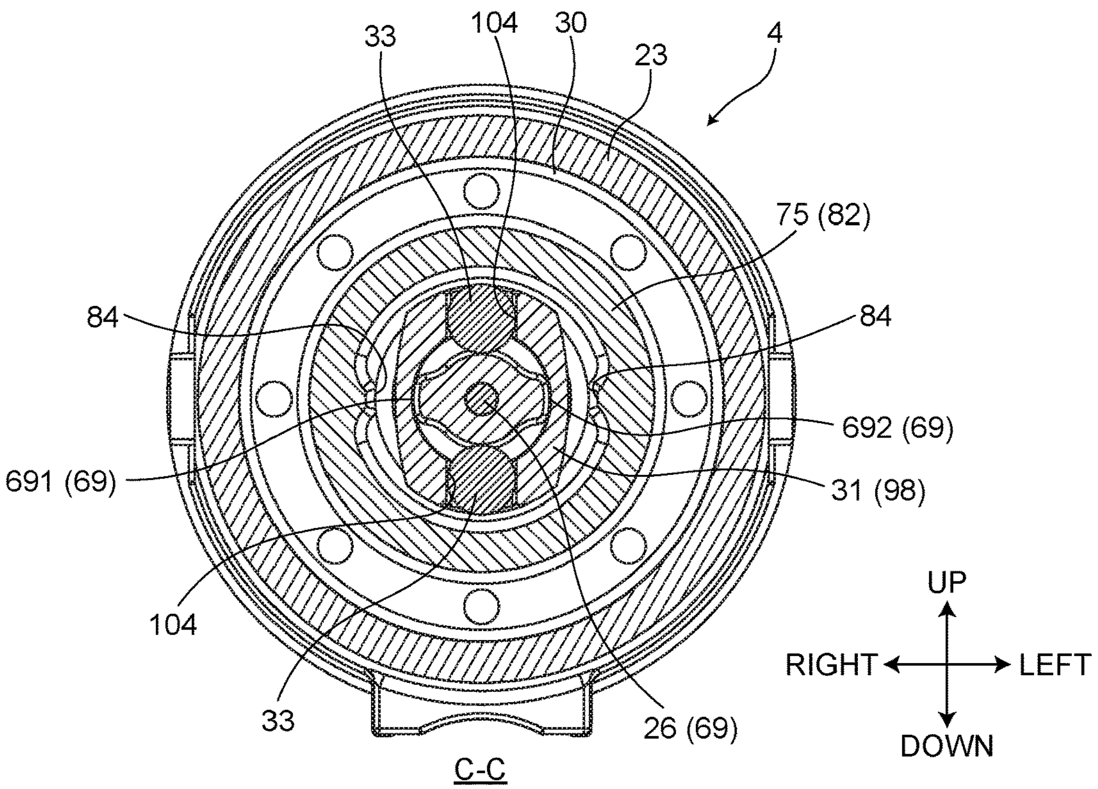
FIG. 7 is a cross-sectional view illustrating the output assembly according to the first embodiment.
Figure 8:
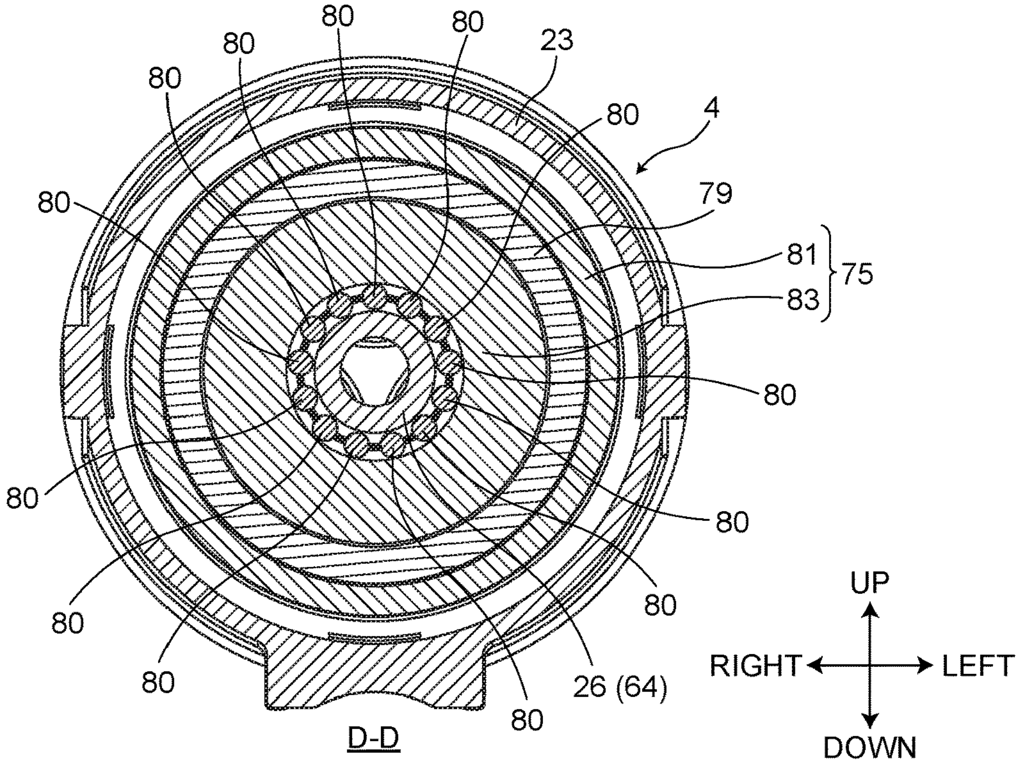
FIG. 8 is a cross-sectional view illustrating the output assembly according to the first embodiment.
Figure 9:
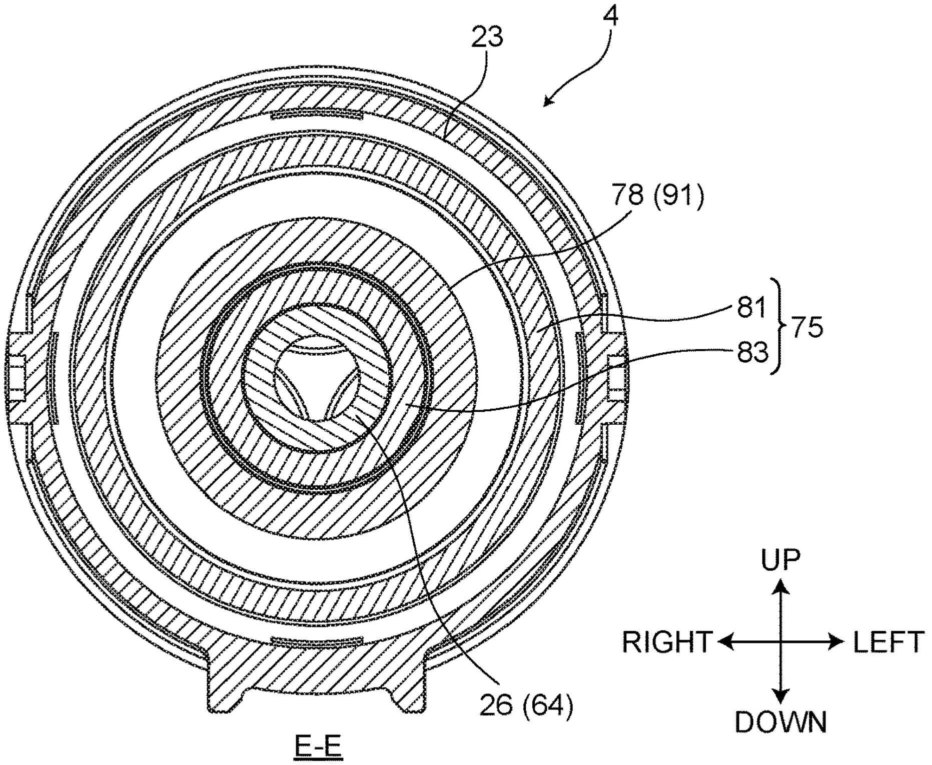
FIG. 9 is a cross-sectional view illustrating the output assembly according to the first embodiment.
Figure 10:
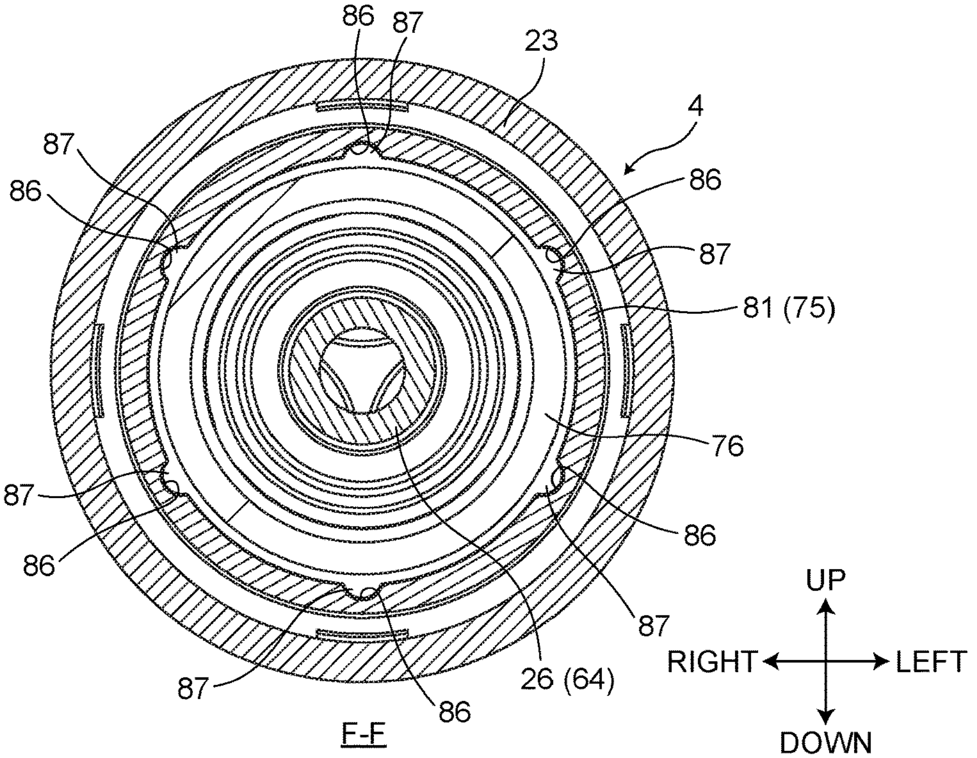
FIG. 10 is a cross-sectional view illustrating the output assembly according to the first embodiment.
Figure 11:
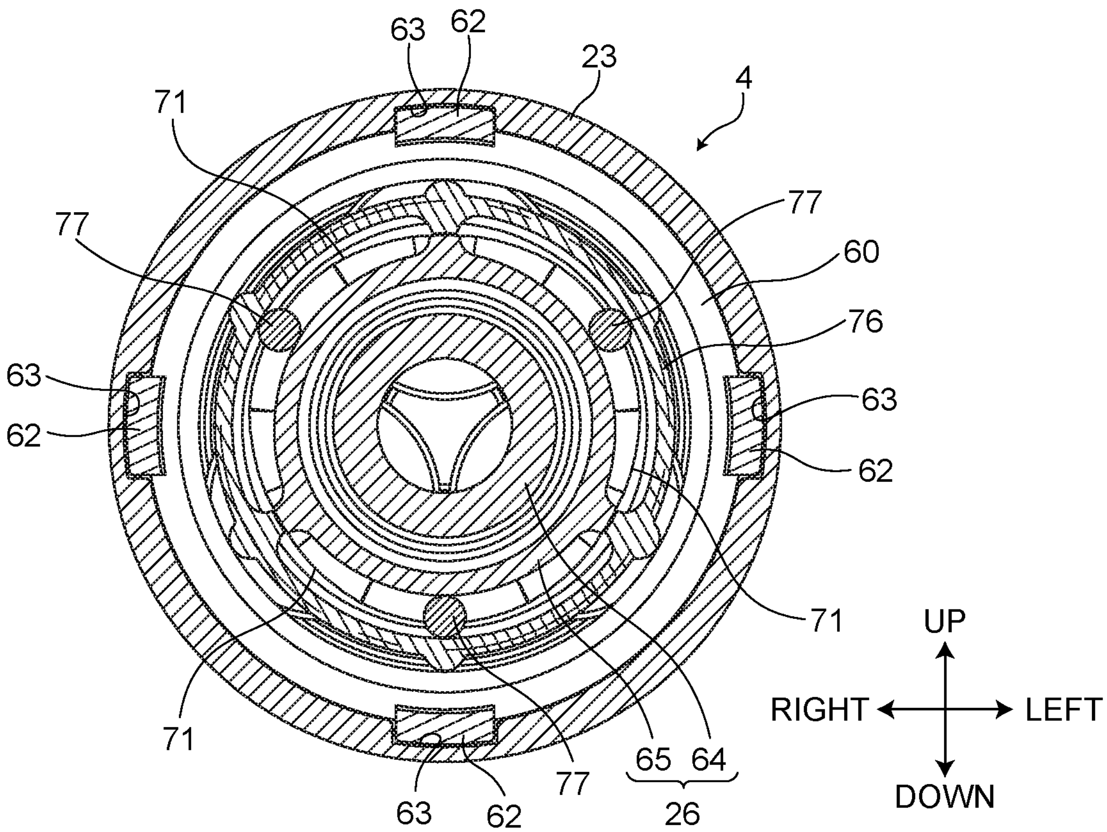
FIG. 11 is a cross-sectional view illustrating the output assembly according to the first embodiment.
Figure 12:
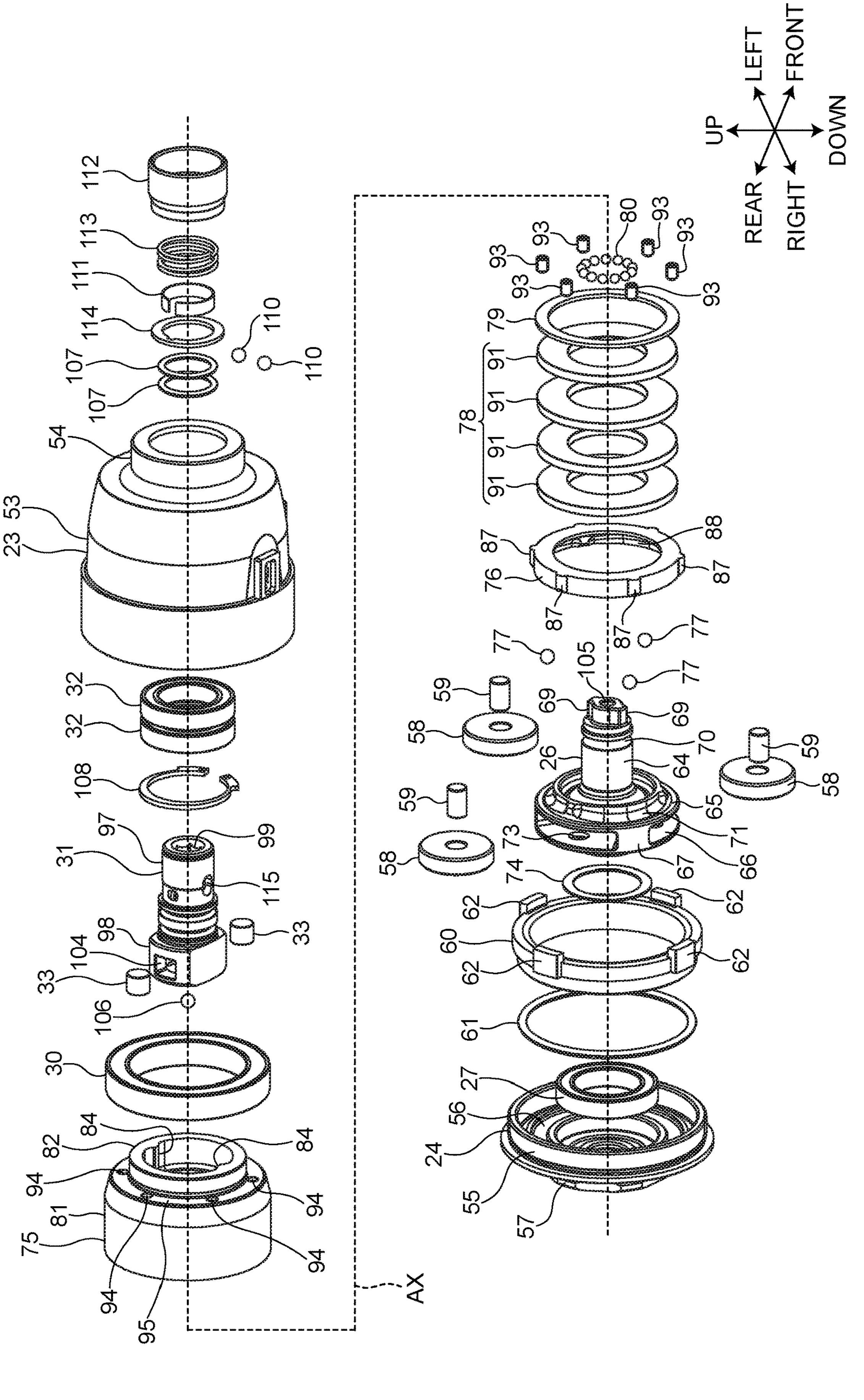
FIG. 12 is an exploded oblique view illustrating the output assembly according to the first embodiment.

FIG. 4 is an oblique view, viewed from the front, which illustrates the output assembly 4 according to the embodiment. FIG. 5 is a longitudinal sectional view illustrating the output assembly 4 according to the embodiment. FIG. 6 is a transverse sectional view illustrating the output assembly 4 according to the embodiment. FIG. 7 is a cross-sectional view illustrating the output assembly 4 according to the embodiment, and is a cross-sectional arrow view taken along line C-C in FIG. 5. FIG. 8 is a cross-sectional view illustrating the output assembly 4 according to the embodiment, and is a cross-sectional arrow view taken along line D-D in FIG. 5. FIG. 9 is a cross-sectional view illustrating the output assembly 4 according to the embodiment, and is a cross-sectional arrow view taken along line E-E in FIG. 5. FIG. 10 is a cross-sectional view illustrating the output assembly 4 according to the embodiment, and is a cross-sectional arrow view taken along line F-F in FIG. 5. FIG. 11 is a cross-sectional view illustrating the output assembly 4 according to the embodiment, and is a cross-sectional arrow view taken along line G-G in FIG. 5. FIG. 12 is an exploded perspective view illustrating the output assembly 4 according to the embodiment.

The output assembly 4 includes the hammer case 23, the bearing box 24, the speed reduction mechanism 25, the spindle 26, the spindle bearing 27, the impact mechanism 28, the elastic force adjusting mechanism 29, the hammer bearing 30, the tool holding shaft 31, the shaft bearings 32, the movable anvil 33*s*, and the tool holding mechanism 34.

Each of the rotor 36, the spindle 26, and the tool holding shaft 31 rotates about the rotation axis AX. The rotation axis of the rotor 36, the rotation axis of the spindle 26, and the rotation axis of the tool holding shaft 31 coincide with one another. Each of the spindle 26 and the tool holding shaft 31 is rotated by rotational force generated by the motor 6.

Hammer Case

The hammer case 23 includes a large cylindrical portion 53 and a small cylindrical portion 54. Each of the large cylindrical portion 53 and the small cylindrical portion 54 is disposed so as to surround the rotation axis AX. The small cylindrical portion 54 is disposed forward of the large cylindrical portion 53. The large cylindrical portion 53 has an inner diameter larger than that of the small cylindrical portion 54. The large cylindrical portion 53 has an outer diameter larger than that of the small cylindrical portion 54.

The bearing box 24 is fixed to a rear end of the hammer case 23. The bearing box 24 includes a ring 55, a rear plate 56, and a protrusion 57. The ring 55 is disposed so as to surround the rotation axis AX. The ring 55 is inserted into a rear end of the large cylindrical portion 53. The rear plate 56 is connected to a rear end of the ring 55. An opening is provided in a central portion of the rear plate 56. The protrusion 57 is provided on the rear surface of the rear plate 56. The protrusion 57 protrudes rearward from the rear surface of the rear plate 56. The protrusion 57 is disposed so as to surround the opening of the rear plate 56. Each of the rear plate 56 and the protrusion 57 is connected to the motor housing 17.

Speed Reduction Mechanism

The speed reduction mechanism 25 couples the rotor shaft 42 and the spindle 26. The speed reduction mechanism 25 transmits rotation of the rotor 36 to the spindle 26. The speed reduction mechanism 25 causes the spindle 26 to rotate at a rotational speed that is lower than a rotational speed of the rotor shaft 42. The speed reduction mechanism 25 includes a planetary gear mechanism.

The speed reduction mechanism 25 includes a plurality of planetary gears 58, pins 59, and an internal gear 60. The plurality of planetary gears 58 are disposed around the pinion gear 48. The pins 59 respectively support the planetary gears 58. The internal gear 60 is disposed around the plurality of planetary gears 58. Each of the planetary gears 58 meshes with the pinion gear 48. The planetary gears 58 are rotatably supported on the spindle 26 via the pins 59. The spindle 26 is rotated by the planetary gears 58. The internal gear 60 has internal teeth, which mesh with the planetary gears 58.

The internal gear 60 is fixed to each of the hammer case 23 and the bearing box 24. An O-ring 61 is disposed at a boundary between a rear end of the internal gear 60 and the bearing box 24. Protrusions 62 are provided on the outer surface of the internal gear 60. The protrusions 62 each protrude radially outward from the outer circumferential surface of the internal gear 60. The protrusions 62 are provided at intervals in the circumferential direction. The protrusions 62 are disposed in recesses 63 of the hammer case 23. Relative rotation of the hammer case 23 and the internal gear 60 is suppressed by disposing the protrusions 62 in the recesses 63. The internal gear 60 always cannot rotate with respect to the hammer case 23.

When the rotor shaft 42 rotates in response to the driving of the motor 6, the pinion gear 48 rotates, the planetary gears 58 to revolve around the pinion gear 48. The planetary gears 58 revolve while meshing with the internal teeth of the internal gear 60. Owing to the revolving of the planetary gears 58, the spindle 26, which is connected to the planetary gears 58 via the pins 59, rotates at a rotation speed that is lower than a rotation speed of the rotor shaft 42.

Spindle

Figure 13:
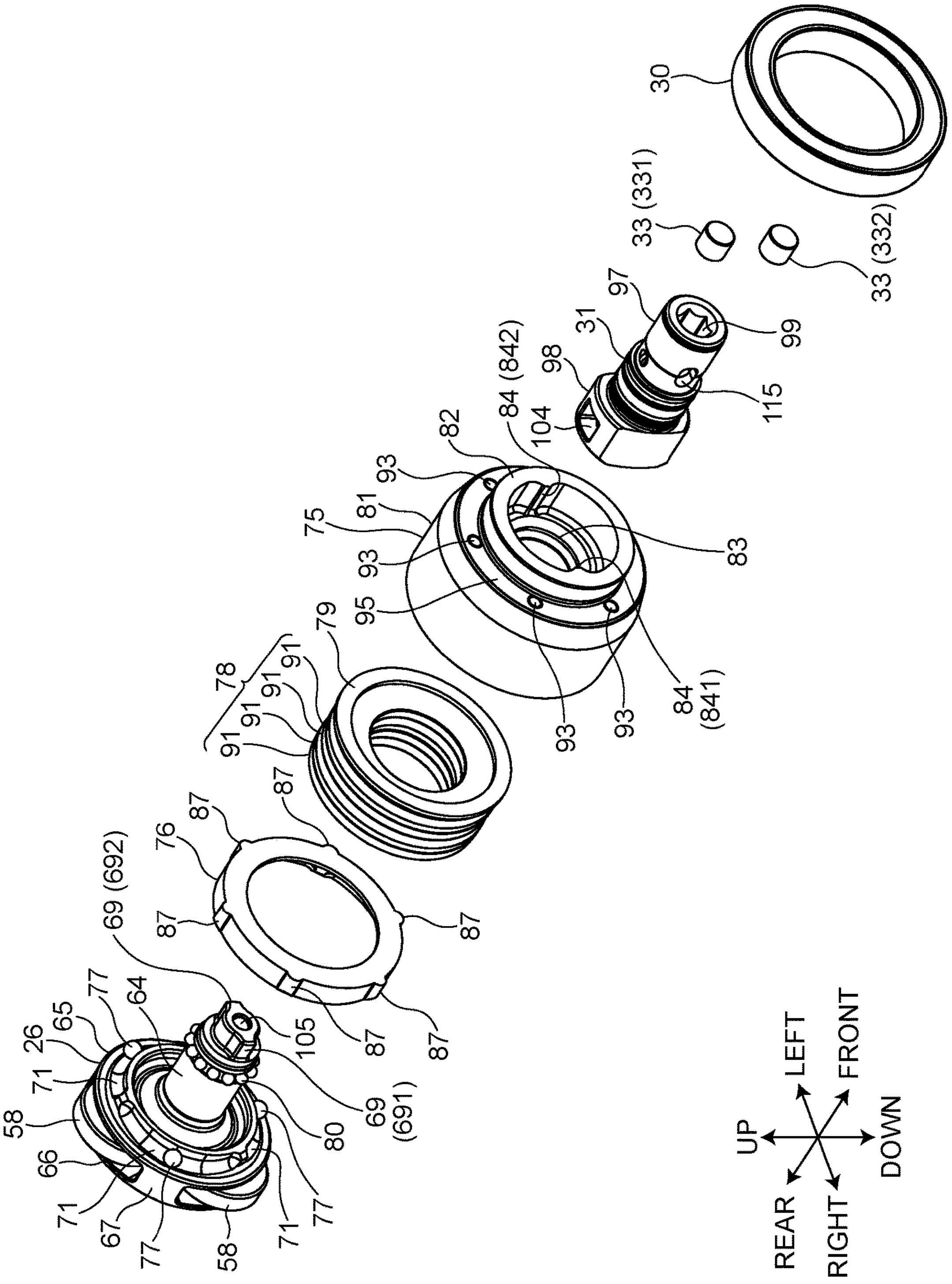
FIG. 13 is an exploded oblique view, viewed from the front, which illustrates a main part of the output assembly according to the first embodiment.
Figure 14:
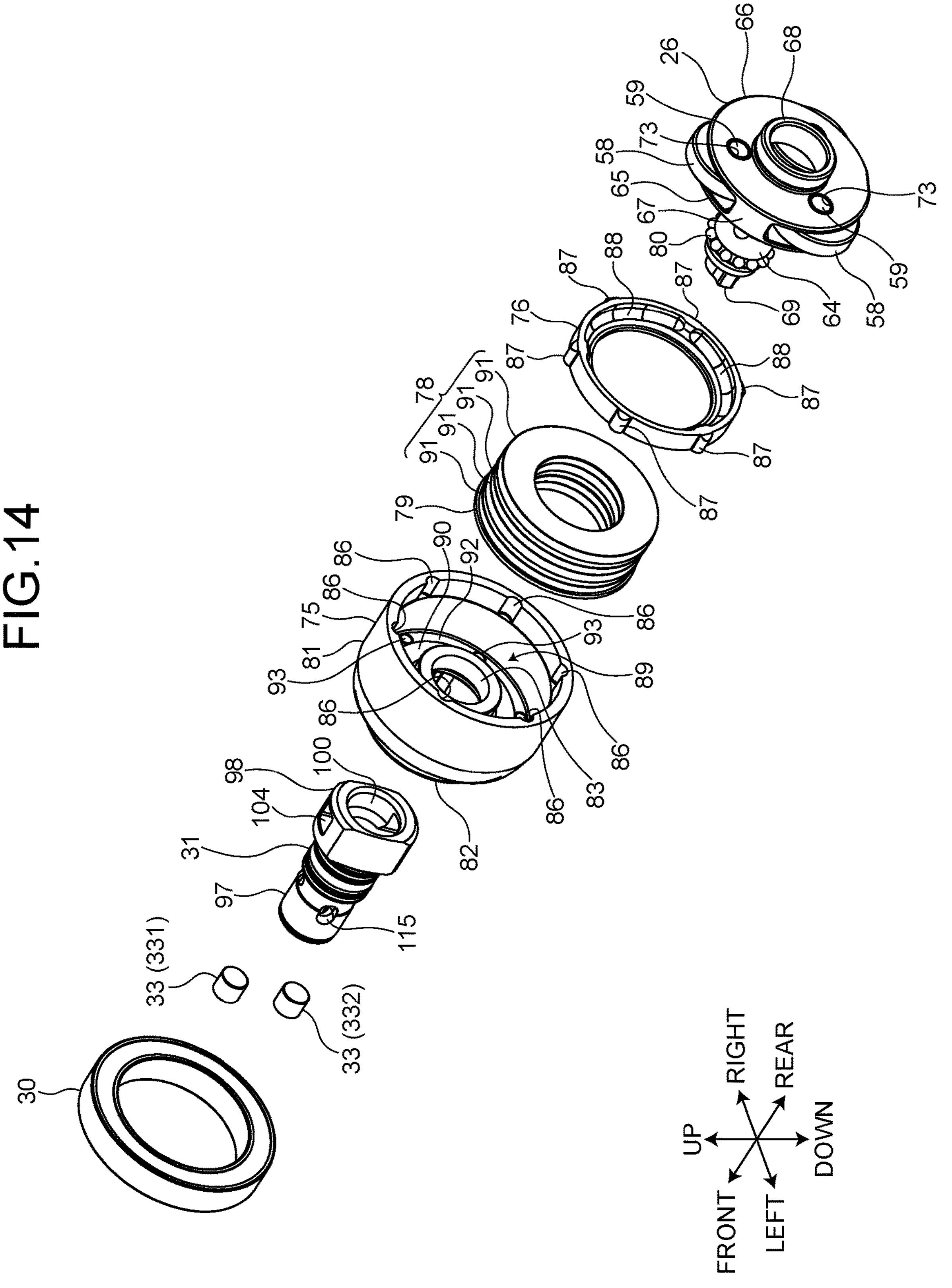
FIG. 14 is an exploded oblique view, viewed from the rear, which illustrates the main part of the output assembly according to the first embodiment.
Figure 15:
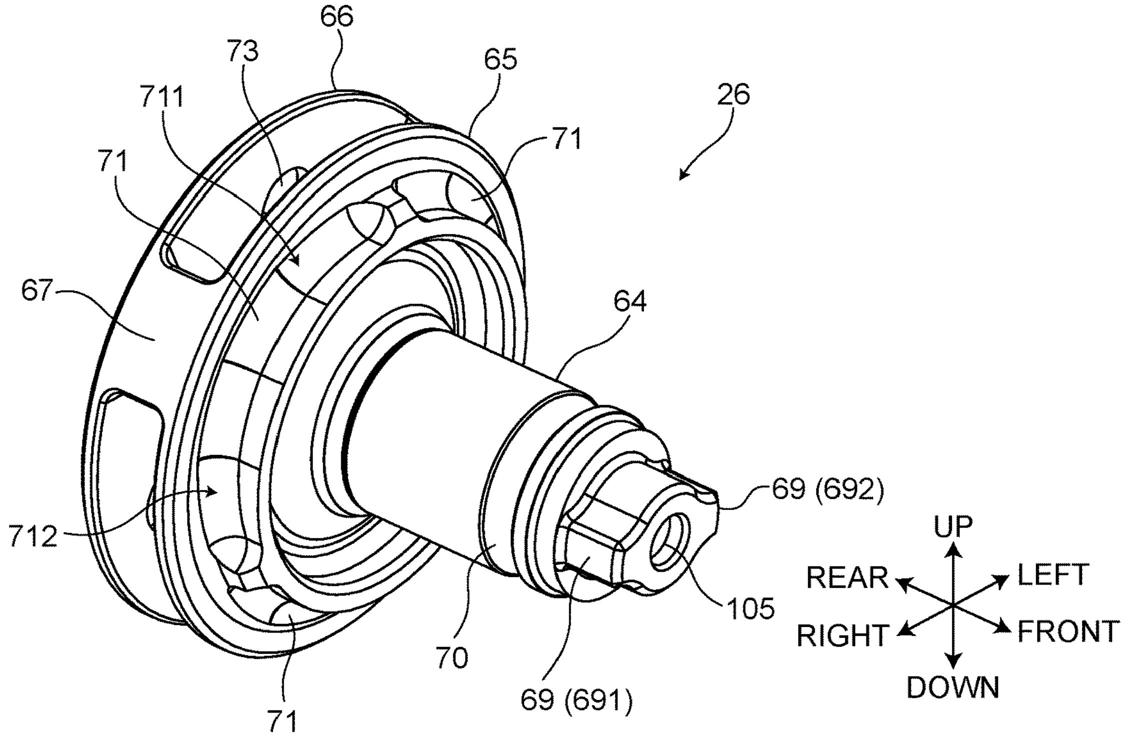
FIG. 15 is an oblique view, viewed from the front, which illustrates a spindle according to the first embodiment.
Figure 16:
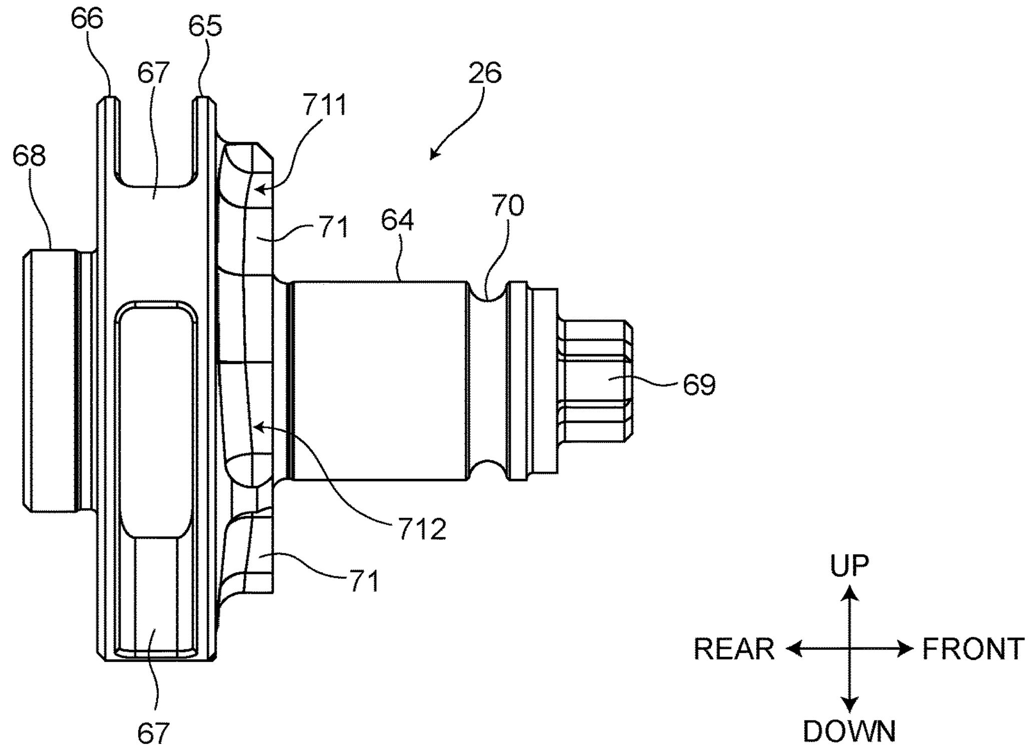
FIG. 16 is a side view illustrating the spindle according to the first embodiment.
Figure 17:
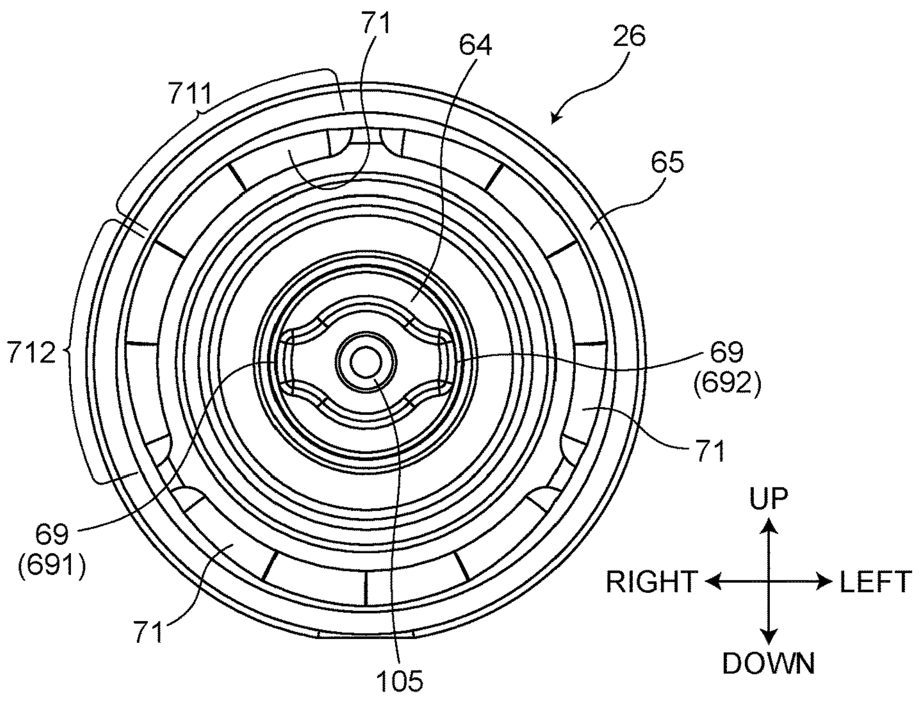
FIG. 17 is a front view of the spindle according to the first embodiment.

FIG. 13 is an exploded oblique view, viewed from the front, which illustrates a main part of the output assembly 4 according to the embodiment. FIG. 14 is an exploded oblique view, viewed from the rear, which illustrates the main part of the output assembly 4 according to the embodiment. FIG. 15 is an oblique view, viewed from the front, which illustrates the spindle 26 according to the embodiment. FIG. 16 is a side view illustrating the spindle 26 according to the embodiment. FIG. 17 is a front view of the spindle 26 according to the embodiment.

The spindle 26 is rotated by rotational force of the motor 6. At least a part of the spindle 26 is disposed forward of the speed reduction mechanism 25. The spindle 26 is disposed rearward of the tool holding shaft 31. The spindle 26 is rotated by the rotor 36. The spindle 6 is rotated by rotational force of the rotor 36 transmitted by the speed reduction mechanism 25. The spindle 26 transmits the rotational force of the motor 6 to the movable anvils 33 via the impact mechanism 28.

The spindle 26 includes a spindle shaft 64, a flange 65, a pin support 66, a coupling portion 67, and a protrusion 68.

The spindle shaft 64 extends in the axial direction. The spindle shaft 64 is disposed so as to surround the rotation axis AX. Spindle projections 69 are provided at a front end of the outer circumferential surface of the spindle shaft 64. The spindle projections 69 each protrude radially outward from the front end of the outer circumferential surface of the spindle shaft 64. Two spindle projections 69 are provided around the rotation axis AX. The two spindle projections 69 are disposed so as to sandwich the rotation axis AX. In the following description, one spindle projection 69 is appropriately referred to as a first spindle projection 691, and the other spindle projection 69 is appropriately referred to as a second spindle projection 692.

A ball groove 70 is formed on the outer circumferential surface of the spindle shaft 64. The ball groove 70 is disposed rearward of the spindle projections 69. The ball groove 70 is formed so as to surround the rotation axis AX. The ball groove 70 is formed so as to be recessed radially inward from the outer circumferential surface of the spindle shaft 64.

The flange 65 is provided at a rear portion of the spindle shaft 64. The flange 65 protrudes radially outward from the rear portion of the spindle shaft 64. Spindle grooves 71 are provided on the front surface of the flange 65. The spindle grooves 71 are provided in the circumferential direction. In the embodiment, three spindle grooves 71 are provided in the circumferential direction.

The pin support 66 is disposed rearward of the flange 65. The pin support 66 has a circular ring shape. A part of the flange 65 and a part of the pin support 66 are coupled via the coupling portion 67. The protrusion 68 protrudes rearward from the pin support 66.

The planetary gears 58 are disposed between the flange 65 and the pin support 66. Front ends of the pins 59 are disposed in support recesses 72 provided in the flange 65. Rear ends of the pins 59 are disposed in support holes 73 provided in the pin support 66. The planetary gears 58 are rotatably supported by the flange 65 and the pin support 66 via the pins 59.

The protrusion 68 is disposed on an inner side of the spindle bearing 27. The protrusion 68 is rotatably supported by the spindle bearing 27. A washer 74 is disposed at a position facing a front end of an inner ring of the spindle bearing 27.

Impact Mechanism

The impact mechanism 28 is driven by the motor 6. The rotational force of the motor 6 is transmitted to the impact mechanism 28 via the speed reduction mechanism 25 and the spindle 26. The impact mechanism 28 impacts (strikes) the movable anvils 33 in the rotation direction owing to the rotational force of the spindle 26, which is rotated by the motor 6.

The impact mechanism 28 includes a hammer 75, a cam ring 76, balls 77, an elastic member 78, a washer 79, and rotation balls 80.

The hammer 75 impacts the movable anvils 33 in the rotation direction. The hammer 75 impact the tool holding shaft 31 in the rotation direction via the movable anvils 33. The hammer 75 is supported by the spindle 26. The hammer 75 is disposed around the spindle shaft 64. The hammer 75 is rotatably supported by the spindle shaft 64. The hammer 75 is disposed forward of the speed reduction mechanism 25.

The hammer 75 does not move in the axial direction with respect to the hammer case 23. In a practical sense, the hammer 75 may slightly move in the axial direction with respect to the hammer case 23 due to, for example, rattle or backlash. The hammer 75 can rotate relative to the spindle 26. The hammer 75 can rotate relative to the spindle shaft 64 in a state of being supported by the spindle shaft 64. The hammer 75 impacts the movable anvils 33 in the rotation direction without being displaced the axial direction with respect to the spindle 26.

The hammer 75 includes a rear outer cylindrical portion 81, a front outer cylindrical portion 82, and an inner cylindrical portion 83. Each of the rear outer cylindrical portion 81, the front outer cylindrical portion 82, and the inner cylindrical portion 83 is disposed so as to surround the rotation axis AX. The rear outer cylindrical portion 81, the front outer cylindrical portion 82, and the inner cylindrical portion 83 are integrated.

The front outer cylindrical portion 82 is disposed forward of the rear outer cylindrical portion 81. A front end of the rear outer cylindrical portion 81 is connected to a rear end of the front outer cylindrical portion 82. The rear outer cylindrical portion 81 has an outer diameter larger than that of the front outer cylindrical portion 82. The rear outer cylindrical portion 81 has an inner diameter larger than that of the front outer cylindrical portion 82.

The inner cylindrical portion 83 is supported by the spindle shaft 64. The inner cylindrical portion 83 is disposed radially inside with respect to the rear outer cylindrical portion 81 and the front outer cylindrical portion 82. A front end of the inner cylindrical portion 83 is connected to the rear end of the front outer cylindrical portion 82. The front outer cylindrical portion 82 is disposed radially outside with respect to the inner cylindrical portion 83 and disposed forward of the inner cylindrical portion 83. The rear outer cylindrical portion 81 is disposed radially outside with respect to the front outer cylindrical portion 82 and is disposed rearward of the front outer cylindrical portion 82.

Hammer projections 84 are provided on the inner circumferential surface of the front outer cylindrical portion 82. The hammer projections 84 each protrude radially inward from the inner circumferential surface of the front outer cylindrical portion 82. Two hammer projections 84 are provided around the rotation axis AX. The two hammer projections 84 are disposed so as to sandwich the rotation axis AX. The two hammer projections 84 are disposed so as to face each other. In the following description, one hammer projection 84 is appropriately referred to as a first hammer projection 841, and the other hammer projection 84 is appropriately referred to as a second hammer projection 842.

The inner cylindrical portion 83 is disposed around the spindle shaft 64. The inner circumferential surface of the inner cylindrical portion 83 faces the outer circumferential surface of the spindle shaft 64. A ball groove 85 is formed on the inner circumferential surface of the inner cylindrical portion 83. The ball groove 85 is formed so as to surround the rotation axis AX. The ball groove 85 is formed so as to be recessed radially outward from the inner circumferential surface of the inner cylindrical portion 83.

Guide grooves 86 are provided on the inner circumferential surface of the rear outer cylindrical portion 81. The guide grooves 86 each extend in the axial direction on the inner circumferential surface of the rear outer cylindrical portion 81. The guide grooves 86 each extend forward from a rear end of the rear outer cylindrical portion 81. The guide grooves 86 are provided at intervals around the rotation axis AX of the hammer 75. In the embodiment, six guide grooves 86 are provided around the rotation axis AX. The six guide grooves 86 are provided at equal intervals in the circumferential direction.

Figure 18:
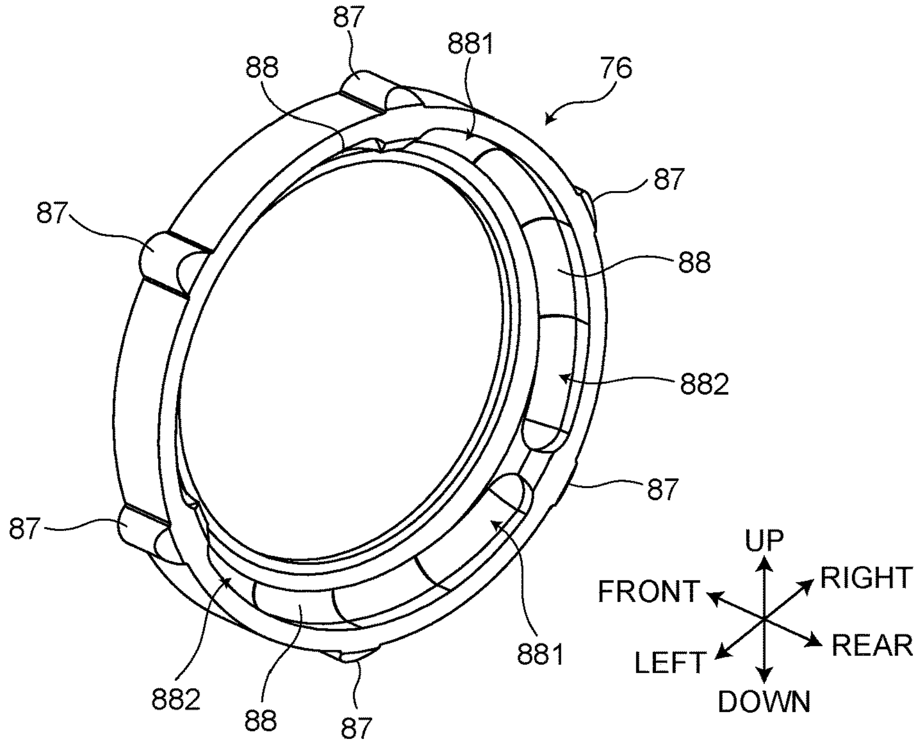
FIG. 18 is an oblique view, viewed from the front, which illustrates a cam ring according to the first embodiment.
Figure 19:
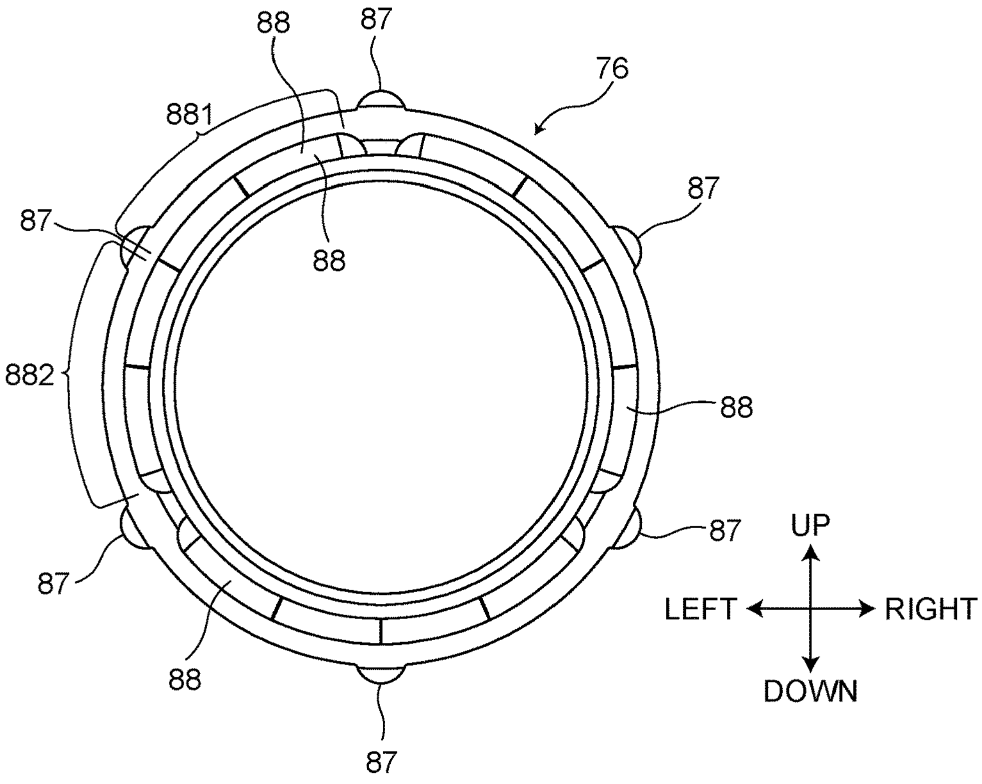
FIG. 19 is a rear view of the cam ring according to the first embodiment.
Figure 20:
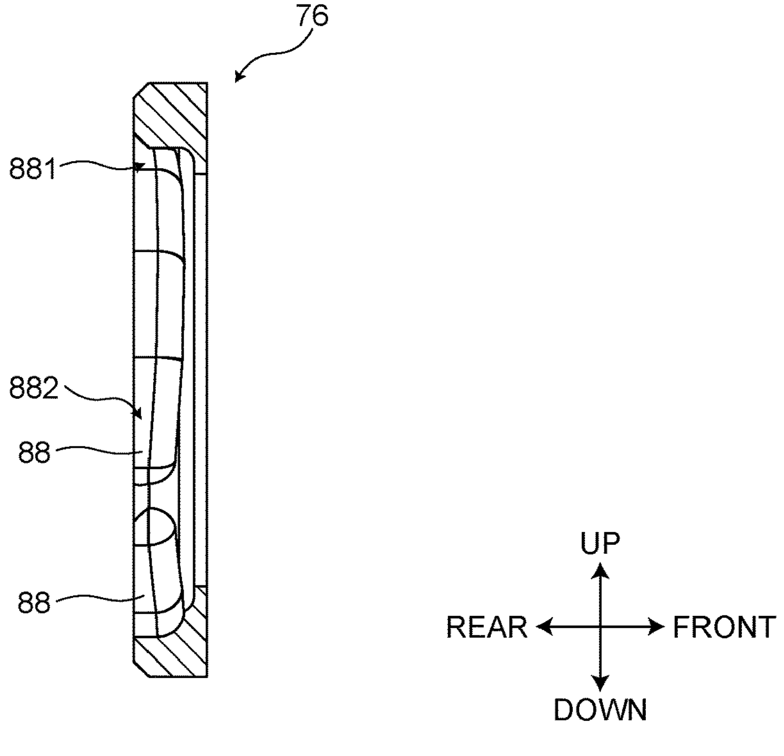
FIG. 20 is a cross-sectional view illustrating the cam ring according to the first embodiment.

FIG. 18 is an oblique view, viewed from the front, which illustrates the cam ring 76 according to the embodiment. FIG. 19 is a rear view of the cam ring 76 according to the embodiment. FIG. 20 is a cross-sectional view illustrating the cam ring 76 according to the embodiment.

The cam ring 76 is coupled to the flange 65 via the balls 77 so as to be rotatable relative to the flange 65. The cam ring 76 is coupled to the hammer 75 so as to be movable relative to the hammer in the axial direction but so as not to be rotatable relative to the hammer 75. The cam ring 76 is disposed so as to face the front surface of the flange 65. The cam ring 76 is coupled to the rear portion of the hammer 75.

The cam ring 76 is disposed on inner side of the rear outer cylindrical portion 81. The cam ring 76 and the hammer 75 can relatively move in the axial direction. As described above, the hammer 75 does not move in the axial direction with respect to the hammer case 23. In a practical sense, the hammer 75 may slightly move in the axial direction with respect to the hammer case 23 due to, for example, rattle or backlash. The cam ring 76 moves in the axial direction with respect to the hammer case 23 inside the rear outer cylindrical portion 81 of the hammer 75.

Cam slide portions 87 are provided on the outer circumferential surface of the cam ring 76. The cam slide portions 87 each protrude radially outward from the outer circumferential surface of the cam ring 76. The cam slide portions 87 are provided at intervals around the rotation axis AX of the cam ring 76. Six cam slide portions 87 are provided around the rotation axis AX. The six cam slide portions 87 are provided at equal intervals in the circumferential direction. The cam slide portions 87 are disposed in the guide grooves 86. One cam slide portion 87 is disposed in one guide groove 86. The cam slide portions 87 move in the guide grooves 86 in the axial direction. The cam ring 76 can move in the axial direction with respect to the hammer 75 while being guided by the guide grooves 86 via the cam slide portions 87.

The guide grooves 86 of the hammer 75 function as a guide portion that guides the cam ring 76 in the axial direction and that suppresses the relative rotation of the hammer 75 and the cam ring 76.

Cam grooves 88 are provided on the inner circumferential surface of the cam ring 76. The cam grooves 88 are provided in the circumferential direction. In the embodiment, three cam grooves 88 are provided in the circumferential direction.

The cam ring 76 is disposed forward of the flange 65. The cam ring 76 is disposed so as to face the front surface of the flange 65 in a state of being disposed on the inner side of the rear outer cylindrical portion 81 of the hammer 75.

The balls 77 are disposed between the spindle 26 and the cam ring 76. The balls 77 are disposed between the flange 65 and the cam ring 76. The flange 65 of the spindle 26 and the cam ring 76 can relatively rotate via the balls 77.

The ball 77 is made of metal such as iron and steel. The flange 65 has the spindle grooves 71 in which the balls 77 are at least partially disposed. The spindle grooves 71 are provided in a part of the front surface of the flange 65. The spindle grooves 71 each has an arc shape in a plane orthogonal to the rotation axis AX. The cam ring 76 has the cam grooves 88 in which the balls 77 are at least partially disposed. The cam grooves 88 are provided in a part of the inner circumferential surface of the cam ring 76. The cam grooves 88 each has an arc shape in a plane orthogonal to the rotation axis AX. The balls 77 are disposed between the spindle grooves 71 and the cam grooves 88. As described above, three spindle grooves 71 are provided. Three cam grooves 88 are provided. Three balls 77 are provided. One ball 77 is arranged between one spindle groove 71 and one cam groove 88. The balls 77 can roll in the spindle groove 71 and in the cam groove 88. The cam ring 76 can move with the ball 77.

At least a part of the spindle groove 71 is inclined rearward toward one side in the circumferential direction. At least a part of the spindle groove 71 may be inclined rearward toward the other side in the circumferential direction.

At least a part of the cam groove 88 is inclined rearward toward one side in the circumferential direction. At least a part of the cam groove 88 may be inclined rearward toward the other side in the circumferential direction.

In the embodiment, each of the spindle grooves 71 includes a first portion 711 and a second portion 712. The first portion 711 and the second portion 712 are defined at different positions in the circumferential direction. A boundary between the first portion 711 and the second portion 712 is defined at a central portion of the spindle groove 71 in the circumferential direction. The first portion 711 is inclined rearward from the central portion of the spindle groove 71 toward one side in the circumferential direction. The second portion 712 is inclined rearward from the central portion of the spindle groove 71 toward the other side in the circumferential direction. The first portion 711 is defined between the central portion and one end of the spindle groove 71 in the circumferential direction. The second portion 712 is defined between the central portion and the other end of the spindle groove 71 in the circumferential direction.

In the embodiment, each of the cam grooves 88 includes a third portion 881 and a fourth portion 882. The third portion 881 and the fourth portion 882 are defined at different positions in the circumferential direction. A boundary between the third portion 881 and the fourth portion 882 is defined at a central portion of the cam groove 88 in the circumferential direction. The third portion 881 is inclined rearward from the central portion of the cam groove 88 toward one side in the circumferential direction. The fourth portion 882 is inclined rearward from the central portion of the cam groove 88 toward the other side in the circumferential direction. The third portion 881 is defined between the central portion and one end of the cam groove 88 in the circumferential direction. The fourth portion 882 is defined between the central portion and the other end of the cam groove 88 in the circumferential direction.

In the relative rotation of the flange 65 and the cam ring 76, the ball 77 moves through the first portion 711 from the central portion of the spindle groove 71 toward an end of the first portion 711 on one side in the circumferential direction between the first portion 711 of the spindle groove 71 and the third portion 881 of the cam groove 88, so that the cam ring 76 receives force from the ball 77 and moves forward.

In the relative rotation of the flange 65 and the cam ring 76, the ball 77 moves through the first portion 711 from the end of the first portion 711 on the one side in the circumferential direction toward the central portion of the spindle groove 71 between the first portion 711 of the spindle groove 71 and the third portion 881 of the cam groove 88, so that the cam ring 76 receives force from the ball 77 and moves rearward.

In the relative rotation of the flange 65 and the cam ring 76, the ball 77 moves through the second portion 712 from the central portion of the spindle groove 71 toward an end of the second portion 712 on the other side in the circumferential direction between the second portion 712 of the spindle groove 71 and the fourth portion 882 of the cam groove 88, so that the cam ring 76 receives force from the ball 77 and moves forward.

In the relative rotation of the flange 65 and the cam ring 76, the ball 77 moves through the second portion 712 from the end of the second portion 712 on the other side in the circumferential direction toward the central portion of the spindle groove 71 between the second portion 712 of the spindle groove 71 and the fourth portion 882 of the cam groove 88, so that the cam ring 76 receives force from the ball 77 and moves rearward.

The flange 65 of the spindle 26 and the cam ring 76 can relatively move in both the axial direction and the rotation direction within a movable range defined by the spindle groove 71 and the cam groove 88.

The cam ring 76 is coupled to the flange 65 of the spindle 26 via the balls 77. The cam ring 76 can rotate together with the spindle 26 owing to rotational force of the spindle 26 rotated by the motor 6. The cam ring 76 rotates about the rotation axis AX.

The elastic member 78 constantly generates elastic force for moving the cam ring 76 rearward. In the axial direction, the elastic member 78 is disposed between the hammer 75 and the cam ring 76. At least a part of the elastic member 78 is disposed around the spindle shaft 64. In the embodiment, the hammer 75 has a recess 89 recessed forward from the rear surface of the hammer 75. The recess 89 is defined by the inner circumferential surface of the rear outer cylindrical portion 81, the outer circumferential surface of the inner cylindrical portion 83, and a support surface 90 disposed forward of the flange 65 and the cam ring 76. The support surface 90 is disposed so as to connect a front end of the inner circumferential surface of the rear outer cylindrical portion 81 and a front end of the outer circumferential surface of the inner cylindrical portion 83. The support surface 90 has a circular ring shape. At least a part of the elastic member 78 is disposed in the recess 89. In the axial direction, the elastic member 78 is disposed between the front surface of the cam ring 76 and the support surface 90 of the hammer 75 disposed forward of the flange 65 and the cam ring 76.

In the embodiment, a rear portion of the elastic member 78 is disposed around the spindle shaft 64. A front portion of the elastic member 78 is disposed around the inner cylindrical portion 83 in the recess 89. In the embodiment, the elastic member 78 includes a plurality of disc springs 91. The disc springs 91 are disposed in the axial direction. In the embodiment, four disc springs 91 are disposed in the axial direction. The disc springs 91 have a circular ring shape. In the embodiment, some of the disc springs 91 are disposed around the spindle shaft 64, and some of the disc springs 91 are disposed around the inner cylindrical portion 83.

In the embodiment, the elastic member 78 has a spring constant of 100 [N/mm] or more. An upper limit value of the spring constant of the elastic member 78 is not particularly limited. In the embodiment, the elastic member 78 has a spring constant of 10000 [N/mm] or less.

The hammer 75 is disposed around the spindle shaft 64. The cam ring 76 is disposed forward of the flange 65, and coupled to the flange 65 via the balls 77. The cam ring 76 is coupled to a rear portion of the hammer 75 via the cam slide portions 87 and the guide grooves 86. The spindle shaft 64, the hammer 75, and the cam ring 76 define closed space. The closed space is defined by the outer circumferential surface of the spindle shaft 64, the outer circumferential surface of the inner cylindrical portion 83, the support surface 90, the inner circumferential surface of the rear outer cylindrical portion 81, and the front surface of the cam ring 76. The elastic member 78 is disposed in the closed space.

The washer 79 supports a front end of the elastic member 78. The washer 79 is disposed radially outside with respect to the inner cylindrical portion 83. The washer 79 has a circular ring shape. The washer 79 is disposed so as to surround the inner cylindrical portion 83. The washer 79 is disposed in the recess 89. At least a part of the hammer 75 supports the washer 79 in the recess 89. In the embodiment, the washer 79 is disposed in a circular groove 92 provided on the support surface 90.

A rear end of the elastic member 78 is in contact with the front surface of the cam ring 76. The front end of the elastic member 78 is in contact with the washer 79. The front end of the elastic member 78 is connected to the hammer 75 via the washer 79. In the embodiment, the rear end of the elastic member 78 refers to a rear end of a disc spring 91 disposed at a rearmost position among the disc springs 91 disposed in the axial direction. The front end of the elastic member 78 refers to a front end of a disc spring 91 disposed at a foremost position among the disc springs 91 disposed in the axial direction.

The rotation balls 80 are disposed between the spindle shaft 64 and the hammer 75. The rotation balls 80 are disposed between the ball groove 70 and the ball groove 85. The rotation balls 80 are at least partially disposed in the ball groove 70 and are partially disposed in the ball groove 85. The rotation balls 80 are disposed around the rotation axis AX of the spindle 26. As described above, the hammer 75 can rotate relative to the spindle shaft 64. The rotation balls 80 function as a bearing of the hammer 75. The rotation balls 80 enable the hammer 75 and the spindle shaft 64 to relatively rotate smoothly.

Elastic Force Adjusting Mechanism

The elastic force adjusting mechanism 29 adjusts elastic force of the elastic member 78 in an initial state before the motor 6 is started. The elastic force adjusting mechanism 29 adjusts the elastic force of the elastic member 78 by adjusting an amount of compression of the elastic member 78 in the initial state.

The flange 65 supports the rear end of the elastic member 78 via the cam ring 76. The elastic force adjusting mechanism 29 adjusts the amount of compression of the elastic member 78 by moving the position of the front end of the elastic member 78.

The elastic force adjusting mechanism 29 includes screws 93 that are in contact with the washer 79. The screws 93 are connected to the front end of the elastic member 78 via the washer 79. The screws 93 are disposed in screw holes 94 formed in the hammer 75. Each of the screw holes 94 penetrates a front end surface 95 of the rear outer cylindrical portion 81 and the support surface 90. The front end surface 95 has a circular ring shape in a plane orthogonal to the rotation axis AX. The front end surface 95 faces forward. The screw holes 94 are formed at intervals around the rotation axis AX of the hammer 75. One screw 93 is disposed in a corresponding one screw hole 94. In the embodiment, six screw holes 94 are formed at intervals around the rotation axis AX. The six screws 93 are disposed in the six screw holes 94, respectively.

A rear end of each of the screws 93 is in contact with the front surface of the washer 79. The amount of compression of the elastic member 78 is adjusted by rotation of the screws 93. Rotation of the screws 93 in one direction moves the screws 93 rearward with respect to the hammer 75. The rearward movement of the screws 93 moves the front end of the elastic member 78 rearward via the washer 79. Rearward movement of the front end of the elastic member 78 in a state in which the flange 65 supports the rear end of the elastic member 78 via the cam ring 76 compresses the elastic member 78. Rotation of the screws 93 in the other direction moves the screws 93 forward with respect to the hammer 75. Forward movement of the front end of the elastic member 78 in a state in which the flange 65 supports the rear end of the elastic member 78 via the cam ring 76 extends the elastic member 78.

The amount of compression of the elastic member 78 is adjusted in an operation of assembling the impact tool 1. After the spindle 26, the hammer 75, and the cam ring 76 are coupled such that the elastic member 78 is disposed in the closed space defined by the spindle shaft 64, the hammer 75, and the cam ring 76, the screw fastening tool is inserted into the screw hole 94 from the front of the front end surface 95. A tip of the screw fastening tool is inserted into a tool hole of the screw 93 via the screw hole 94. An assembler can adjust the amount of compression of the elastic member 78 by rotating the screw 93 via the screw fastening tool. Furthermore, an angle of inclination of the elastic member 78 with respect to the spindle 26 is adjusted by adjusting the axial position of each of the screws 93.

Hammer Bearing

The hammer bearing 30 supports the hammer 75 in a rotatable manner. The hammer case 23 holds the hammer bearing 30. The hammer bearing 30 is disposed around the hammer 75. In the embodiment, the hammer bearing 30 supports a front end of the hammer 75 in a rotatable manner. In the embodiment, the hammer bearing 30 is disposed around the front outer cylindrical portion 82. At least a part of the rear end of the hammer bearing 30 is in contact with the front end surface 95 of the rear outer cylindrical portion 81. The hammer case 23 has a facing surface 96 facing the front end of the hammer bearing 30. The facing surface 96 faces rearward. The front end of the hammer bearing 30 and the facing surface 96 of the hammer case 23 face each other with a gap or spacing or distance therebetween. The hammer bearing 30 is a ball bearing. An outer ring of the hammer bearing 30 is in contact with the inner circumferential surface of the large cylindrical portion 53 of the hammer case 23. An inner ring of the hammer bearing 30 is in contact with the outer circumferential surface of the front outer cylindrical portion 82 of the hammer 75.

In the embodiment, the hammer bearing 30 is disposed so as to cover a front end of the screw holes 94. In the operation of assembling the impact tool 1, after the screws 93 are rotated with the screw fastening tool to adjust the amount of compression of the elastic member 78, the hammer bearing 30 is disposed around the front outer cylindrical portion 82.

Tool Holding Shaft

Figure 21:
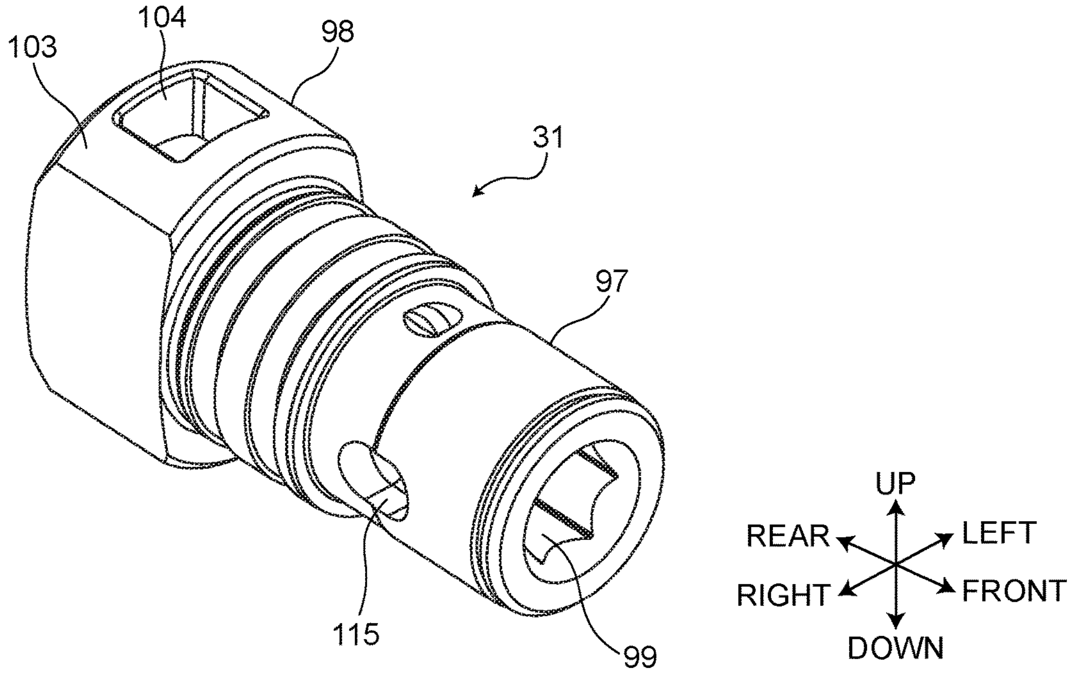
FIG. 21 is an oblique view, viewed from the front, which illustrates a tool holding shaft according to the first embodiment.
Figure 22:
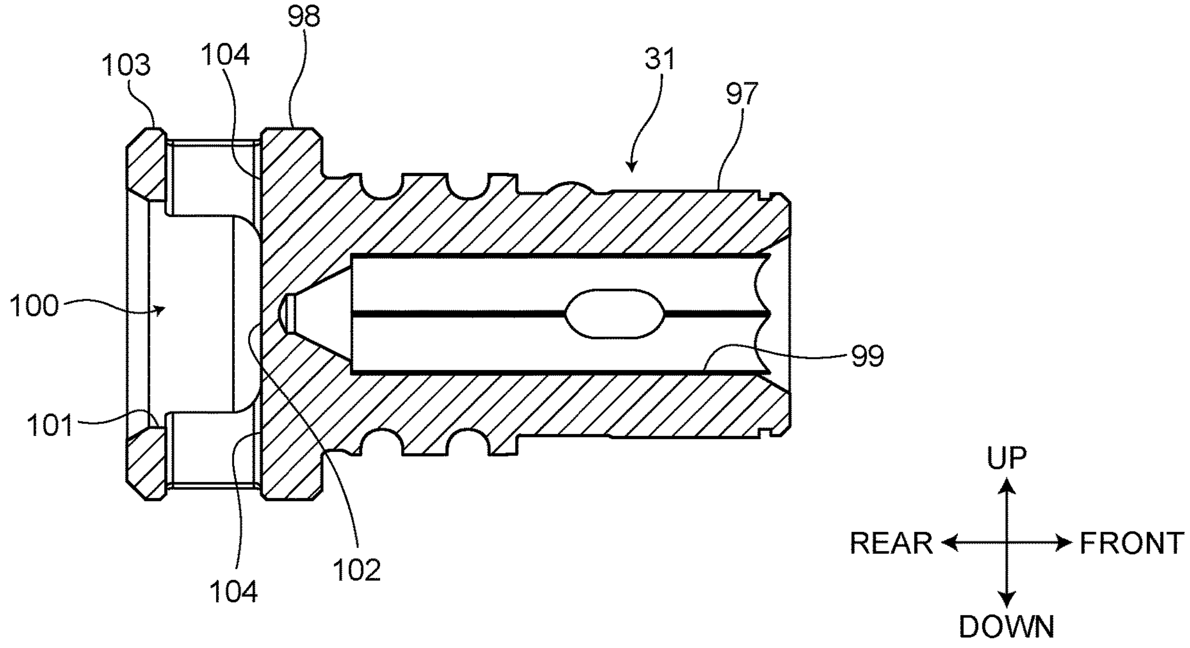
FIG. 22 is a cross-sectional view illustrating the tool holding shaft according to the first embodiment.

FIG. 21 is an oblique view, viewed from the front, which illustrates the tool holding shaft 31 according to the embodiment. FIG. 22 is a cross-sectional view illustrating the tool holding shaft 31 according to the embodiment.

The tool holding shaft 31 is an output unit of the impact tool 1 that rotates owing to the rotational force of the rotor 36. At least a part of the tool holding shaft 31 is disposed forward of the spindle 26. The tool holding shaft 31 includes a tool holder 97 and an anvil portion 98 disposed rearward of the tool holder 97. The tool holder 97 has a rod shape extending in the front-rear direction. The anvil portion 98 is connected to a rear portion of the tool holder 97.

The tool holder 97 holds a tool accessory, e.g., a bit. The tool holder 97 has a tool (bit) hole 99 into which a tool accessory is inserted. The tool hole 99 extends rearward from the front end surface of the tool holder 97. The tool accessory is mounted on the tool holding shaft 31.

The anvil portion 98 is disposed rearward of the tool holder 97. The anvil portion 98 is connected to the rear portion of the tool holder 97. The anvil portion 98 is disposed so as to surround the rotation axis AX. The anvil portion 98 has a recess 100 into which a front end of the spindle shaft 64 is inserted. The front end of the spindle shaft 64 including the spindle projections 69 is disposed in the recess 100. The recess 100 is recessed forward from a rear end surface of the anvil portion 98. The recess 100 is defined by an inner circumferential surface 101 of the anvil portion 98 and a facing surface 102 connected to a front end of the inner circumferential surface 101 of the anvil portion 98. The facing surface 102 is a flat surface facing rearward.

The anvil portion 98 has anvil holes 104 each penetrating an outer circumferential surface 103 of the anvil portion 98 and the inner circumferential surface 101 of the anvil portion 98. The anvil holes 104 extend in the radial direction. Two anvil holes 104 are provided around the rotation axis AX. The two anvil holes 104 are disposed so as to sandwich the rotation axis AX.

In the embodiment, a support ball 106 is supported by the front end of the spindle shaft 64. A support recess 105 is provided on the front end surface of the spindle shaft 64. The support recess 105 has an inner surface having a hemispherical shape. The support ball 106 is disposed in the support recess 105. The support ball 106 is in contact with the facing surface 102.

The tool holding shaft 31 is rotatably supported by the shaft bearings 32. The shaft bearings 32 are disposed around the tool holder 97. The shaft bearings 32 are disposed inside the small cylindrical portion 54 of the hammer case 23. The shaft bearing 32 is supported by the small cylindrical portion 54 of the hammer case 23. The shaft bearing 32 supports a front portion of the tool holder 97 in a rotatable manner. In the embodiment, two shaft bearings 32 are disposed in the axial direction. An O-ring 107 is disposed between each of the shaft bearings 32 and a rear holder.

A suppressing member 108 is disposed rearward of the shaft bearing 32. The suppressing member 108 suppresses rearward removal from the shaft bearing 32. The suppressing member 108 is disposed in a groove 109 formed on the inner circumferential surface of the small cylindrical portion 54. Examples of the suppressing member 108 include a snap ring and a C-ring. The suppressing member 108 is disposed so as to be in contact with the rear end surface of the shaft bearing 32. The suppressing member 108 suppresses the shaft bearing 32 from being removed rearward from the small cylindrical portion 54.

Movable Anvil

The movable anvil 33 is movably supported by the tool holding shaft 31. In the embodiment, the movable anvil 33 moves only in the radial direction with respect to the tool holding shaft 31. The movable anvil 33 does not move in the axial direction and the circumferential direction with respect to the tool holding shaft 31.

The movable anvils 33 are movably supported by the anvil portion 98. The movable anvils 33 are disposed in the anvil holes 104. Two movable anvils 33 are disposed in the two anvil holes 104, respectively. Each of the movable anvils 33 is a columnar (pin-shaped) member. Each of the movable anvil 33 is disposed in the anvil hole 104 such that the central axis of the movable anvil 33 is in parallel with the rotation axis AX of the tool holding shaft 31. In the following description, one movable anvil 33 is appropriately referred to as a first movable anvil 331, and the other movable anvil 33 is appropriately referred to as a second movable anvil 332.

The movable anvils 33 can move in the radial direction while being guided by the anvil holes 104. The inner surface of each of the anvil holes 104 functions as a guide surface that guides the movable anvil 33 in the radial direction. The front end of the spindle shaft 64 is disposed in the recess 100 of the anvil portion 98. The spindle projections 69 are disposed at the front end of the spindle shaft 64. When the spindle projections 69 come into contact with the movable anvils 33, the movable anvils 33 move radially outward. When the spindle projections 69 are away from the movable anvils 33, the movable anvils 33 move radially inward.

The movable anvils 33 move so as to change between a first state and a second state. In the first state, at least a part of each of the movable anvils 33 protrudes radially outward from the outer circumferential surface 103 of the anvil portion 98 of the tool holding shaft 31. In the second state, each of the movable anvils 33 is positioned radially inside with respect to the outer circumferential surface 103 of the anvil portion 98 of the tool holding shaft 31. In the rotation of the spindle 26, the spindle projections 69 come into contact with the movable anvils 33, whereby the movable anvils 33 change from the second state to the first state. That is, when the spindle projections 69 come into contact with the movable anvils 33, at least a part of the movable anvil 33 is positioned radially outside with respect to the outer circumferential surface 103 of the anvil portion 98.

When the movable anvils 33 are in the first state, the hammer projections 84 of the hammer 75 can come into contact with the movable anvils 33. The hammer 75 impacts (strikes) the movable anvils 33 when the movable anvils 33 are in the first state. When the movable anvils 33 are in the second state, the hammer projections 84 of the hammer 75 cannot come into contact with the movable anvils 33. The hammer 75 rotates around the spindle shaft 64 when the movable anvils 33 are in the second state.

Tool Holding Mechanism

The tool holding mechanism 34 is disposed forward of the hammer case 23 and disposed around the tool holder 97. The tool holding mechanism 34 holds a tool accessory inserted into the tool hole 99 of the tool holder 97. The tool accessory is detachable from the tool holding mechanism 34.

The tool holding mechanism 34 includes holding balls 110, a leaf spring 111, a sleeve 112, a coil spring 113, and a positioning member 114.

The tool holder 97 has support recesses 115 that support the holding balls 110. The support recesses 115 are formed on the outer surface of the tool holder 97. In the embodiment, two support recesses 115 are formed in the tool holder 97.

The holding balls 110 are movably supported by the tool holder 97. The holding balls 110 are disposed in the support recesses 115. One holding ball 110 is disposed in one support recess 115.

Through holes connecting the inner surface of each of the support recesses 115 and the inner surface of the tool hole 99 are formed in the tool holder 97. Each of the holding balls 110 has a diameter smaller than that of the innermost portion of the through hole in the radial direction. The tool accessary is disposed in the tool hole 99 via at least a part of each of the holding balls 110 in a state in which the holding balls 110 are supported by the support recesses 115. The holding balls 110 can fix the tool accessory inserted into the tool hole 99. The holding balls 110 can move to an engagement position for fixing the tool accessory and a release position for releasing the fixing of the tool accessory.

The leaf spring 111 generates elastic force that moves the holding balls 110 to the engagement position. The leaf spring 111 is disposed around the tool holder 97. The leaf spring 111 generates elastic force that moves the holding balls 110 forward.

The sleeve 112 is a cylindrical member. The sleeve 112 is disposed around the tool holder 97. The sleeve 112 can move around the tool holder 97 in the axial direction. The sleeve 112 can block the holding balls 110 disposed at the engagement position from escaping from the engagement position. The sleeve 112 is moved in the axial direction, whereby the sleeve 112 can change the holding balls 110 into a state in which the holding balls 110 can be moved from the engagement position to the release position.

The sleeve 112 can move along the tool holder 97 from a block position, at which the holding balls 110 are blocked from moving outward in the radial direction, to a permission position, at which the holding balls 110 are permitted to move outward in the radial direction.

Disposing the sleeve 112 at the block position suppresses the holding balls 110 disposed at the engagement position from moving outward in the radial direction. That is, disposing the sleeve 112 at the block position blocks the holding balls 110 disposed at the engagement position from escaping from the engagement position. Disposing the sleeve 112 at the block position maintains a state in which the tool accessory is fixed by the holding balls 110.

Moving the sleeve 112 to the permission position permits the holding ball 110 disposed at the engagement position to move outward in the radial direction. The sleeve 112 is moved to the permission position, whereby the sleeve 112 changes the holding balls 110 into a state in which the holding balls 110 can be moved from the engagement position to the release position. That is, disposing the sleeve 112 at the permission position permits the holding balls 110 disposed at the engagement position to escape from the engagement position. Disposing the sleeve 112 at the permission position can release the state in which the tool accessory is fixed by the holding balls 110.

The coil spring 113 generates elastic force so that the sleeve 112 moves to the block position. The coil spring 113 is disposed around the tool holder 97. The block position is defined rearward of the permission position. The coil spring 113 generates elastic force that moves the sleeve 112 rearward.

The positioning member 114 is a ring-shaped member fixed to the outer surface of the tool holder 97. The positioning member 114 is fixed at a position where the positioning member 114 can face a rear end of the sleeve 112. The positioning member 114 positions the sleeve 112 at the block position. The sleeve 112 is positioned at the block position by coming into contact with the positioning member 114. The sleeve 112 receives elastic force that moves the sleeve 112 rearward from the coil spring 113.

Operation of Impact Tool

Next, operation of the impact tool 1 will be described. Each of FIGS. 23 to 32 is a cross-sectional view illustrating operation of the output assembly 4 according to the embodiment. Each of FIGS. 23, 25, 27, 29, and 31 corresponds to a cross-sectional arrow view of the output assembly 4 in FIG. 5 taken along line C-C. Each of FIGS. 24, 26, 28, 30, and 32 corresponds to a cross-sectional arrow view of the output assembly 4 in FIG. 5 taken along line G-G.

In the embodiment, the spindle projections 69 include the first spindle projection 691 and the second spindle projection 692 as described above. The hammer projections 84 include the first hammer projection 841 and the second hammer projection 842 as described above. The movable anvils 33 include the first movable anvil 331 and the second movable anvil 332 as described above.

When screw fastening operation is performed on an operation target, a tool accessory (driver bit) used for the screw fastening operation is inserted into the tool hole 99 of the tool holding shaft 31. The tool accessory inserted into the tool hole 99 is held by the tool holding mechanism 34. After the tool accessory is mounted on the tool holding shaft 31, an operator grips the grip 18 with, for example, the right hand, and performs pulling operation on the trigger lever 9 with the index finger of the right hand. When the pulling operation is performed on the trigger lever 9, power is supplied from the battery pack 20 to the motor 6. The motor 6 is started (activated), and the light is turned on. The rotor shaft 42 of the rotor 36 rotates in response to start of the motor 6. When the rotor shaft 42 rotates, rotational force of the rotor shaft 42 is transmitted to the planetary gears 58 via the pinion gear 48. The planetary gears 58 revolve around the pinion gear 48 while rotating in a state of meshing with the internal teeth of the internal gear 60. The planetary gears 58 are rotatably supported by the spindle 26 via the pins 59. Owing to the revolving of the planetary gears 58, the spindle 26 rotates at a rotational speed that is lower than that of the rotor shaft 42.

In the screw fastening operation, the tool holding shaft 31 rotates in the forward rotation direction. In the screw fastening operation, a load in the reverse rotation direction is applied to the tool holding shaft 31.

Figure 23:
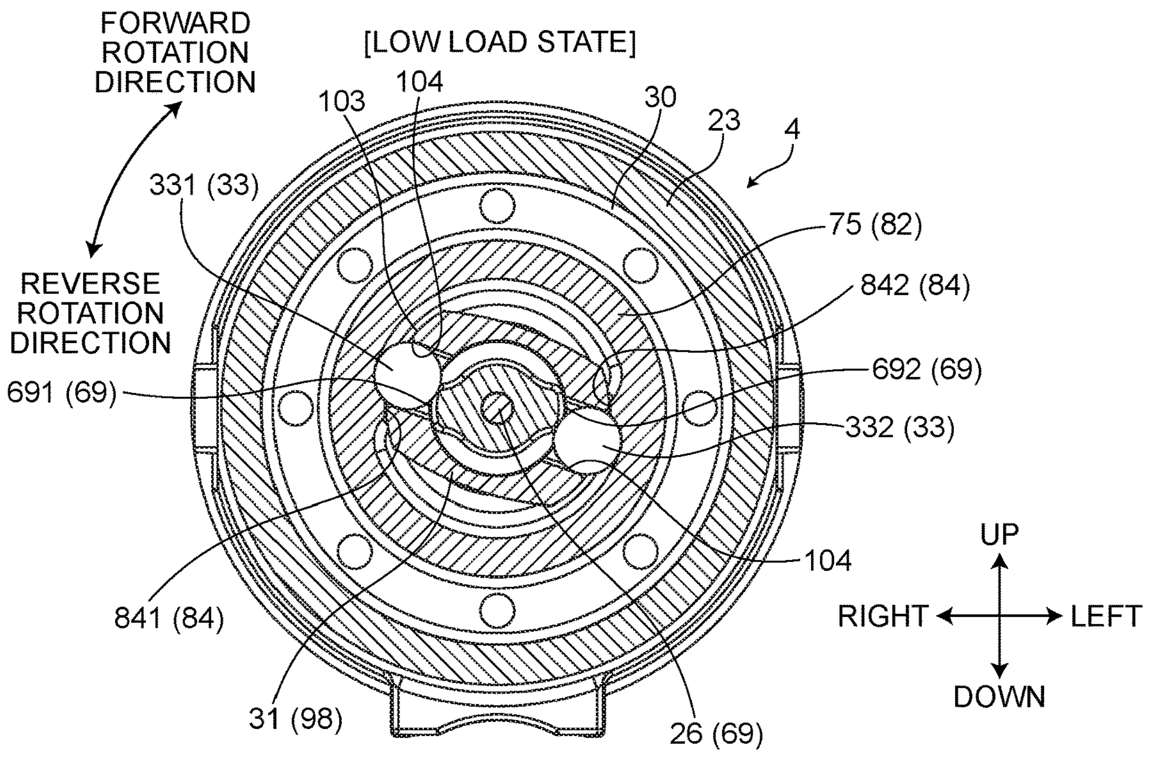
FIG. 23 is a cross-sectional view illustrating operation of the output assembly according to the first embodiment.
Figure 24:
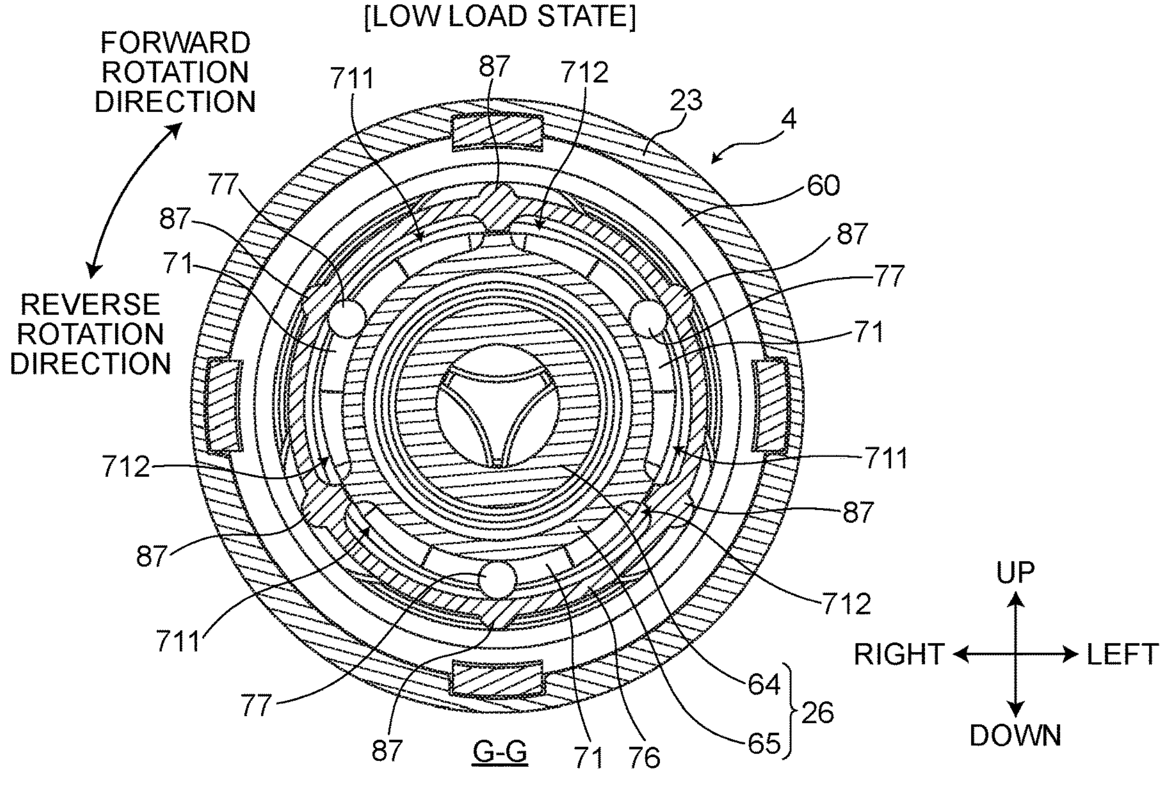
FIG. 24 is a cross-sectional view illustrating the operation of the output assembly according to the first embodiment.

FIGS. 23 and 24 are cross-sectional views of the output assembly 4 in a low load state in which rotation is made with a low load being applied on the tool holding shaft 31.

As illustrated in FIG. 23, in the low load state, the spindle projections 69 are in contact with the movable anvils 33, and the movable anvils 33 are in contact with the hammer projections 84.

In the low load state, the movable anvils 33 move outward in the radial direction owing to the contact with the spindle projections 69. At least a part of each of the movable anvils 33 is positioned radially outside with respect to the outer circumferential surface of the anvil portion 98. Since at least a part of each of the movable anvils 33 is positioned radially outside with respect to the outer circumferential surface of the anvil portion 98, each of the hammer projections 84 is in contact with at least a part of the corresponding movable anvil 33 in the low load state.

In the low load state, the movable anvil 33 cannot pass between the spindle projection 69 and the hammer projection 84 due to a wedge effect of the movable anvil 33, and the relative rotation of the spindle 26, the hammer 75, and the tool holding shaft 31 is blocked. The tool holding shaft 31 rotates together with the hammer 75 and the spindle 26 via the movable anvils 33.

The cam ring 76 is coupled to the hammer 75 via the guide grooves 86 and the cam slide portions 87. The cam ring 76 is pressed against the flange 65 of the spindle 26 by elastic force of the elastic member 78. Therefore, in the low load state in which the hammer 75 and the spindle 26 do not relatively rotate, the cam ring 76 rotates together with the spindle 26 and the hammer 75. That is, in the low load state, the spindle 26, the hammer 75, the tool holding shaft 31, and the cam ring 76 rotate together.

As illustrated in FIG. 24, in the low load state, the cam ring 76 and the spindle 26 rotate together in a state in which each of the balls 77 is disposed at the central portion (boundary between first portion 711 and second portion 712) of the spindle groove 71. In the low load state, the cam ring 76 is disposed at the rear end of the rear outer cylindrical portion 81 of the hammer 75 in the axial direction.

Figure 25:
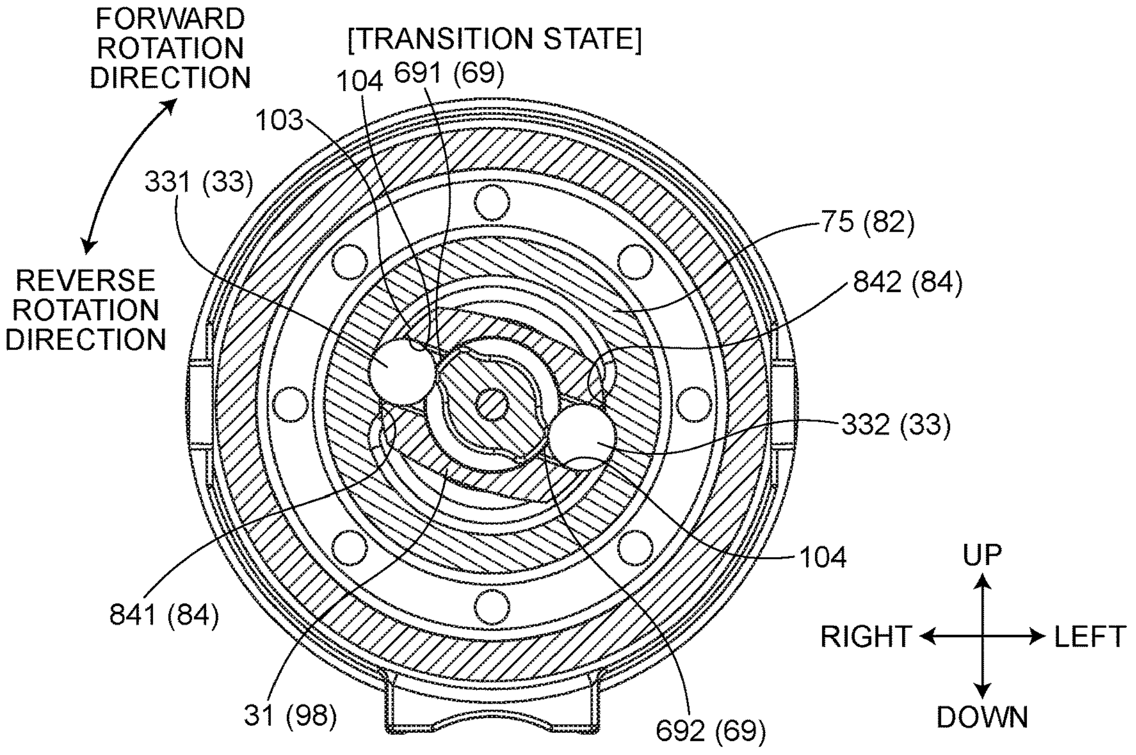
FIG. 25 is a cross-sectional view illustrating the operation of the output assembly according to the first embodiment.
Figure 26:
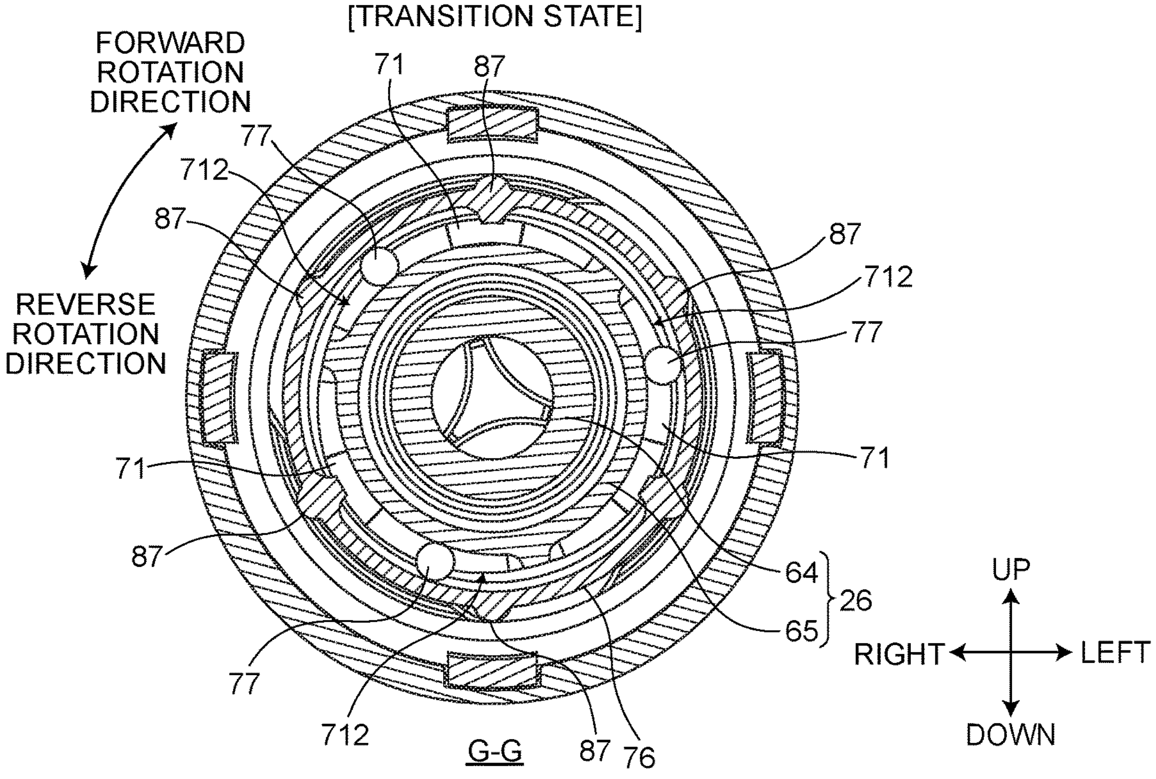
FIG. 26 is a cross-sectional view illustrating the operation of the output assembly according to the first embodiment.

FIGS. 25 and 26 are cross-sectional views of the output assembly 4 in a transition state immediately after the load applied to the tool holding shaft 31 transitions from the low load state to a high load state.

When the load applied to the tool holding shaft 31 increases due to the progress of the screw fastening operation, the rotational speed of the tool holding shaft 31 decreases. Since the hammer 75 is coupled to the tool holding shaft 31 via the movable anvil 33, the rotational speed of the hammer 75 also decreases as the rotational speed of the tool holding shaft 31 decreases. Since the cam ring 76 is coupled to the hammer 75 via the guide grooves 86 and the cam slide portions 87, the rotational speed of the cam ring 76 also decreases as the rotational speed of the hammer 75 decreases. In contrast, since the spindle 26 is rotated by the rotational force of the motor 6, the rotational speed of the spindle 26 does not decrease.

Although the rotational speed of the spindle 26 does not decrease, the rotational speeds of the tool holding shaft 31, the hammer 75, and the cam ring 76 decrease, so that the relative rotation of the tool holding shaft 31, the hammer 75, the cam ring 76 and the spindle 26 is started. The tool holding shaft 31, the hammer 75, and the cam ring 76 rotate together.

As illustrated in FIG. 25, when a transition is made from the low load state to the high load state, the spindle projections 69 are moved away from the movable anvils 33 by the relative rotation of the tool holding shaft 31, the hammer 75, and the spindle 26.

Since the cam ring 76 is coupled to the hammer 75 via the guide grooves 86 and the cam slide portions 87, the rotational speed of the cam ring 76 also decreases as the rotational speed of the hammer 75 decreases. The rotational speed of the spindle 26 does not decrease. When the rotation of the spindle 26 is continued in a state in which the rotational speed of the cam ring 76 decreases, the balls 77 thus move in the spindle grooves 71 and the cam grooves 88.

As illustrated in FIG. 26, when a transition is made from the low load state to the high load state, each of the balls 77 moves through the second portion 712 from the central portion toward an end of the spindle groove 71. The cam ring 76 receives force from the balls 77, and moves forward. The cam ring 76 moves forward while being guided by the guide grooves 86. The cam ring 76 moves forward against the elastic force of the elastic member 78.

As described above, when the tool holding shaft 31 transitions from the low load state to the high load state; the flange 65 and the cam ring 76 start relative rotation due to a decrease in rotational speed of the cam ring 76 in a state in which the flange 65 of the spindle 26 and the cam ring 76 rotate together in the forward rotation direction, and each of the balls 77 moves through the second portion 712 from the central portion of the spindle groove 71 toward an end of the second portion 712 on the other side in the circumferential direction, so that the cam ring 76 receives force from the balls 77 and moves forward.

Figure 27:
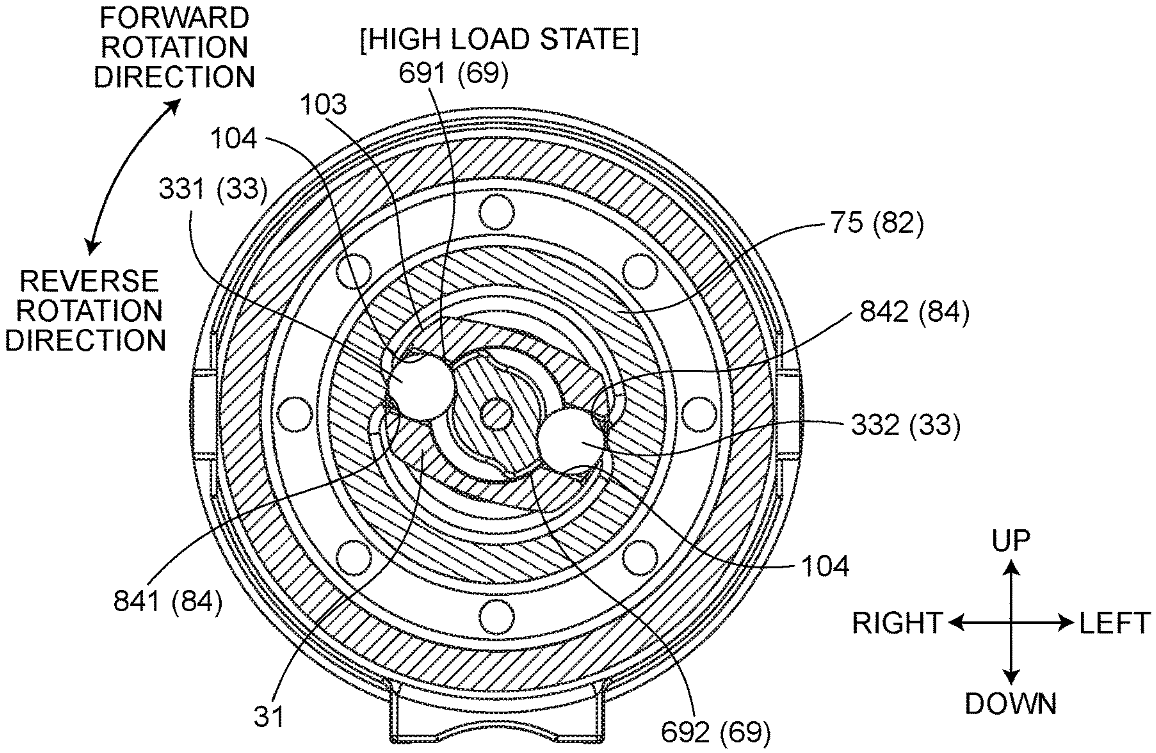
FIG. 27 is a cross-sectional view illustrating the operation of the output assembly according to the first embodiment.
Figure 28:
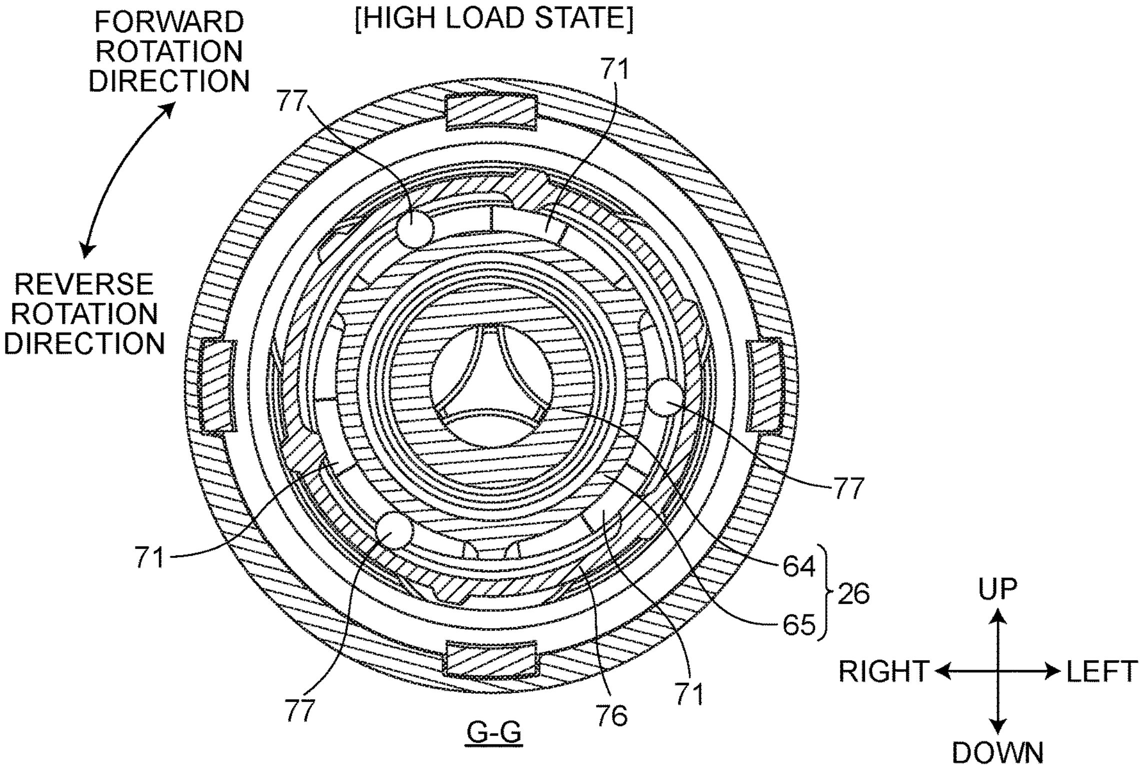
FIG. 28 is a cross-sectional view illustrating the operation of the output assembly according to the first embodiment.

FIGS. 27 and 28 are cross-sectional views of the output assembly 4 in the high load state after a predetermined time has elapsed since a transition was made from the low load state to the high load state.

Owing to continuation of the high load state, rotation of each of the tool holding shaft 31, the hammer 75, and the cam ring 76 is stopped. Even when the rotation of each of the tool holding shaft 31, the hammer 75, and the cam ring 76 is stopped, the spindle 26 continues to rotate by the rotational force of the motor 6.

When the tool holding shaft 31 is in the high load state, the rotation of the spindle 26 is continued in a state in which the rotation of each of the tool holding shaft 31, the hammer 75, and the cam ring 76 is stopped. The cam ring 76 receives force from the balls 77, and moves forward against the elastic force of the elastic member 78.

As illustrated in FIG. 27, the rotation of the spindle 26 is continued in a state in which the rotation of each of the tool holding shaft 31, the hammer 75, and the cam ring 76 is stopped, so that the spindle projections 69 are moved further away from the movable anvil 33 in the rotation direction. The spindle projections 69 are moved away from the movable anvils 33, whereby the movable anvils 33 come into a state in which the movable anvils 33 can move radially inward. The movable anvils 33 move radially inward from the outer circumferential surface 103 of the anvil portion 98, so that the hammer projections 84 are moved away from the movable anvils 33. That is, the lock on the hammer 75 set by the movable anvils 33 is released, and the hammer 75 comes into a state in which the hammer 75 can rotate with respect to the spindle 26.

The lock on the hammer 75 is released, whereby the cam ring 76 also comes into a state in which the cam ring 76 can rotate with respect to the spindle 26. The cam ring 76 is moved rearward with respect to the hammer 75 by the elastic force of the elastic member 78. The cam ring 76 moves rearward while being guided by the guide grooves 86. The cam ring 76 can rotate with respect to the spindle 26. Thus, the cam ring 76 moves rearward, so that the cam ring 76 receives force from the balls 77, and rotates in the forward rotation direction. That is, the cam ring 76 rotates in the forward rotation direction while moving rearward. Each of the balls 77 moves through the second portion 712 from the end toward the central portion of the spindle groove 71. The hammer 75 is coupled to the cam ring 76 via the cam slide portions 87 and the guide grooves 86. Thus, the cam ring 76 rotates in the forward rotation direction, whereby the hammer 75 also rotates in the forward rotation direction.

As described above, when the cam ring 76 receives elastic force from the elastic member 78 so as to move rearward after the lock on the hammer 75 is released, each of the balls 77 moves through the second portion 712 from the end of the second portion 712 on the other side in the circumferential direction toward the central portion of the spindle groove 71, so that the cam ring 76 receives force from the balls 77, and moves rearward while rotating relative to the flange 65.

Figure 29:
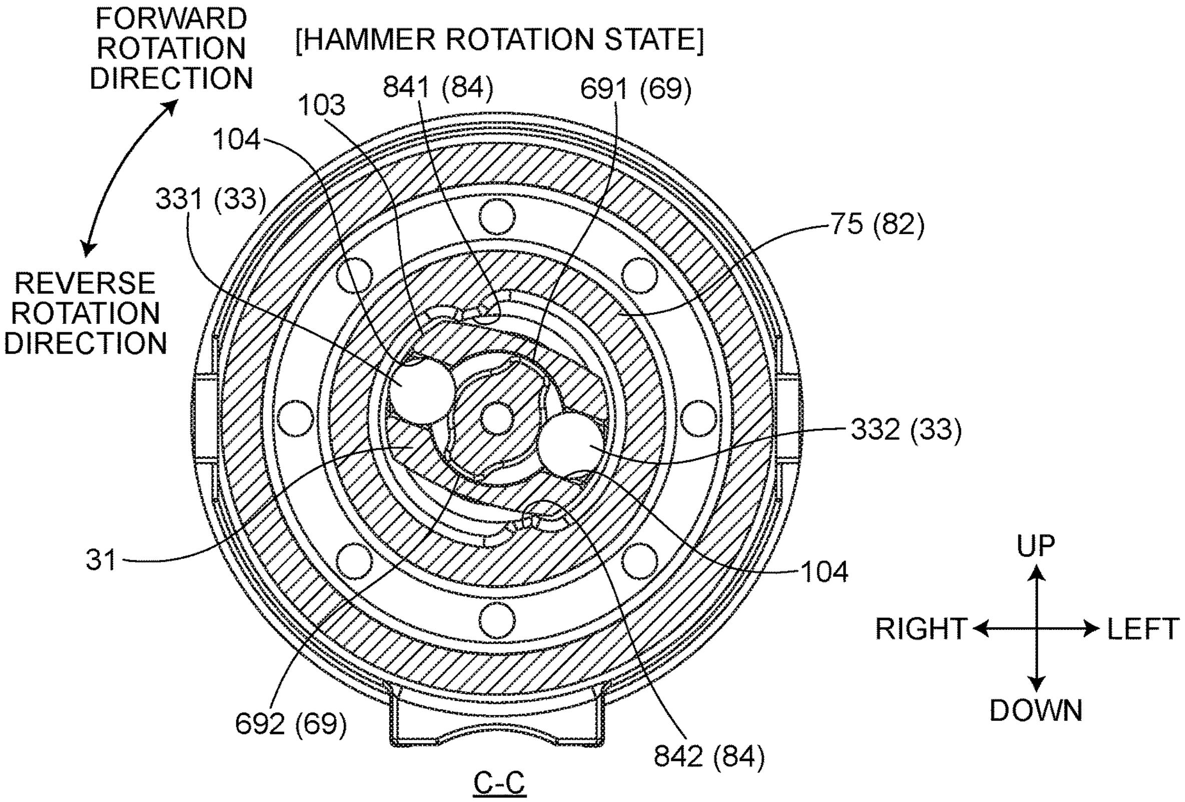
FIG. 29 is a cross-sectional view illustrating the operation of the output assembly according to the first embodiment.
Figure 30:
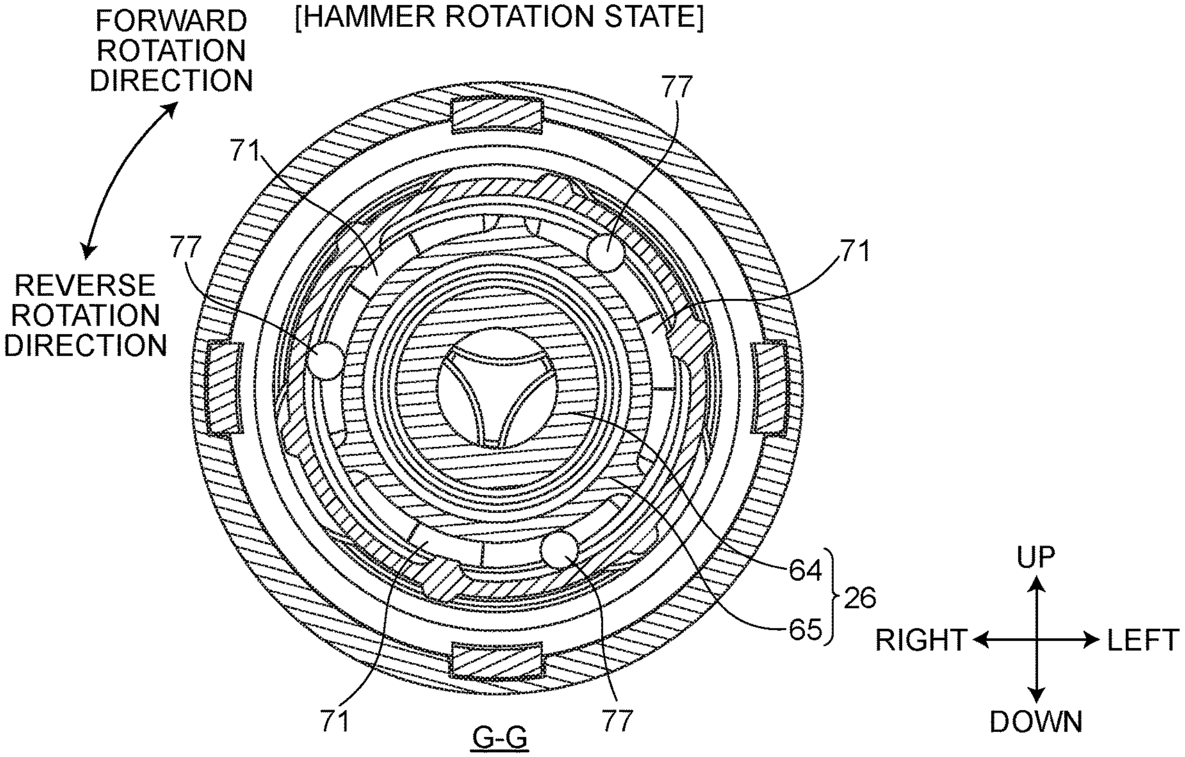
FIG. 30 is a cross-sectional view illustrating the operation of the output assembly according to the first embodiment.

FIGS. 29 and 30 are cross-sectional views of the output assembly 4 in a hammer rotation state in which the hammer 75 is rotating to impact the movable anvils 33.

As illustrated in FIG. 29, in the rotation state of the hammer 75, the spindle 26 is rotated in the forward rotation direction by the rotational force of the motor 6. The hammer 75 rotates in the forward rotation direction together with the cam ring 76 that is rotated by the elastic force of the elastic member 78. The spindle 26 rotates such that the first spindle projection 691 that is away from the first movable anvil 331 approaches the second movable anvil 332 and the second spindle projection 692 that is away from the second movable anvil 332 approaches the first movable anvil 331. The hammer 75 rotates such that the first hammer projection 841 that is away from the first movable anvil 331 approaches the second movable anvil 332 and the second hammer projection 842 that is away from the second movable anvil 332 approaches the first movable anvil 331.

The first hammer projection 841 pivots around the spindle 26 in the forward rotation direction as if to follow the first spindle projection 691. The first spindle projection 691 reaches the second movable anvil 332 earlier than the first hammer projection 841. The second hammer projection 842 pivots around the spindle 26 in the forward rotation direction as if to follow the second spindle projection 692. The second spindle projection 692 reaches the first movable anvil 331 earlier than the second hammer projection 842.

Figure 31:
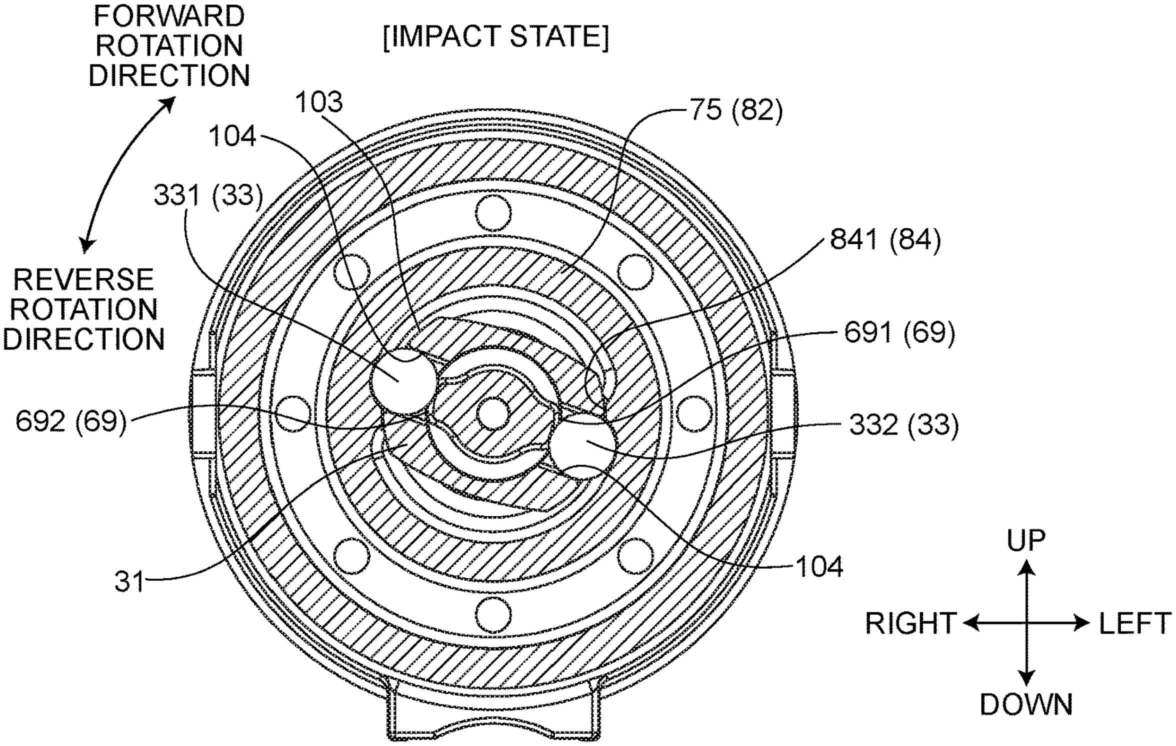
FIG. 31 is a cross-sectional view illustrating the operation of the output assembly according to the first embodiment.
Figure 32:
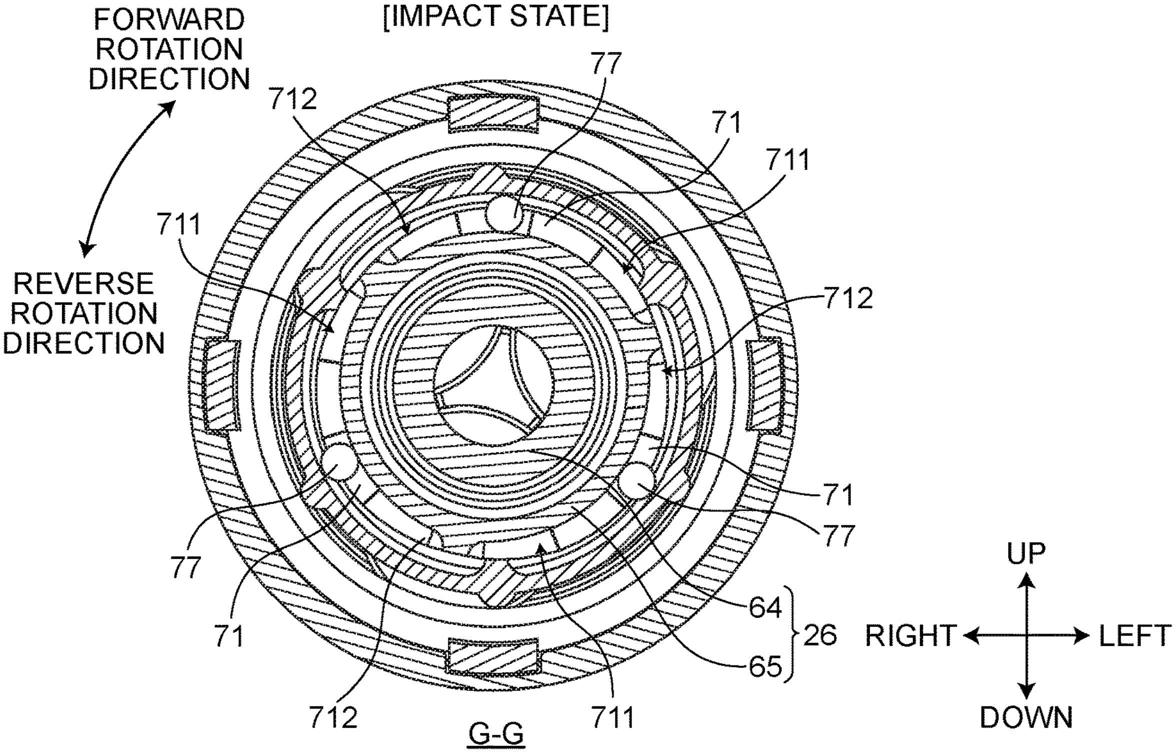
FIG. 32 is a cross-sectional view illustrating the operation of the output assembly according to the first embodiment.

FIGS. 31 and 32 are cross-sectional views of the output assembly 4 in an impact state in which the hammer 75 is impacting the movable anvil 33.

As described above, the first spindle projection 691 reaches the second movable anvil 332 earlier than the first hammer projection 841. The first spindle projection 691 comes into contact with the second movable anvil 332. The second movable anvil 332 moves radially outward owing to the contact with the first spindle projection 691. At least a part of the second movable anvil 332 is positioned radially outside with respect to the outer circumferential surface 103 of the anvil portion 98.

The first hammer projection 841 reaches the second movable anvil 332 after the first spindle projection 691 reaches the second movable anvil 332. That is, the first hammer projection 841 reaches the second movable anvil 332 after the second movable anvil 332 moves radially outward. The first hammer projection 841 impacts, in the rotation direction, the second movable anvil 332 disposed radially outside with respect to the outer circumferential surface 103 of the anvil portion 98. When the first hammer projection 841 impacts the second movable anvil 332, the position of the second movable anvil 332 in the radial direction is restricted by the first spindle projection 691, and the position of the second movable anvil 332 in the circumferential direction is restricted by the inner surface of the anvil hole 104. This enables the first hammer projection 841 to impact the second movable anvil 332.

The second spindle projection 692 reaches the first movable anvil 331 earlier than the second hammer projection 842. The first movable anvil 331 moves radially outward owing to the contact with the second spindle projection 692. The second hammer projection 842 reaches the first movable anvil 331 after the first movable anvil 331 moves radially outward. The second hammer projection 842 impacts, in the rotation direction, the first movable anvil 331 disposed radially outside with respect to the outer circumferential surface 103 of the anvil portion 98. When the second hammer projection 842 impacts the first movable anvil 331, the position of the first movable anvil 331 in the radial direction is restricted by the second spindle projection 692, and the position of the first movable anvil 331 in the circumferential direction is restricted by the inner surface of the anvil hole 104. This enables the second hammer projection 842 to impact the first movable anvil 331.

The first hammer projection 841 impacts the second movable anvil 332 substantially at the same time as the second hammer projection 842 impacts the first movable anvil 331. The hammer projection 84 impacts the movable anvil 33 in a state of the movable anvil 33 being disposed in the anvil hole 104 of the tool holding shaft 31. The hammer 75 impacts the tool holding shaft 31 in the rotation direction via the two movable anvils 33 (331, 332).

Since the tool holding shaft 31 is impacted (struck) in the rotation direction by the hammer 75, the tool holding shaft 31 rotates about the rotation axis AX with high torque. Therefore, a screw is fastened to an operation target with high torque.

As illustrated in FIG. 32, the cam ring 76 moves rearward, so that each of the balls 77 is disposed at the central portion (boundary between first portion 711 and second portion 712) of the spindle groove 71 in the impact state.

After the impact state ends, the output assembly 4 transitions from the impact state to the low load state.

As described with reference to FIGS. 23 to 32, in the embodiment, the spindle 26 makes a half rotation (180-degree rotation), so that the movable anvils 33 are impacted (struck) by the hammer projections 84. That is, in the embodiment, the movable anvils 33 are impacted twice by the hammer projections 84 while the spindle 26 rotates once. Alternatively, the movable anvils 33 may be impacted by the hammer projections 84 once while the spindle 26 rotates once. When the movable anvils 33 are impacted by the hammer projections 84 once while the spindle 26 rotates once, the hammer projections 84 can impact the movable anvils 33 at a higher rotational speed and higher inertial force than those in a case where the movable anvils 33 are impacted twice. That is, when the hammer projections 84 impacts the movable anvils 33 once while the spindle 26 rotates once, the hammer 75 can impact the movable anvils 33 at higher impact energy than that in a case where the movable anvils 33 are impacted twice. The number of times the hammer projections 84 impact the movable anvils 33 while the spindle 26 rotates once can be adjusted by adjusting one or both of elastic energy (spring constant) of the elastic member 78 and the rotational speed of the spindle 26. Furthermore, due to deformability of the elastic member 78, the timing when the hammer projections 84 start to impact the movable anvils 33 is accelerated. This makes it possible to suppress, as a secondary effect, the occurrence of a cam-out phenomenon in which a tip of a tool accessory slips out of a tool hole (cross hole) of a screw in screw fastening operation.

In the embodiment, two movable anvils 33 are provided, and two hammer projections 84 are provided. Three movable anvils 33 may be provided, and three hammer projections 84 may be provided. Four movable anvils 33 may be provided, and four hammer projections 84 may be provided. Any plural number of five or more movable anvils 33 and hammer projections 84 may be provided.

FIGS. 23 to 32 illustrate examples in which the spindle 26, the cam ring 76, the hammer 75, and the tool holding shaft 31 rotate in the forward rotation direction for screw fastening operation. When performing screw loosening operation, an operator operates the forward/reverse rotation switching lever 10 to rotate the spindle 26, the cam ring 76, the hammer 75, and the tool holding shaft 31 in the reverse rotation direction. In the screw loosening operation, when the tool holding shaft 31 comes into the high load state; the flange 65 and the cam ring 76 start relative rotation due to a decrease in rotational speed of the cam ring 76 in a state in which the flange 65 of the spindle 26 and the cam ring 76 rotate together in the reverse rotation direction, and the balls 77 moves through the first portion 711 from the central portion of the spindle groove 71 toward an end of the first portion 711 on one side in the circumferential direction, so that the cam ring 76 receives force from the balls 77 and moves forward. After the lock on the hammer 75 is released, when the cam ring 76 receives elastic force from the elastic member 78 so as to move rearward, each of the balls 77 moves through the first portion 711 from the end of the first portion 711 on one side in the circumferential direction toward the central portion of the spindle groove 71, so that the cam ring 76 receives force from the balls 77 and moves rearward while rotating relative to the flange 65.

Effects

As described above, in the present embodiment, the impact tool 1 may include the motor 6, the spindle 26 that is rotated by the rotational force of the motor 6, the tool holding shaft 31 at least a part of which is disposed forward of the spindle 26, the movable anvil 33 that is movably supported by the tool holding shaft 31, and the hammer 75 that is supported by the spindle 26 and impacts the movable anvil 33 in the rotation direction without being displaced in the axial direction.

According to the above configuration, since the movable anvil 33 movably supported by the tool holding shaft 31 is provided, the hammer 75 can impact the movable anvil 33 in the rotation direction without being displaced in the axial direction. Since the hammer 75 is not displaced in the axial direction, the occurrence of vibration in the axial direction is suppressed in the impact tool 1.

In the present embodiment, the movable anvil 33 may move only in the radial direction.

According to the above configuration, complication of the structure of the impact tool 1 is suppressed, and the hammer 75 can impact the movable anvil 33 in the rotation direction without being displaced in the axial direction.

In the present embodiment, the movable anvil 33 may move so as to change between the first state in which at least a part of the movable anvil 33 protrudes radially outward from the outer circumferential surface of the tool holding shaft 31 and the second state in which the movable anvil 33 is positioned radially inside with respect to the outer circumferential surface of the tool holding shaft 31.

According to the above configuration, the hammer 75 can impact the movable anvil 33 in the rotation direction without being displaced in the axial direction.

In the present embodiment, the hammer 75 may impact the movable anvil 33 in the first state and rotate around the spindle 26 in the second state.

According to the above configuration, the hammer 75 can impact the movable anvil 33 in the rotation direction without being displaced in the axial direction.

In the present embodiment, the tool holding shaft 31 may have the recess 100 recessed forward from the rear end surface of the tool holding shaft 31. The spindle 26 may have the spindle projection 69 protruding radially outward from the front end portion of the outer circumferential surface of the spindle 26. The front end of the spindle 26 including the spindle projection 69 may be disposed in the recess 100, and the movable anvil 33 may change from the second state to the first state when the spindle projection 69 and the movable anvil 33 come into contact with each other in the rotation of the spindle 26.

According to the above configuration, the movable anvil 33 can move in the radial direction by the rotation of the spindle 26.

In the present embodiment, the tool holding shaft 31 may include the tool holder 97 that holds the tool accessory, and the anvil portion 98 disposed rearward of the tool holder 97. The recess 100 may be formed to be recessed forward from the rear end surface of the anvil portion 98. The movable anvil 33 may be movably supported by the anvil portion 98.

According to the above configuration, by the rotation of the spindle 26, the movable anvil 33 can move in the radial direction in a state of being supported by the anvil portion 98.

In the present embodiment, the recess 100 may be defined by the inner circumferential surface 101 of the anvil portion 98 and the facing surface 102 connected to the front end of the inner circumferential surface 101 of the anvil portion 98.

According to the above configuration, the front end of the spindle 26 is disposed in the recess 100 defined by the inner circumferential surface 101 and the facing surface 102 of the anvil portion 98.

In the present embodiment, the anvil portion 98 may have the anvil hole 104 penetrating the outer circumferential surface 103 of the anvil portion 98 and the inner circumferential surface 101 of the anvil portion 98. The movable anvil 33 may move in the radial direction while being guided by the anvil hole 104.

According to the above configuration, the movable anvil 33 can move smoothly in the radial direction.

In the present embodiment, the movable anvil 33 may have a columnar shape. The movable anvil 33 may be disposed in the anvil hole 104 such that the central axis of the movable anvil 33 and the rotation axis of the tool holding shaft 31 are parallel to each other.

According to the above configuration, the spindle 26 can smoothly rotate in a state in which the spindle projection 69 and the movable anvil 33 are in contact with each other.

In the present embodiment, the impact tool 1 may include the support ball 106 supported by the front end of the spindle 26. The support ball 106 may be in contact with the facing surface 102.

According to the above configuration, the spindle 26 and the tool holding shaft 31 can smoothly rotate relative to each other.

In the present embodiment, the support recess 105 having a hemispherical shape may be provided on the front end surface of the spindle 26, and the support ball 106 may be disposed in the support recess 105.

According to the above configuration, the support ball 106 is prevented from falling off from between the spindle 26 and the tool holding shaft 31.

In the present embodiment, the facing surface 102 may be a flat surface.

According to the above configuration, since the contact area between the support ball 106 and the facing surface 102 is reduced, the spindle 26 and the tool holding shaft 31 can smoothly rotate relative to each other.

In the present embodiment, the impact tool 1 may include the rotation ball 80 disposed between the spindle 26 and the hammer 75.

According to the above configuration, since the rotation ball 80 functions as the bearing of the hammer 75, the spindle 26 and the hammer 75 can smoothly rotate relative to each other.

In the present embodiment, the plurality of rotation balls 80 may be disposed around the rotation axis of the spindle 26.

According to the above configuration, the spindle 26 and the hammer 75 can smoothly rotate relative to each other.

In the present embodiment, the hammer 75 may include: the inner cylindrical portion 83 having the ball groove 85 in which the rotation ball 80 is disposed; the front outer cylindrical portion 82 disposed on the radially outside with respect to the inner cylindrical portion 83 and disposed forward of the inner cylindrical portion 83; and the hammer projection 84 protruding radially inward from the inner circumferential surface of the front outer cylindrical portion 82. The movable anvil 33 may be impacted by the hammer projection 84.

According to the above configuration, the movable anvil 33 is impacted in the rotation direction by the hammer projection 84.

In the present embodiment, the tool holding shaft 31 may include: the tool holder 97 that holds the tool accessory; the anvil portion 98 disposed rearward of the tool holder 97; the recess 100 recessed forward from the rear end surface of the anvil portion 98; and the anvil hole 104 which penetrates the outer circumferential surface of the anvil portion 98 and the inner circumferential surface 101 of the anvil portion 98 and in which the movable anvil 33 is disposed. The spindle 26 may include the spindle projection 69 protruding radially outward from the front end of the outer circumferential surface of the spindle 26. The front end of the spindle 26 including the spindle projection 69 may be disposed in the recess 100. The movable anvil 33 may change from the second state to the first state while being guided by the anvil hole 104, when the spindle projection 69 and the movable anvil 33 come into contact with each other in the rotation of the spindle 26. The hammer 75 may include: the inner cylindrical portion 83 supported by the spindle 26; the front outer cylindrical portion 82 disposed radially outside with respect to the inner cylindrical portion 83 and disposed forward of the inner cylindrical portion 83; and the hammer projection 84 protruding radially inward from the inner circumferential surface of the front outer cylindrical portion 82. The hammer may rotate around the spindle 26 in the first state, and impact the movable anvil 33 with the hammer projection 84 in the second state.

According to the above configuration, the hammer 75 can impact the movable anvil 33 in the rotation direction without being displaced in the axial direction.

In the present embodiment, in the low load state in which the load applied to the tool holding shaft 31 is low, the spindle projection 69 and the movable anvil 33 may come into contact with each other, the movable anvil 33 and the hammer projection 84 may come into contact with each other, and the tool holding shaft 31 may rotate together with the hammer 75 and the spindle 26 via the movable anvil 33 by the rotational force of the motor 6.

According to the above configuration, the spindle 26, the hammer 75, and the tool holding shaft 31 can rotate together in the low load state of the tool holding shaft 31.

In the present embodiment, in the high load state in which the load applied to the tool holding shaft 31 is high, the rotation of the spindle 26 may be continued in a state in which the rotation of each of the tool holding shaft 31 and the hammer 75 is stopped, the spindle projection 69 may be moved away from the movable anvil 33, the movable anvil 33 may move radially inward to release a lock on the hammer 75 set by the movable anvil 33.

According to the above configuration, the spindle 26, the hammer 75, and the tool holding shaft 31 can rotate relative to each other when the tool holding shaft 31 is in the high load state. After the spindle 26, the hammer 75, and the tool holding shaft 31 rotate relative to each other, the lock on the hammer 75 is released, and the hammer 75 becomes a rotatable state, so that the hammer 75 can impact the movable anvil 33.

In the present embodiment, after the lock on the hammer 75 is released, the spindle projection 69 may come into contact with the movable anvil 33, the movable anvil 33 may move radially outward, and the hammer projection 84 may impact the movable anvil 33.

According to the above configuration, after the lock on the hammer 75 is released and the hammer 75 is in a state capable of impacting the movable anvil 33, the movable anvil 33 is impacted by the hammer projection 84.

In the present embodiment, two movable anvils 33 may be provided. Two spindle projections 69 may be provided. Two hammer projections 84 may be provided. The hammer projection 84 may impact the movable anvils 33 twice while the spindle 26 rotates once.

According to the above configuration, the hammer projections 84 impact the movable anvils 33 twice while the spindle 26 rotates once.

In addition, in the present embodiment, the impact tool 1 may include: the motor 6; the spindle 26 having the spindle shaft 64 and the flange 65 provided at a rear portion of the spindle shaft 64 and that is rotated by the rotational force of the motor 6; the tool holding shaft 31 at least a part of which is disposed forward of the spindle 26; the hammer 75 that is supported by the spindle shaft 64 and that impacts the tool holding shaft 31 in the rotational direction; and the cam ring 76 that is coupled to the flange 65 via the ball 77 so as to be rotatable relative to the flange and coupled to the hammer 75 so as to be movable relative to the hammer in the axial direction but so as not to be rotatable relative to the hammer.

According to the above configuration, the cam ring 76 is coupled to the flange 65 of the spindle 26 via the ball 77 so as to be rotate relative to the flange. Furthermore, the cam ring 76 is coupled to the hammer 75 so as to be movable relative to the hammer in the axial direction but not to be rotatable relative to the hammer. As a result, the hammer 75 can impact the tool holding shaft 31 in the rotation direction in a state in which the increase in size of the impact tool 1 is suppressed. In particular, the axial length of the impact tool 1 is shortened. When the impact tool 1 includes the motor housing 17, the rear cover 3 disposed at the rear end portion of the motor housing 17, and the output assembly 4 disposed at the front portion of the motor housing 17; the axial length of the impact tool 1 refers to the distance in the axial direction between the rear end of the rear cover 3 and the front end of the output assembly 4.

In the present embodiment, the impact tool 1 may include the movable anvil 33 that is movably supported by the tool holding shaft 31. The hammer 75 may impact the movable anvil 33 in the rotation direction without being displaced in the axial direction.

According to the above configuration, since the hammer 75 is not displaced in the axial direction, the axial length is shortened. In addition, since the hammer 75 is not displaced in the axial direction, the occurrence of vibration in the axial direction is suppressed in the impact tool 1.

In the present embodiment, the movable anvil 33 may move so as to change between the first state in which at least a part of the movable anvil 33 protrudes radially outward from the outer circumferential surface of the tool holding shaft 31 and the second state in which the movable anvil 33 is positioned radially inside with respect to the outer circumferential surface of the tool holding shaft 31. The hammer 75 may impact the movable anvil 33 in the first state and rotate around the spindle shaft 64 in the second state.

According to the above configuration, the hammer 75 can impact the movable anvil 33 in the rotation direction without being displaced in the axial direction.

In the present embodiment, the ball 77 may be disposed between the spindle groove 71 provided in the flange 65 and the cam groove 88 provided in the cam ring 76.

According to the above configuration, the ball 77 can move so as to roll between the spindle groove 71 and the cam groove 88.

In the present embodiment, the plurality of spindle grooves 71 may be provided in the circumferential direction. The plurality of cam grooves 88 may be provided in the circumferential direction.

According to the above configuration, the flange 65 and the cam ring 76 can smoothly rotate relative to each other.

In the present embodiment, each of the spindle groove 71 and the cam groove 88 may have an arc shape. At least a part of the spindle groove 71 may be inclined rearward toward one side in the circumferential direction. At least a part of the cam groove 88 may be inclined rearward toward the one side in the circumferential direction.

According to the above configuration, when the flange 65 and the cam ring 76 rotate relative to each other, the cam ring 76 can move in the front-rear direction.

In the present embodiment, in the relative rotation between the flange 65 and the cam ring 76, the ball 77 may move toward the end of the spindle groove 71 on the one side in the circumferential direction, so that the cam ring 76 may move forward.

According to the above configuration, when the flange 65 and the cam ring 76 rotate relative to each other, the cam ring 76 can move forward.

In the present embodiment, the spindle groove 71 may include the first portion 711 inclined rearward from the central portion of the spindle groove 71 toward the end of the spindle groove 71 on the one side in the circumferential direction, and the second portion 712 inclined rearward from the central portion of the spindle groove 71 toward an end of the spindle groove 71 on the other side in the circumferential direction.

According to the above configuration, the cam ring 76 can move forward when moving while rotating in both the forward rotation direction and the reverse rotation direction.

In the present embodiment, when the flange 65 and the cam ring 76 start the relative rotation due to a decrease in the rotational speed of the cam ring 76 in a state in which the flange 65 and the cam ring 76 rotate together in the forward rotation direction, the ball 77 may move through the second portion 712 toward the end of the second portion 712 on the other side in the circumferential direction, so that the cam ring 76 may move forward. When the flange 65 and the cam ring 76 start relative rotation due to a decrease in the rotational speed of the cam ring 76 in a state where the flange 65 and the cam ring 76 rotate together in the reverse rotation direction, the ball 77 may move the first portion 711 toward the end of the first portion 711 on the one side in the circumferential direction of the first portion 711, whereby the cam ring 76 may move forward.

According to the above configuration, the cam ring 76 can move forward when moving while rotating in both the forward rotation direction and the reverse rotation direction.

In the present embodiment, the hammer 75 may have the guide portion that guides the cam ring 76 in the axial direction.

According to the above configuration, the cam ring 76 can smoothly move relative to the hammer 75 in the axial direction.

In the present embodiment, the cam ring 76 may have the cam slide portion 87 protruding radially outward from the outer circumferential surface of the cam ring 76. The guide portion may include the guide groove 86 which is provided on the inner circumferential surface of the hammer 75 and in which the cam slide portion 87 is disposed.

According to the above configuration, the cam ring 76 can smoothly move relative to the hammer 75 in the axial direction.

In the present embodiment, the hammer 75 may include: the inner cylindrical portion 83 supported by the spindle 26; the front outer cylindrical portion 82 disposed on radially outside with respect to the inner cylindrical portion 83 and disposed forward of the inner cylindrical portion 83; and the rear outer cylindrical portion 81 disposed radially outside with respect to the inner cylindrical portion 83 and disposed rearward of the front outer cylindrical portion 82. The guide groove 86 may be provided to extend in the axial direction on the inner circumferential surface of the rear outer cylindrical portion 81.

According to the above configuration, the cam ring 76 can smoothly move relative to the hammer 75 in the axial direction.

In the present embodiment, the guide groove 86 may be provided so as to extend forward from the rear end portion of the rear outer cylindrical portion 81.

According to the above configuration, the cam ring 76 can smoothly move relative to the hammer 75 in the axial direction.

In the present embodiment, the plurality of guide grooves 86 may be provided at intervals around the rotation axis of the hammer 75.

According to the above configuration, the cam ring 76 can smoothly move relative to the hammer 75 in the axial direction.

In the present embodiment, the plurality of cam slides 87 may be provided at intervals around the rotation axis of the cam ring 76. One cam slide 87 may be disposed in one guide groove 86.

According to the above configuration, the cam ring 76 can smoothly move relative to the hammer 75 in the axial direction.

In the present embodiment, the impact tool 1 may include: the elastic member 78 disposed between the front surface of the cam ring 76 and the support surface of the hammer 75 disposed forward of the cam ring 76 in the axial direction. The elastic member 78 may generate the elastic force that moves the cam ring 76 rearward.

According to the above configuration, the cam ring 76 can move rearward by the elastic force of the elastic member 78.

In the present embodiment, the tool holding shaft 31 may include: the tool holder 97 that holds the tool accessory; the anvil portion 98 disposed rearward of the tool holder 97; the recess 100 recessed forward from the rear end surface of the anvil portion 98; and the anvil hole 104 which penetrates the outer circumferential surface 103 of the anvil portion 98 and the inner circumferential surface 101 of the anvil portion 98 and in which the movable anvil 33 is disposed. The spindle 26 may include the spindle projection 69 protruding radially outward from the front end portion of the outer circumferential surface of the spindle 26. The front end of the spindle 26 including the spindle projection 69 may be disposed in the recess 100. The movable anvil 33 may change from the second state to the first state while being guided by the anvil hole 104, when the spindle projection 69 and the movable anvil 33 come into contact with each other in the rotation of the spindle 26. The hammer 75 may include: the inner cylindrical portion 83 supported by the spindle 26; the front outer cylindrical portion 82 disposed radially outside with respect to the inner cylindrical portion 83 and disposed forward of the inner cylindrical portion 83; and the hammer projection 84 protruding radially inward from the inner circumferential surface of the front outer cylindrical portion 82. The hammer 75 may rotate around the spindle 26 in the first state and impact the movable anvil 33 with the hammer projection 84 in the second state.

According to the above configuration, the hammer 75 can impact the movable anvil 33 in the rotation direction without being displaced in the axial direction.

In the present embodiment, in the low load state in which the load applied to the tool holding shaft 31 is low, the spindle projection 69 and the movable anvil 33 may come into contact with each other, the movable anvil 33 and the hammer projection 84 may come into contact with each other, and the tool holding shaft 31 may rotate together with the hammer 75 and the spindle 26 via the movable anvil 33 by the rotational force of the motor 6.

According to the above configuration, the spindle 26, the hammer 75, and the tool holding shaft 31 can rotate together in the low load state of the tool holding shaft 31.

In the present embodiment, in the high load state in which the load applied to the tool holding shaft 31 is high, the rotation of the spindle 26 may be continued in a state in which the rotation of each of the tool holding shaft 31, the hammer 75, and the cam ring 76 is stopped. The cam ring 76 may receive a force from the ball 77 and move forward against the elastic force of the elastic member 78. The spindle projection 69 may be moved away from the movable anvil 33, the movable anvil 33 may move radially inward to release a lock on the hammer 75 set by the movable anvil 33.

According to the above configuration, the spindle 26, the hammer 75, and the tool holding shaft 31 can rotate relative to each other when the tool holding shaft 31 is in the high load state. After the spindle 26, the hammer 75, and the tool holding shaft 31 rotate relative to each other, the lock on the hammer 75 is released, and the hammer 75 becomes a rotatable state, so that the hammer 75 can impact the movable anvil 33.

In the present embodiment, after the lock on the hammer 75 is released, the spindle projection 69 may come into contact with the movable anvil 33, and the movable anvil 33 may move radially outward. The cam ring 76 may rotate while moving rearward by the elastic force of the elastic member 78. The hammer 75 may rotate by the rotation of the cam ring 76 to impact the movable anvil 33 in the rotation direction by the hammer projection 84.

According to the above configuration, after the lock on the hammer 75 is released and the hammer 75 is in a state capable of impacting the movable anvil 33, the movable anvil 33 is impacted by the hammer projection 84.

Second Embodiment

A second embodiment will be described. In the following description, the same or equivalent components as those of the above-described embodiment are denoted by the same reference numerals, and the description of the components is simplified or omitted.

Output Assembly

Figure 33:
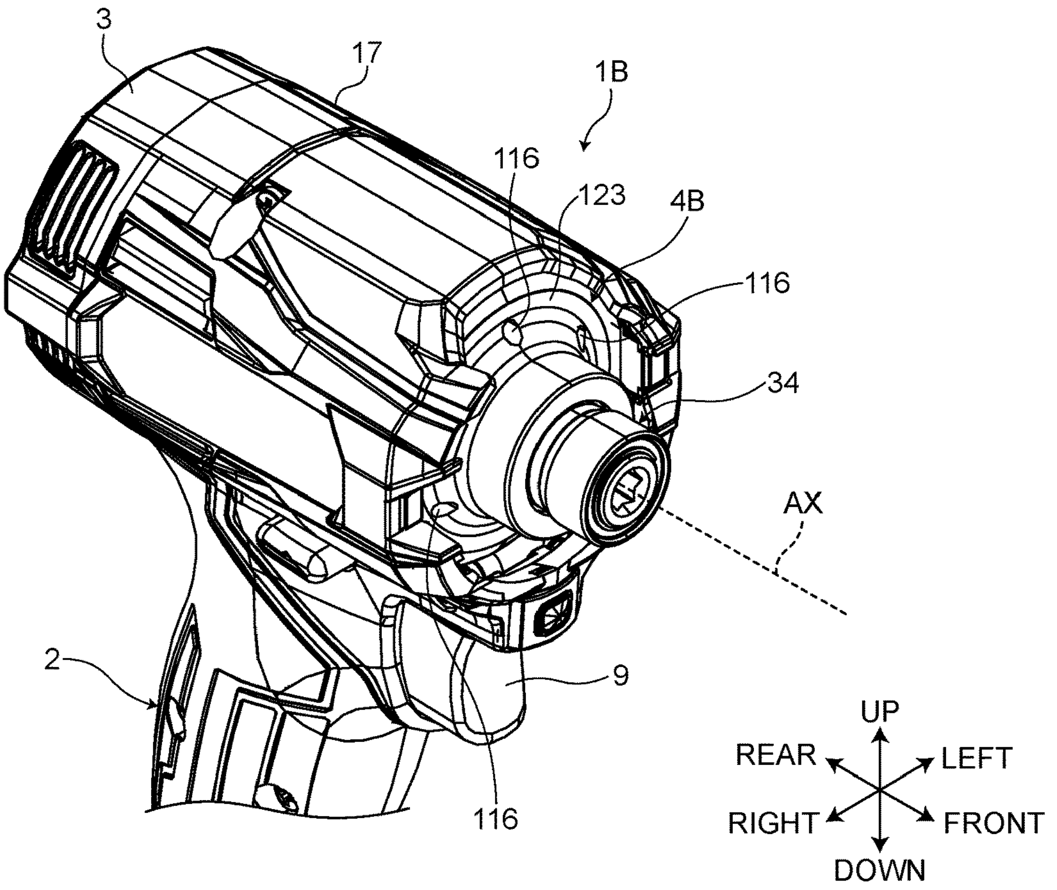
FIG. 33 is an oblique view, viewed from the front, which illustrates a part of an impact tool according to a second embodiment.
Figure 34:
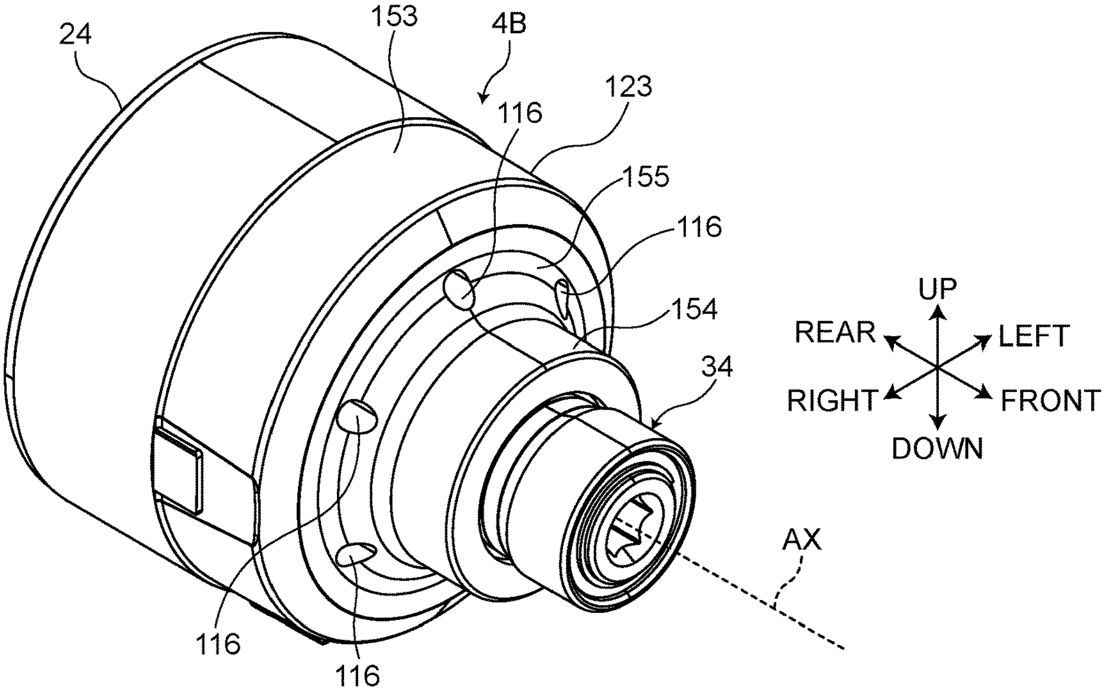
FIG. 34 is an oblique view, viewed from the front, which illustrates an output assembly according to the second embodiment.
Figure 35:
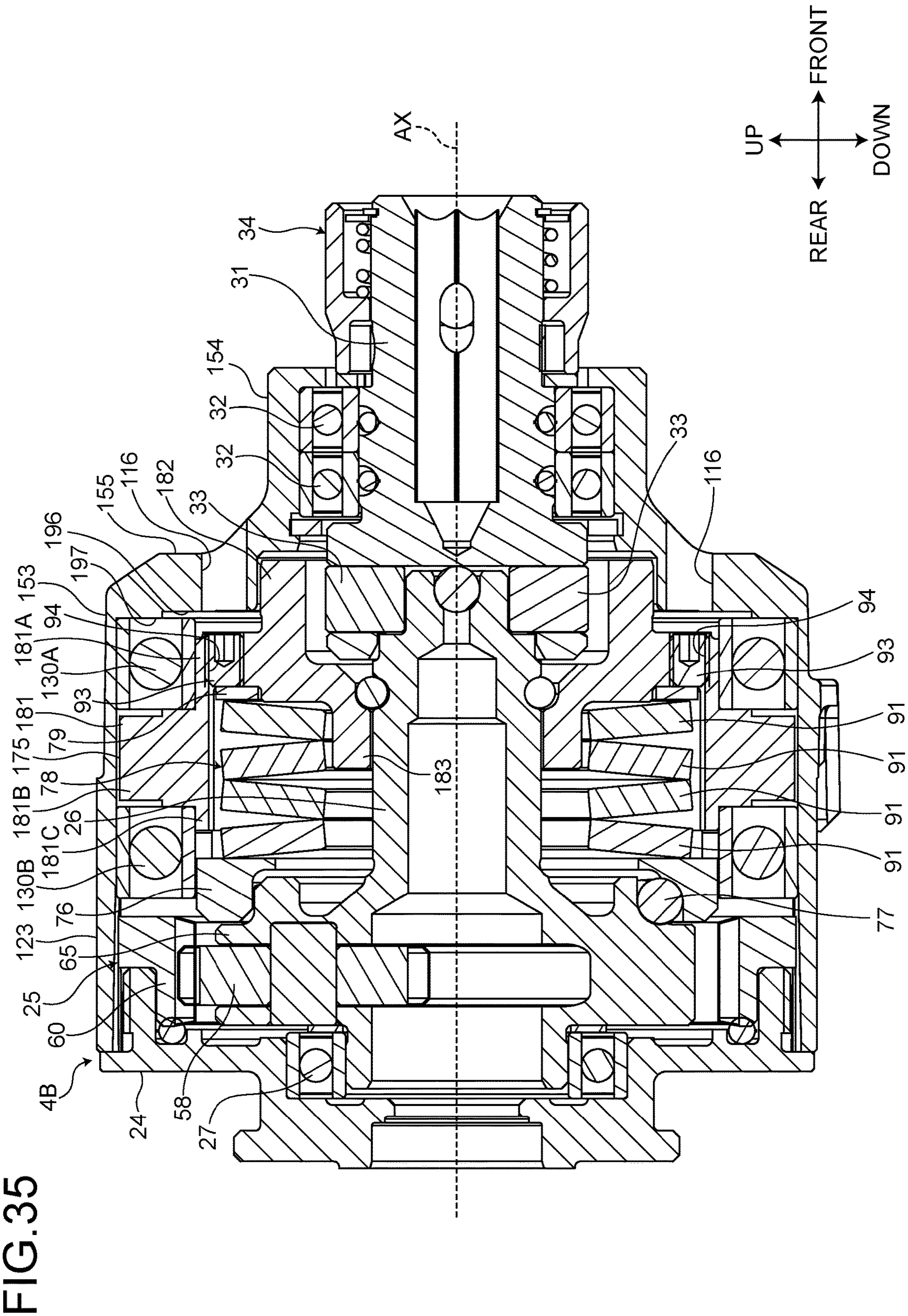
FIG. 35 is a longitudinal sectional view illustrating the output assembly according to the second embodiment.
Figure 36:
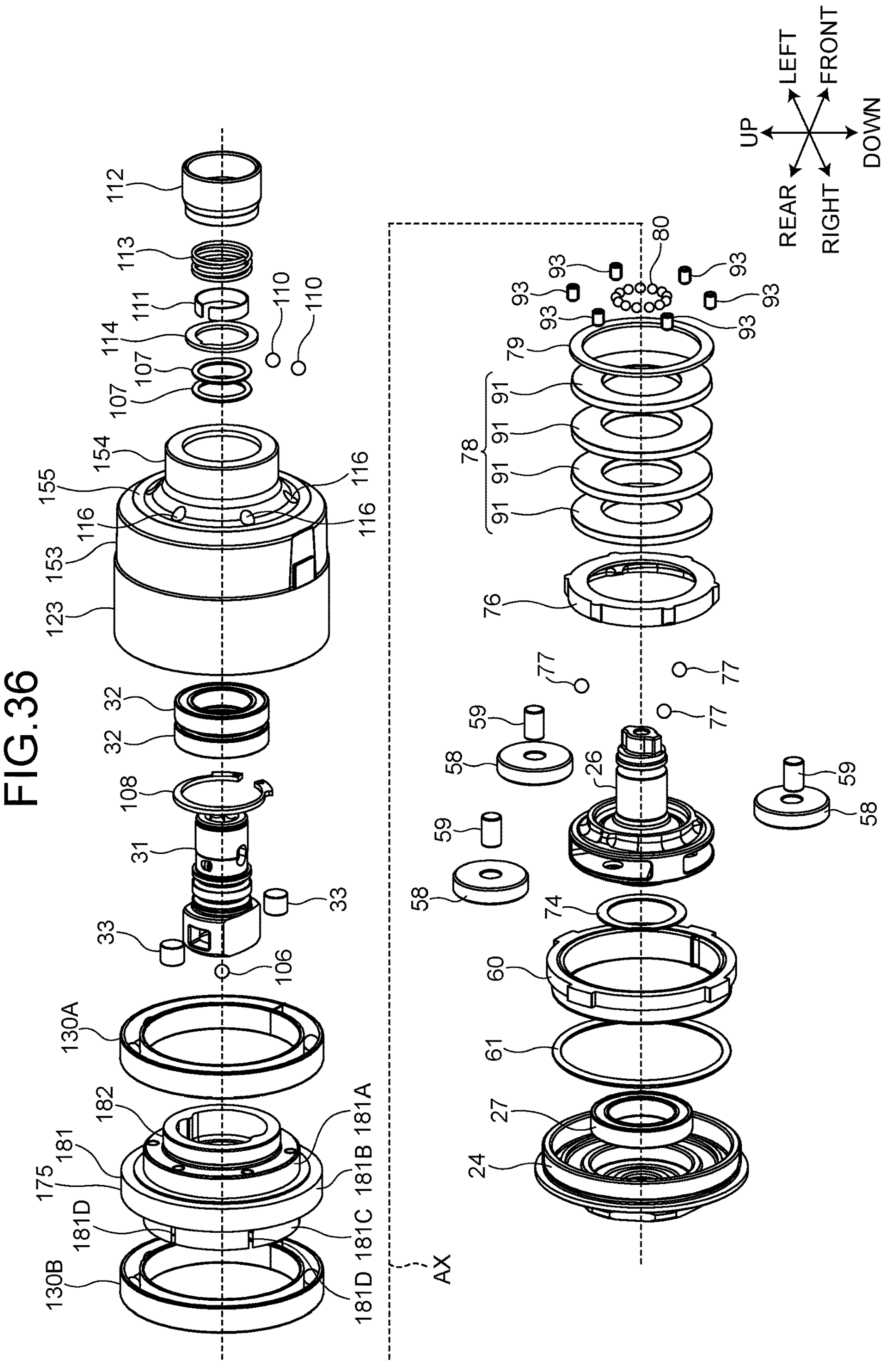
FIG. 36 is an exploded oblique view illustrating the output assembly according to the second embodiment.

FIG. 33 is an oblique view, viewed from the front, which illustrates a part of an impact tool 1B according to the embodiment. FIG. 34 is an oblique view, viewed from the front, which illustrates an output assembly 4B according to the embodiment. FIG. 35 is a longitudinal sectional view illustrating the output assembly 4B according to the embodiment. FIG. 36 is an exploded oblique view illustrating the output assembly 4B according to the embodiment.

The output assembly 4B includes a hammer case 123 and a bearing box 24. A hammer 175 is disposed in internal space of the output assembly 4B defined by the hammer case 123 and the bearing box 24.

The hammer case 123 includes a large cylindrical portion 153 and a small cylindrical portion 154. Each of the large cylindrical portion 153 and the small cylindrical portion 154 is disposed so as to surround a rotation axis AX. The small cylindrical portion 154 is disposed forward of the large cylindrical portion 153. The large cylindrical portion 153 has an inner diameter larger than that of the small cylindrical portion 154. The large cylindrical portion 153 has an outer diameter larger than that of the small cylindrical portion 154.

In the embodiment, the hammer case 123 has through holes 116. The hammer case 123 has a front surface 155 facing forward and a rear surface 196 facing rearward. The front surface 155 is provided so as to connect a front end of the outer circumferential surface of the large cylindrical portion 153 and a rear end of the outer circumferential surface of the small cylindrical portion 154. The rear surface 196 is provided so as to connect a front end of the inner circumferential surface of the large cylindrical portion 153 and a rear end of the inner circumferential surface of the small cylindrical portion 154. Each of the front surface 155 and the rear surface 196 has a circular ring shape. Each of the through holes 116 penetrates the front surface 155 and the rear surface 196. The through holes 116 are provided at intervals in the circumferential direction. In the embodiment, six through holes 116 are provided at intervals in the circumferential direction.

Similarly to the above-described embodiment, the output assembly 4B includes screws 93 serving as an elastic force adjusting mechanism 29. The hammer 175 has screw holes 94 in which the screws 93 are disposed. In the radial direction, the distance between the rotation axis AX and the screw hole 94 is substantially equal to the distance between the rotation axis AX and the through hole 116. In the circumferential direction, an interval between the screw holes 94 is equal to an interval between the through holes 116. The positions of the screw holes 94 are made to coincide with the positions of the through holes 116 in the radial direction and the circumferential direction by adjusting the position of the hammer 175 in the rotation direction. That is, the through holes 116 can overlap the screw holes 94 in both the radial direction and the circumferential direction. Adjusting the position of the hammer 175 in the rotation direction enables the screws 93 to face the through holes 116. An operator can insert a screw fastening tool into the through hole 116 to rotate the screw 93. Rotation of the screw 93 moves a washer 79 in a front-rear direction. Movement of the washer 79 in the front-rear direction adjusts an amount of compression of the elastic member 78, and adjusts elastic force of the elastic member 78.

The hammer 175 includes a rear outer cylindrical portion 181, a front outer cylindrical portion 182, and an inner cylindrical portion 183. Each of the rear outer cylindrical portion 181, the front outer cylindrical portion 182, and the inner cylindrical portion 183 is disposed so as to surround the rotation axis AX. The rear outer cylindrical portion 181, the front outer cylindrical portion 182, and the inner cylindrical portion 183 are integrated.

The front outer cylindrical portion 182 is disposed forward of the rear outer cylindrical portion 181. A front end of the rear outer cylindrical portion 181 is connected to a rear end of the front outer cylindrical portion 182. The rear outer cylindrical portion 181 has an outer diameter larger than that of the front outer cylindrical portion 182. The rear outer cylindrical portion 181 has an inner diameter larger than that of the front outer cylindrical portion 182.

The inner cylindrical portion 183 is disposed radially inside with respect to the rear outer cylindrical portion 181 and the front outer cylindrical portion 182. A front end of the inner cylindrical portion 183 is connected to the rear end of the front outer cylindrical portion 182.

The spindle 26 supports the inner cylindrical portion 183. The front outer cylindrical portion 182 is disposed radially outside with respect to the inner cylindrical portion 183 and forward of the inner cylindrical portion 183. The rear outer cylindrical portion 181 is disposed radially outside with respect to the inner cylindrical portion 183 and the front outer cylindrical portion 182, and is disposed rearward of the front outer cylindrical portion 182.

In the embodiment, the rear outer cylindrical portion 181 includes a front small-diameter portion 181A, a large-diameter portion 181B, and a rear small-diameter portion 181C. The large-diameter portion 181B is disposed rearward of the front small-diameter portion 181A. The rear small-diameter portion 181C is disposed rearward of the large-diameter portion 181B. The large-diameter portion 181B has an outer diameter larger than that of the front small-diameter portion 181A and that of the rear small-diameter portion 181C.

In the embodiment, the hammer 175 is rotatably supported by a first hammer bearing 130A and a second hammer bearing 130B. Each of the first hammer bearing 130A and the second hammer bearing 130B is disposed around the rear outer cylindrical portion 181. The second hammer bearing 130B is disposed rearward of the first hammer bearing 130A. Each of the first hammer bearing 130A and the second hammer bearing 130B is a ball bearing.

The first hammer bearing 130A supports a front portion of the hammer 175. The second hammer bearing 130B supports a rear portion of the hammer 175. In the embodiment, each of the first hammer bearing 130A and the second hammer bearing 130B supports the rear outer cylindrical portion 181. The first hammer bearing 130A supports a front portion of the rear outer cylindrical portion 181. The second hammer bearing 130B supports a rear portion of the rear outer cylindrical portion 181.

The first hammer bearing 130A is disposed around the front small-diameter portion 181A. The inner ring of the first hammer bearing 130A is in contact with the outer circumferential surface of the front small-diameter portion 181A. The outer ring of the first hammer bearing 130A is in contact with the inner circumferential surface of the large cylindrical portion 153. The hammer 175 has a support surface 197 facing a front end of the first hammer bearing 130A. The support surface 197 faces rearward. The front end of the first hammer bearing 130A is in contact with the support surface 197 of the hammer 175. The support surface 197 is disposed radially outside with respect to the rear surface 196. The support surface 197 is disposed rearward of the rear surface 196. The rear end of the first hammer bearing 130A is in contact with at least a part of the front end surface of the large-diameter portion 181B.

The second hammer bearing 130B is disposed around the rear small-diameter portion 181C. The inner ring of the second hammer bearing 130B is in contact with the outer circumferential surface of the rear small-diameter portion 181C. The outer ring of the second hammer bearing 130B is in contact with the inner circumferential surface of the large cylindrical portion 153. A front end of the second hammer bearing 130B is in contact with at least a part of the rear end surface of the large-diameter portion 181B. In the embodiment, a plurality of notches 181D are provided in the rear small-diameter portion 181C. The notches 181D are recessed forward from the rear end of the rear small-diameter portion 181C. The notches 181D enable the rear small-diameter portion 181C to be elastically deformed in the radial direction. Owing to the elastic deformation of the rear small-diameter portion 181C, the second hammer bearing 130B and the rear small-diameter portion 181C are fixed to each other. That is, the rear small-diameter portion 181C generates elastic force that pushes the second hammer bearing 130B radially outward. The second hammer bearing 130B is disposed around the rear small-diameter portion 181C so as to fasten the rear small-diameter portion 181C from radial outside. With this, the second hammer bearing 130B and the rear small-diameter portion 181C are fixed to each other.

Effects

A described above, in the embodiment, the hammer 175 may be supported by the first hammer bearing 130A and the second hammer bearing 130B. The second hammer bearing 130B may be disposed rearward of the first hammer bearing 130A.

According to the above-described configuration, the hammer 175 is suppressed from rotating in a state of being inclined with respect to the spindle 26.

In the embodiment, the hammer 175 may include: the inner cylindrical portion 183 supported by the spindle 26; the front outer cylindrical portion 182 disposed radially outside with respect to the inner cylindrical portion 183 and disposed forward of the inner cylindrical portion 183; and the rear outer cylindrical portion 181 disposed radially outside with respect to the inner cylindrical portion 183 and disposed rearward of the front outer cylindrical portion 182. The rear outer cylindrical portion 181 has an outer diameter larger than that of the front outer cylindrical portion 182. Each of the first hammer bearing 130A and the second hammer bearing 130B may support the rear outer cylindrical portion 181.

According to the above-described configuration, the hammer 175 is suppressed from rotating in a state of being inclined with respect to the spindle 26.

In the embodiment, the first hammer bearing 130A may support the front portion of the rear outer cylindrical portion 181. The second hammer bearing 130B may support the rear portion of the rear outer cylindrical portion 181.

According to the above-described configuration, the hammer 175 is suppressed from rotating in a state of being inclined with respect to the spindle 26.

In the embodiment, the rear outer cylindrical portion 181 may include: the front small-diameter portion 181A; the large-diameter portion 181B disposed rearward of the front small-diameter portion 181A; and the rear small-diameter portion 181C disposed rearward of the large-diameter portion 181B. The large-diameter portion 181B may have an outer diameter larger than that of the front small-diameter portion 181A and that of the rear small-diameter portion 181C. The first hammer bearing 130A may be disposed around the front small-diameter portion 181A. The second hammer bearing 130B may be disposed around the rear small-diameter portion 181C.

According to the above-described configuration, an increase in size of the hammer case 123 in the radial direction is suppressed.

In the embodiment, the hammer 175 may have the support surface 197 facing the front end of the first hammer bearing 130A. The front end of the first hammer bearing 130A may be in contact with the support surface 197 of the hammer 175.

According to the above-described configuration, the first hammer bearing 130A is positioned in the axial direction.

In the embodiment, the rear end of the first hammer bearing 130A may be in contact with at least a part of the front end surface of the large-diameter portion 181B.

According to the above-described configuration, the first hammer bearing 130A is positioned in the axial direction.

In the embodiment, the front end of the second hammer bearing 130B may be in contact with at least a part of the rear end surface of the large-diameter portion 181B.

According to the above-described configuration, the second hammer bearing 130B is positioned in the axial direction.

In the embodiment, a plurality of notches 181D may be provided in the rear small-diameter portion 181C. The rear small-diameter portion 181C may be elastically deformed in the radial direction owing to the notches 181D. The second hammer bearing 130B and the rear small-diameter portion 181C may be fixed to each other by elastic deformation of the rear small-diameter portion 181C.

According to the above-described configuration, the inner ring of the second hammer bearing 130B is position in the hammer 175.

In the embodiment, the output assembly 4B may include the hammer case 123 that houses the hammer 175. The hammer case 123 may have the through hole 116 overlapping the screw hole 94 in both the radial direction and the circumferential direction. The screw 93 may be rotated through the through hole 116.

According to the above-described configuration, an operator can smoothly bring a screw fastening tool into contact with the screw 93 disposed in the screw hole 94 via the through hole 116, and can smoothly rotate the screw 93. The operator can appropriately adjust elastic force of the elastic member 78 in accordance with operation contents.

In the embodiment, the output assembly 4B may include the first hammer bearing 130A and the second hammer bearing 130B, which are held by the hammer case 23 and support the hammer 175 in a rotatable manner. The first hammer bearing 130A and the second hammer bearing 130B may be disposed around the rear outer cylindrical portion 181.

According to the above-described configuration, the first hammer bearing 130A and the second hammer bearing 130B do not cover the front end of the screw hole 94, whereby the operator can smoothly bring the screw fastening tool into contact with the screw 93 disposed in the screw hole 94 via the through hole 116, and smoothly rotate the screw 93.

Third Embodiment

A third embodiment will be described. In the following description, the same or equivalent components as those of the above-described embodiment are denoted by the same reference signs, and the description of the components is simplified or omitted.

Impact Tool

Figure 37:
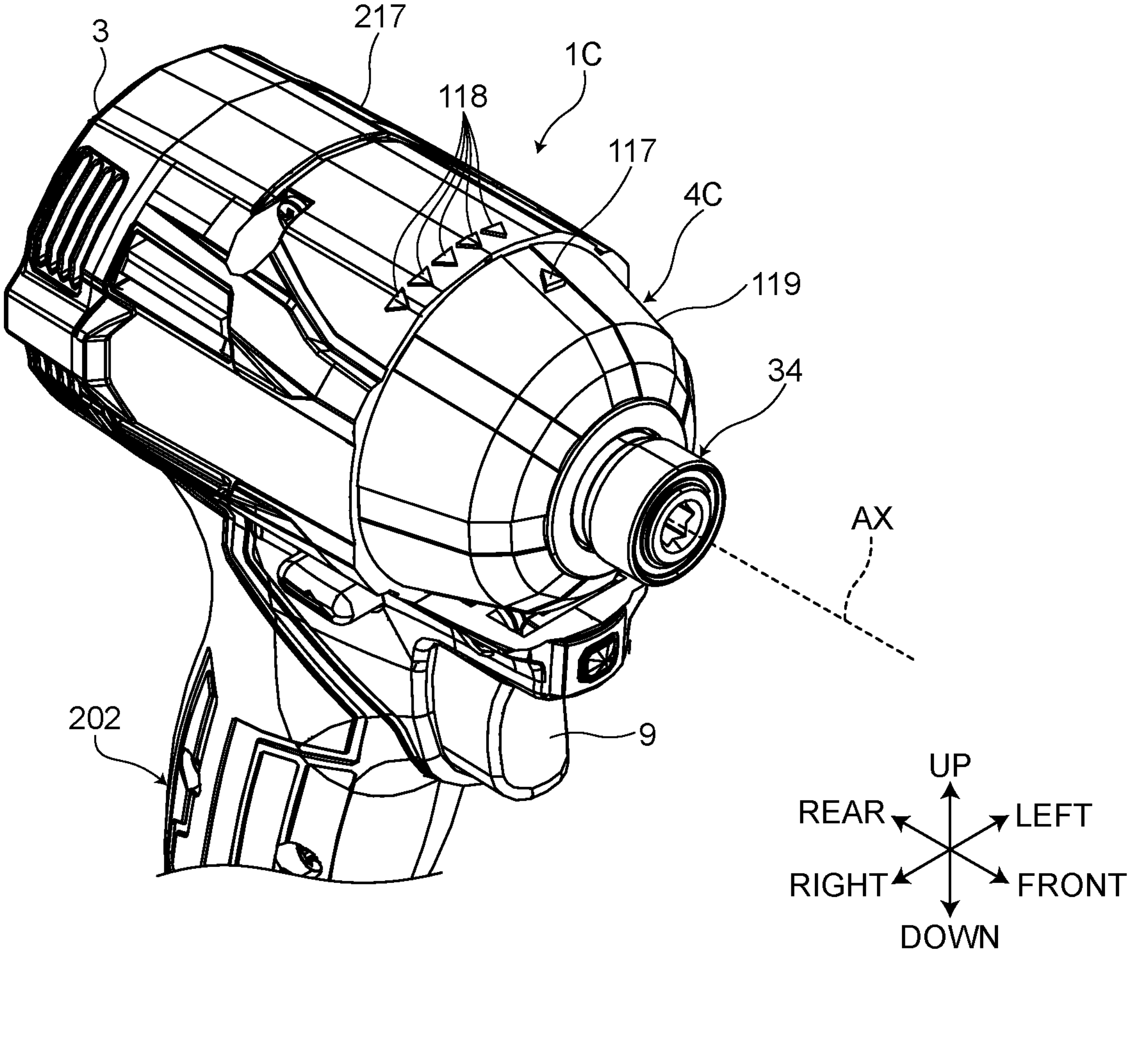
FIG. 37 is an oblique view, viewed from the front, which illustrates a part of an impact tool according to a third embodiment.
Figure 38:
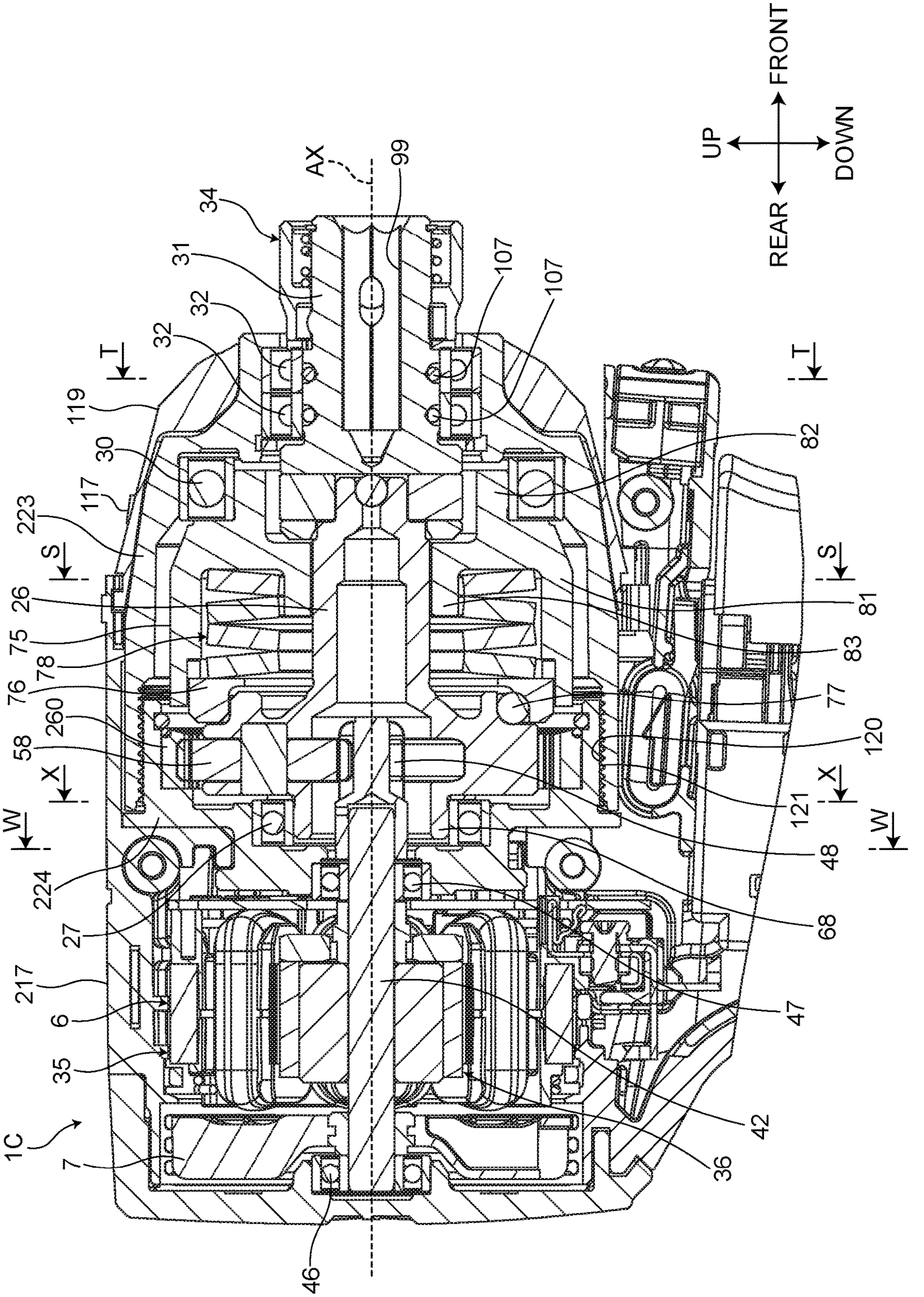
FIG. 38 is a longitudinal sectional view illustrating the part of the impact tool according to the third embodiment.
Figure 39:
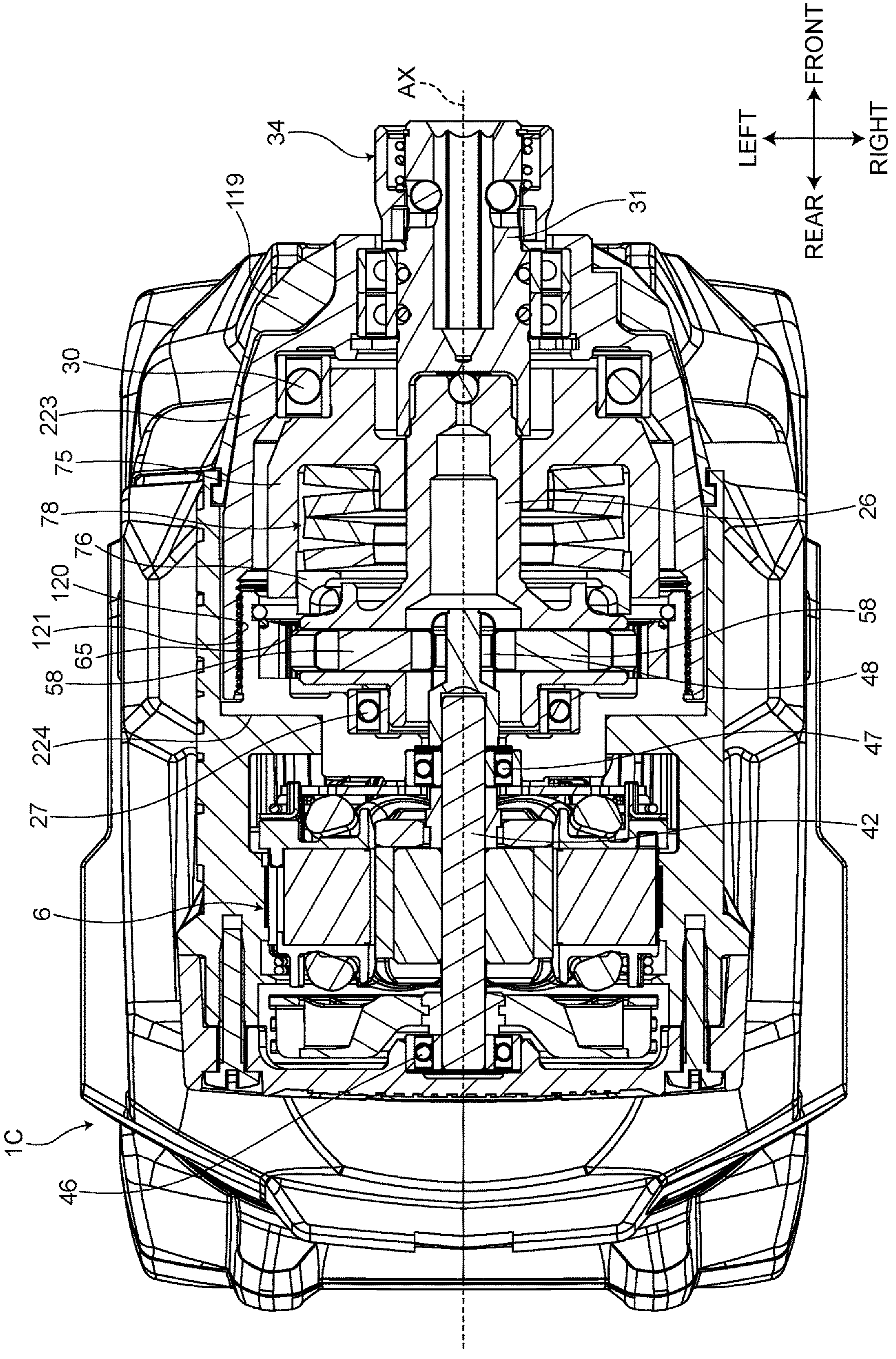
FIG. 39 is a transverse sectional view illustrating the part of the impact tool according to the third embodiment.
Figure 40:
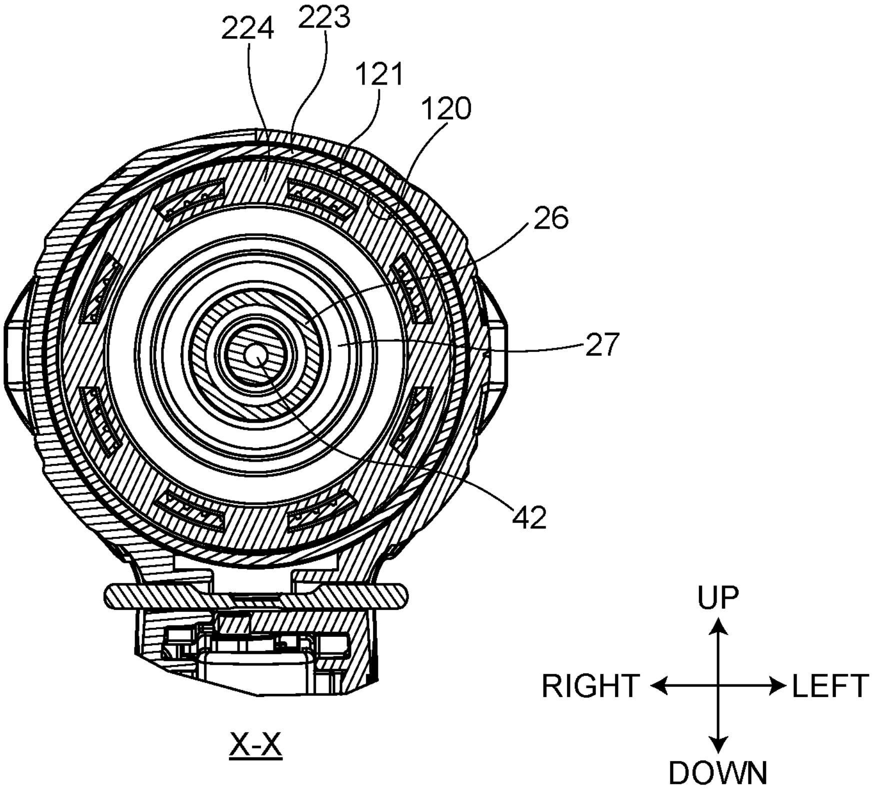
FIG. 40 is a cross-sectional view illustrating the part of the impact tool according to the third embodiment.
Figure 41:
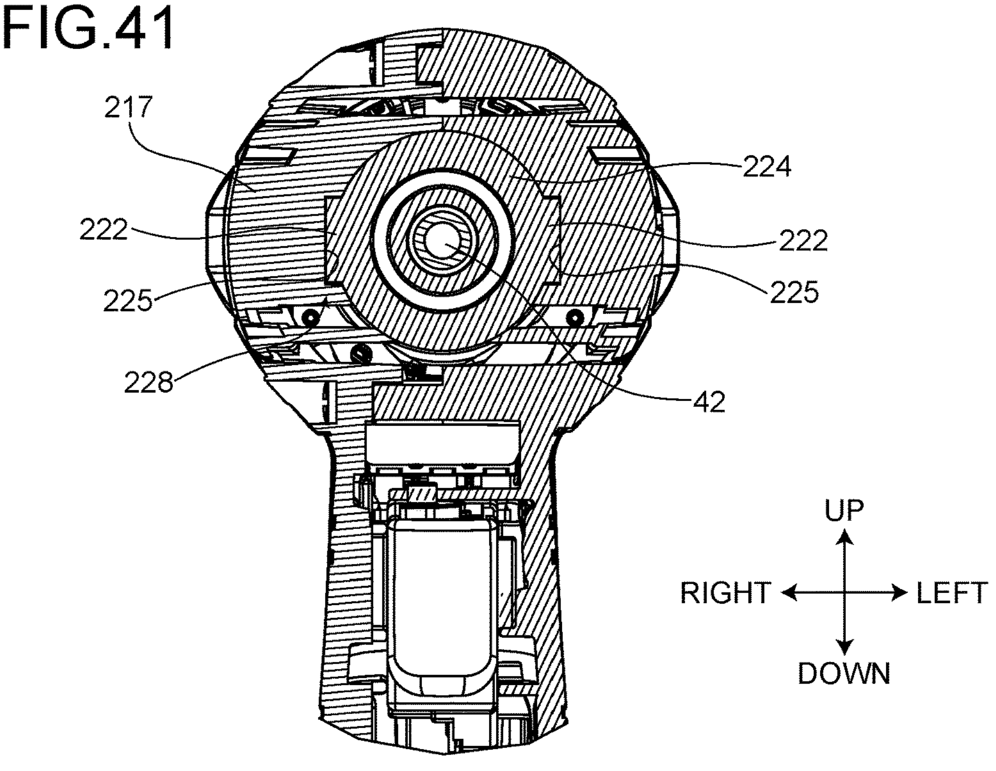
FIG. 41 is a cross-sectional view illustrating the part of the impact tool according to the third embodiment.
Figure 42:
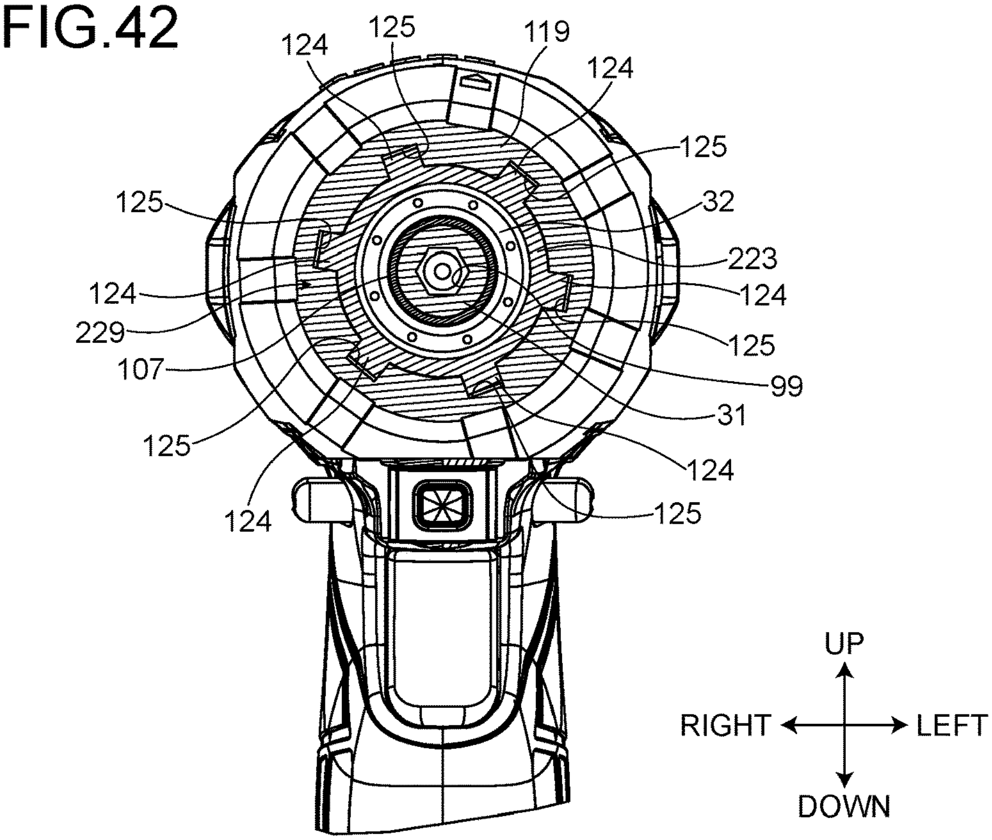
FIG. 42 is a cross-sectional view illustrating the part of the impact tool according to the third embodiment.
Figure 43:
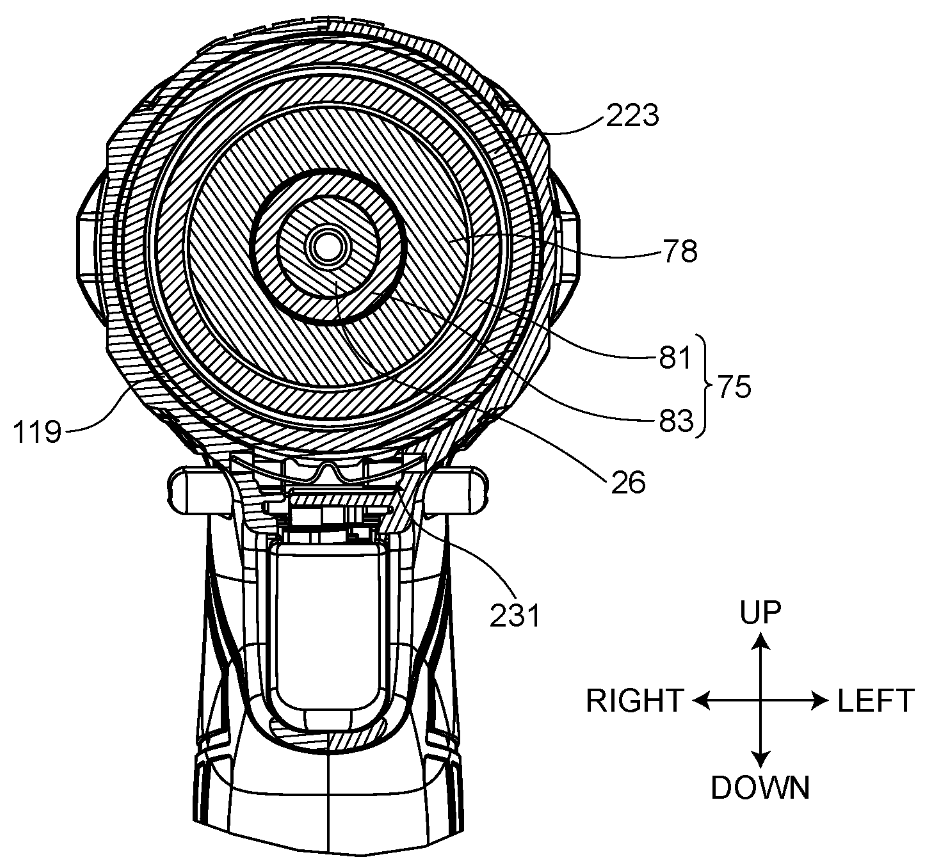
FIG. 43 is a cross-sectional view illustrating the part of the impact tool according to the third embodiment.
Figure 44:
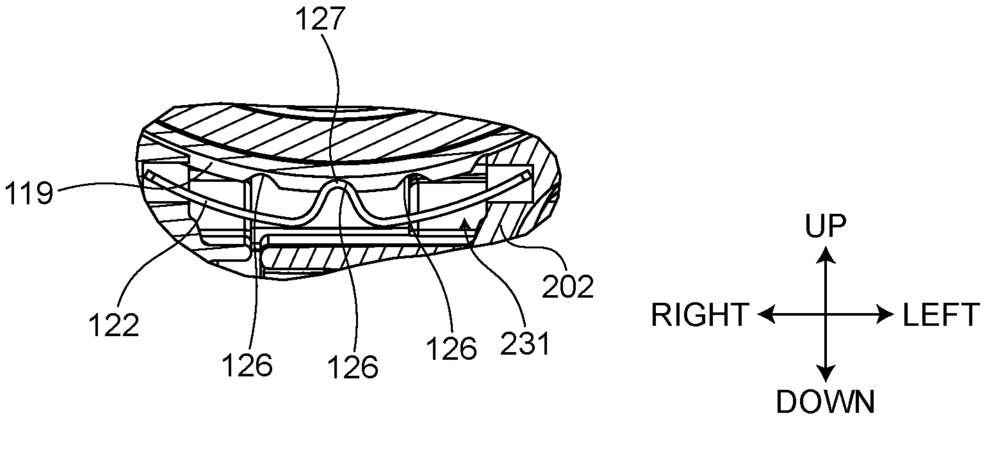
FIG. 44 is a cross-sectional view illustrating the part of the impact tool according to the third embodiment.
Figure 45:
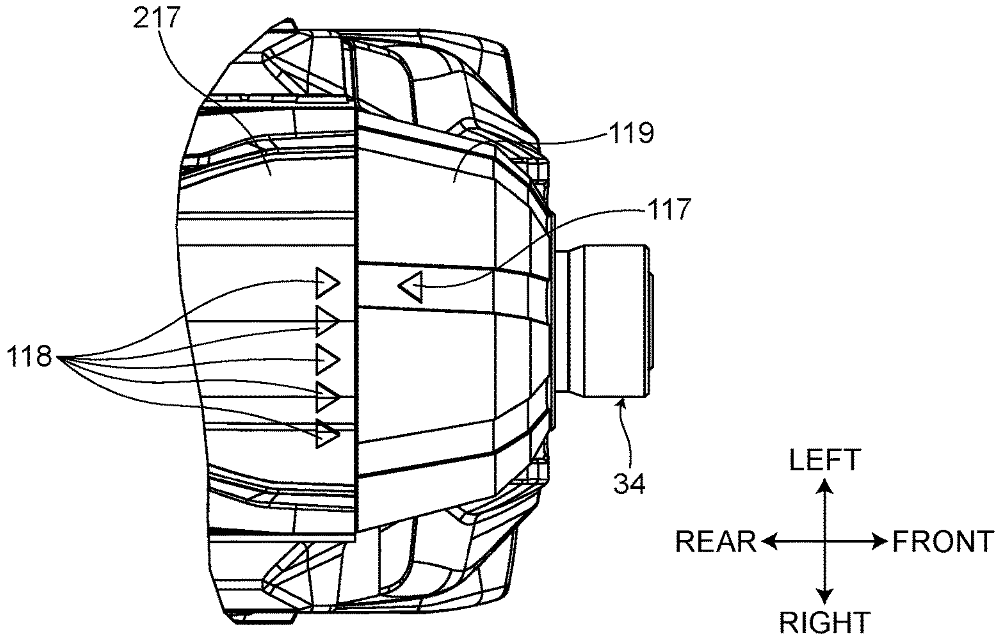
FIG. 45 is a top view of the part of the impact tool according to the third embodiment.

FIG. 37 is an oblique view, viewed from the front, which illustrates a part of an impact tool 1C according to the embodiment. FIG. 38 is a longitudinal sectional view illustrating the part of the impact tool 1C according to the embodiment. FIG. 39 is a transverse sectional view illustrating the part of the impact tool 1C according to the embodiment. FIG. 40 is a cross-sectional view illustrating the part of the impact tool 1C according to the embodiment, and is a cross-sectional arrow view taken along line X-X in FIG. 38. FIG. 41 is a cross-sectional view illustrating the part of the impact tool 1C according to the embodiment, and is a cross-sectional arrow view taken along line W-W in FIG. 38. FIG. 42 is a cross-sectional view illustrating the part of the impact tool 1C according to the embodiment, and is a cross-sectional arrow view taken along line T-T in FIG. 38. FIG. 43 is a cross-sectional view illustrating the part of the impact tool 1C according to the embodiment, and is a cross-sectional arrow view taken along line S-S in FIG. 38. FIG. 44 is a cross-sectional view illustrating the part of the impact tool 1C according to the embodiment, and is an enlarged view of the part in FIG. 43. FIG. 45 is a top view of the part of the impact tool 1C according to the embodiment.

The impact tool 1C includes: a housing 202 including a motor housing 217; and an output assembly 4C.

The output assembly 4C includes a hammer case 223, a bearing box 224, and a cover 119. The hammer 75 and the spindle 26 are disposed in internal space of the output assembly 4C defined by the hammer case 223 and the bearing box 224. The hammer case 223 holds the hammer 75 via the hammer bearing 30. The hammer 75 is connected to the hammer case 223 via the hammer bearing 30. The bearing box 224 holds the spindle 26 via a spindle bearing 27. The spindle 26 is connected to the bearing box 224 via the spindle bearing 27.

In the embodiment, the hammer case 223 is coupled to the bearing box 224 via a screw portion. The hammer case 223 can rotate with respect to the bearing box 224. A screw groove 120 is formed in a rear portion of the inner circumferential surface of the hammer case 223. A screw thread 121 is formed on the outer circumferential surface of the bearing box 224. The screw groove 120 and the screw thread 121 are joined. In response to rotation of the hammer case 223 with respect to the bearing box 224, the hammer case 223 moves in the front-rear direction with respect to the bearing box 224.

The cover 119 is disposed so as to cover the hammer case 223. An operator can rotate the hammer case 223 in a state of gripping the cover 119. An operator can move the hammer case 223 in the front-rear direction with respect to the bearing box 224 by rotating the hammer case 223 via the cover 119.

As illustrated in FIG. 41, the output assembly 4C includes a first rotation preventing mechanism 228 configured to prevent relative rotation of the motor housing 217 and the bearing box 224. In the embodiment, the first rotation preventing mechanism 228 includes protrusions 222 and recesses 225. The protrusions 222 protrude radially outward from the outer circumferential surface of the bearing box 224. The recesses 225 are provided on the inner circumferential surface of the motor housing 217. By disposing the protrusions 222 in the recesses 225, the relative rotation of the motor housing 217 and the bearing box 224 is suppressed.

As illustrated in FIG. 42, the output assembly 4C includes a second rotation preventing mechanism 229 configured to prevent relative rotation of the cover 119 and the hammer case 223. In the embodiment, the second rotation preventing mechanism 229 includes protrusions 124 and recesses 125. The protrusions 124 protrude radially outward from the outer circumferential surface of the hammer case 223. The recesses 125 are provided on the inner circumferential surface of the cover 119. By disposing the protrusion 124 in the recess 125, the relative rotation of the cover 119 and the hammer case 223 is suppressed.

The relative rotation of the cover 119 and the hammer case 223 is prevented by the second rotation preventing mechanism 229, so that an operator can rotate the hammer case 223 via the cover 119. The relative rotation of the motor housing 217 and the bearing box 224 is prevented by the first rotation preventing mechanism 228, so that an operator can rotate the hammer case 223 with respect to the bearing box 224.

As illustrated in FIGS. 43 and 44, the output assembly 4C includes a positioning mechanism 231 that positions the cover 119 in the circumferential direction. The positioning mechanism 231 includes a plurality of recesses 126 and a leaf spring 122. The recesses 126 are provided in a lower portion of the cover 119. The leaf spring 122 is supported by at least a part of the housing 202. The leaf spring 122 is supported by the housing 202 so that the leaf spring 122 does not move with respect to the housing 202 in the circumferential direction.

The leaf spring 122 has a protrusion portion 127. The protrusion portion 127 is disposed in any one of the recesses 126. By disposing the protrusion portion 127 in any one of the recesses 126, the cover 119 is positioned in the circumferential direction.

As illustrated in FIGS. 37 and 45, a position mark 117 is provided on the outer circumferential surface of the cover 119. One position mark 117 is provided on the outer circumferential surface of the cover 119. The position mark 117 indicates the position of the cover 119 in the rotation direction. Index marks 118 are provided on the outer circumferential surface of the motor housing 217. The index marks 118 are provided in the circumferential direction. In the circumferential direction, the interval between the recesses 126 coincides with the interval between the index marks 118. The index marks 118 are to indicate an amount of compression of the elastic member 78.

When the hammer case 223 is rotated by an operator via the cover 119 and moves in the front-rear direction, the hammer 75 connected to the hammer case 223 via the hammer bearing 30 moves in the front-rear direction together with the hammer case 223. The front end of the elastic member 78 is in contact with at least a part of the hammer 75. The rear end of the elastic member 78 is in contact with the cam ring 76. The cam ring 76 is connected to the flange 65 of the spindle 26. The spindle 26 is connected to the bearing box 224 via the spindle bearing 27. Therefore, when the hammer 75 moves in the front-rear direction in response to the rotation of the hammer case 223, the amount of compression of the elastic member 78 changes. Since the distance between the cam ring 76 and the hammer 75 is shortened in the front-rear direction by the hammer case 223 rotating such that the hammer 75 moves rearward, the elastic member 78 is compressed. Since the distance between the cam ring 76 and the hammer 75 is increased in the front-rear direction by the hammer case 223 rotating such that the hammer 75 moves forward, the elastic member 78 is extended.

By disposing the protrusion portion 127 in any one of the recesses 126, the cover 119 is positioned in the circumferential direction. Thus, unnecessary rotation of the cover 119 is suppressed. Furthermore, the leaf spring 122 gives a click feeling to an operator during rotation of the cover 119. The operator rotates the cover 119 such that any index mark 118 among the index marks 118 coincides with the position mark 117. The interval between the recesses 126 coincides with the interval between the index marks 118. Thus, when the cover 119 is rotated such that any index mark 118 coincides with the position mark 117, the protrusion portion 127 is disposed in any one of recesses 126, and the amount of compression of the elastic member 78 is adjusted.

Effects

As described above, in the embodiment, the impact tool 1C may include: the bearing box 224 that holds the spindle 26; and the hammer case 223 that holds the hammer 75. The hammer case 223 may be coupled to the bearing box 224 via the screw portion including the screw groove 120 and the screw thread 121. The hammer case 223 rotates with respect to the bearing box 224 and moves in the axial direction, so that elastic force of the elastic member 78 may be adjusted.

According to the above-described configuration, an operator can adjust the elastic force of the elastic member 78 by gripping and rotating the hammer case 223 with his/her hand. The operator can adjust the elastic force of the elastic member 78 without using a screw fastening tool.

In the embodiment, the impact tool 1C may include: the motor housing 217 that houses the motor 6; and the first rotation preventing mechanism 228 configured to prevent the relative rotation of the motor housing 217 and the bearing box 224.

According to the above-described configuration, when the hammer case 223 is rotated, rotation of the bearing box 224 is prevented by the first rotation preventing mechanism 228. Thus, the operator can smoothly rotate the hammer case 223 with respect to the bearing box 224.

In the embodiment, the impact tool 1C may include: the cover 119 that covers the hammer case 223; and the second rotation preventing mechanism 229 configured to prevent the relative rotation of the cover 119 and the hammer case 223. The hammer case 223 may be rotated via the cover 119.

According to the above-described configuration, the relative rotation of the cover 119 and the hammer case 223 is prevented by the second rotation preventing mechanism 229. Thus, the operator can rotate the hammer case 223 by gripping and rotating the cover 119 with his/her hand. In response to rotation of the hammer case 223, the elastic force of the elastic member 78 is adjusted. The operator can adjust the elastic force of the elastic member 78 without directly touching the hammer case 223.

In the embodiment, the impact tool 1C may include the positioning mechanism 231 configured to position the cover 119 in the circumferential direction.

According to the above-described configuration, unnecessary rotation of the hammer case 223 and the cover 119 is suppressed.

Fourth Embodiment

A fourth embodiment will be described. In the following description, the same or equivalent components as those of the above-described embodiment are denoted by the same reference signs, and the description of the components is simplified or omitted.

Output Assembly

Figure 46:
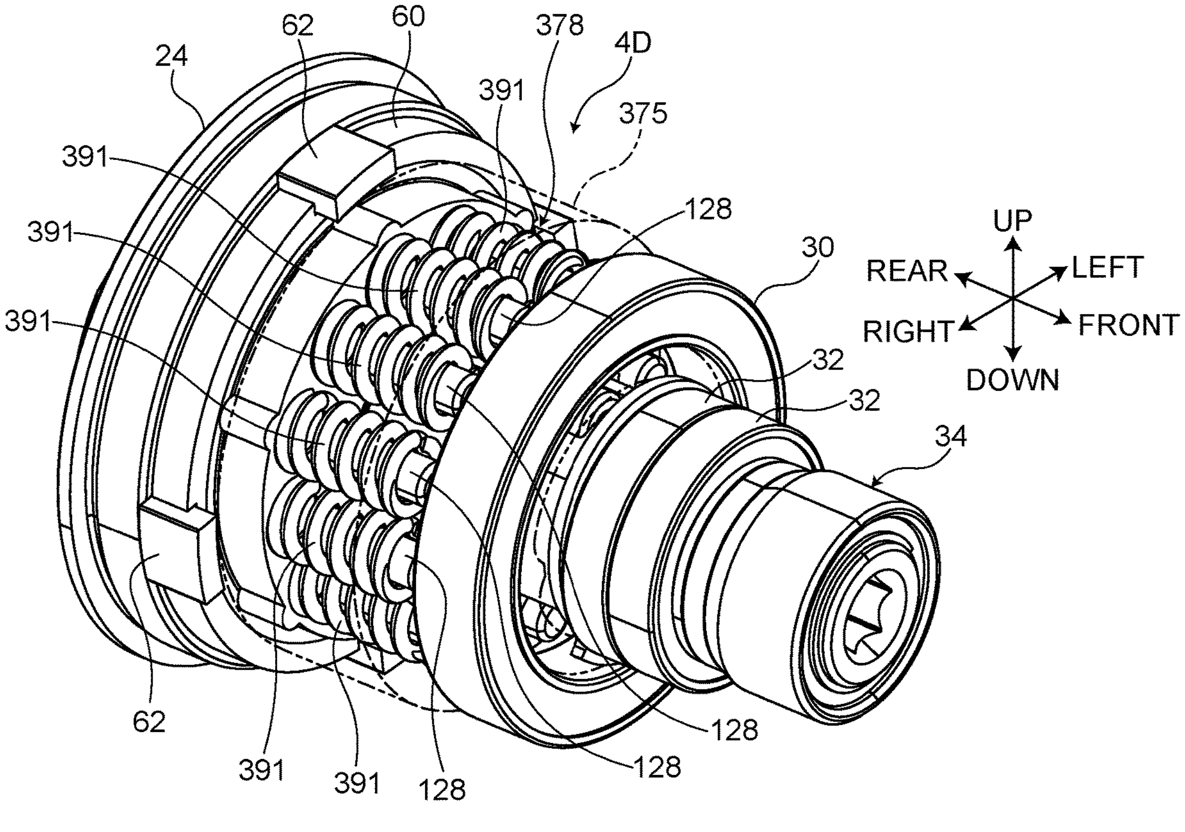
FIG. 46 is an oblique view, viewed from the front, which illustrates a part of an output assembly according to a fourth embodiment.
Figure 47:
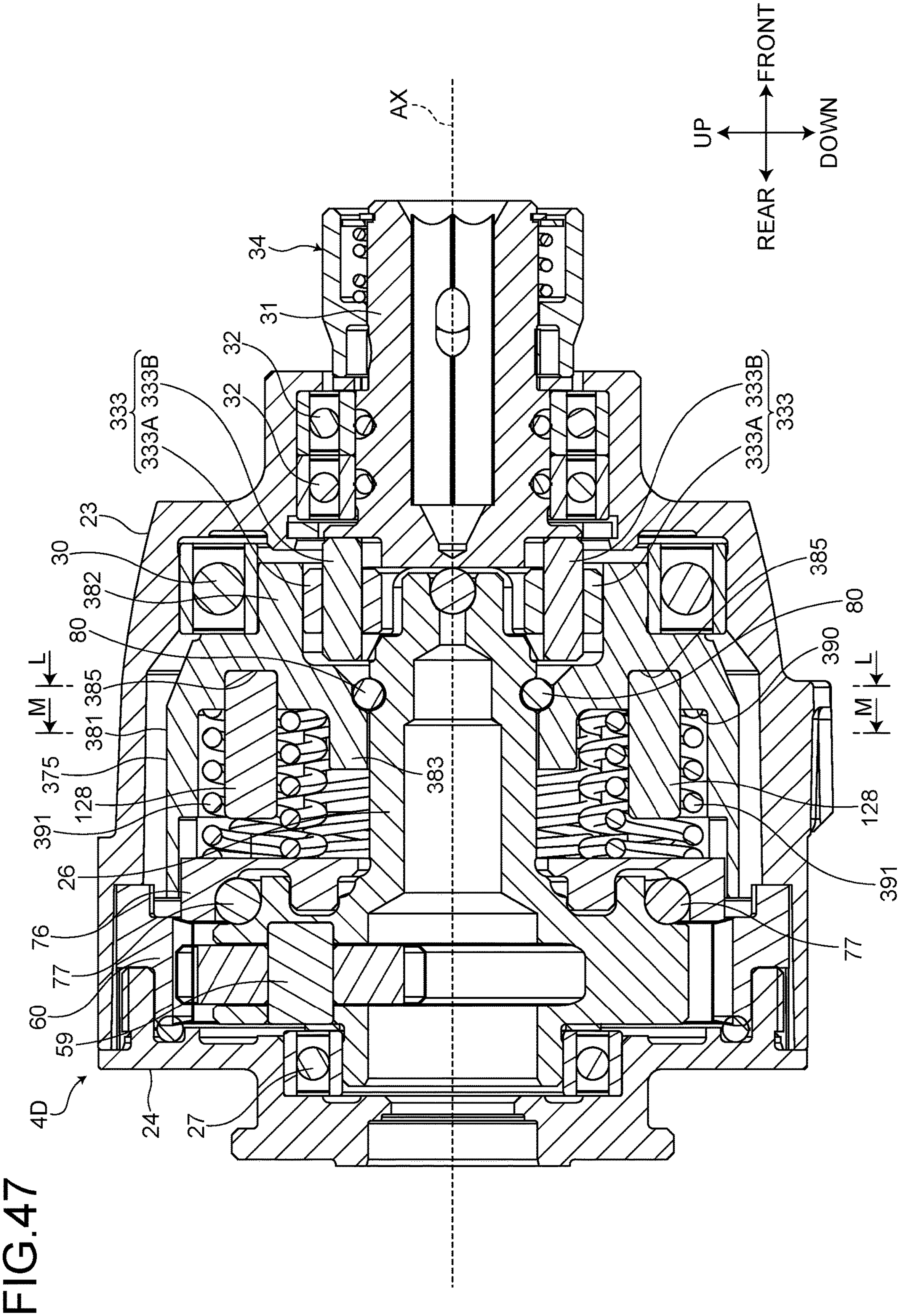
FIG. 47 is a longitudinal sectional view illustrating the output assembly according to the fourth embodiment.
Figure 48:
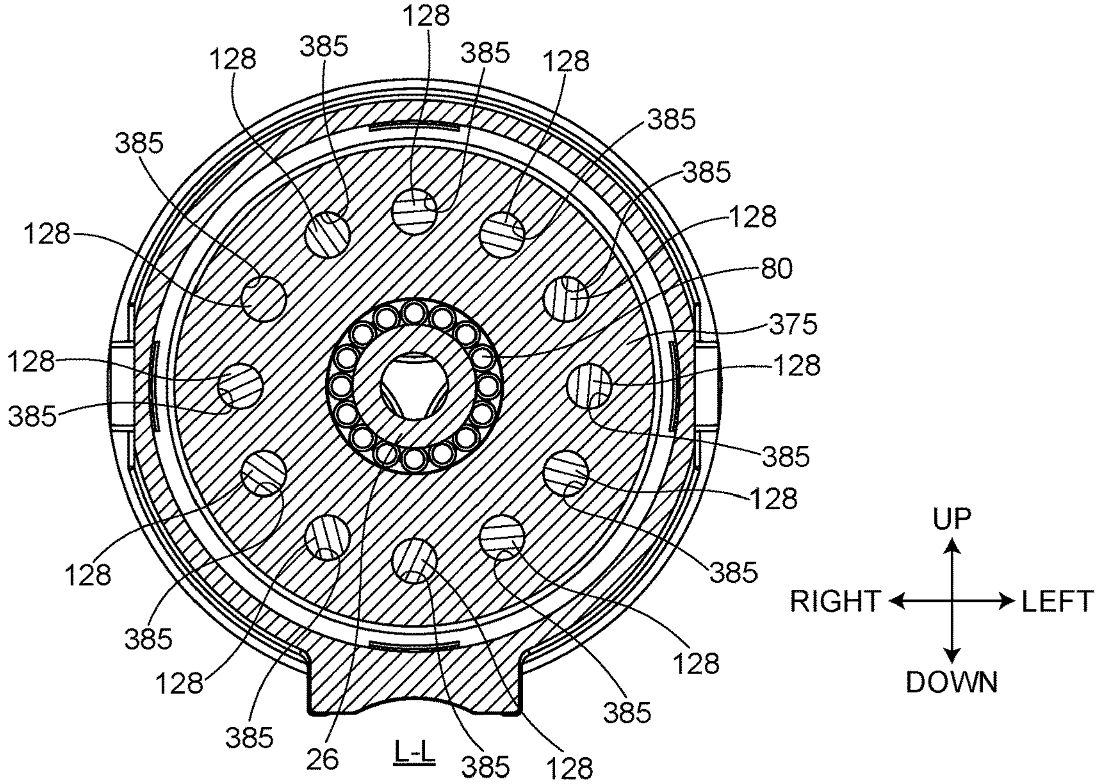
FIG. 48 is a cross-sectional view illustrating the part of the output assembly according to the fourth embodiment.
Figure 49:
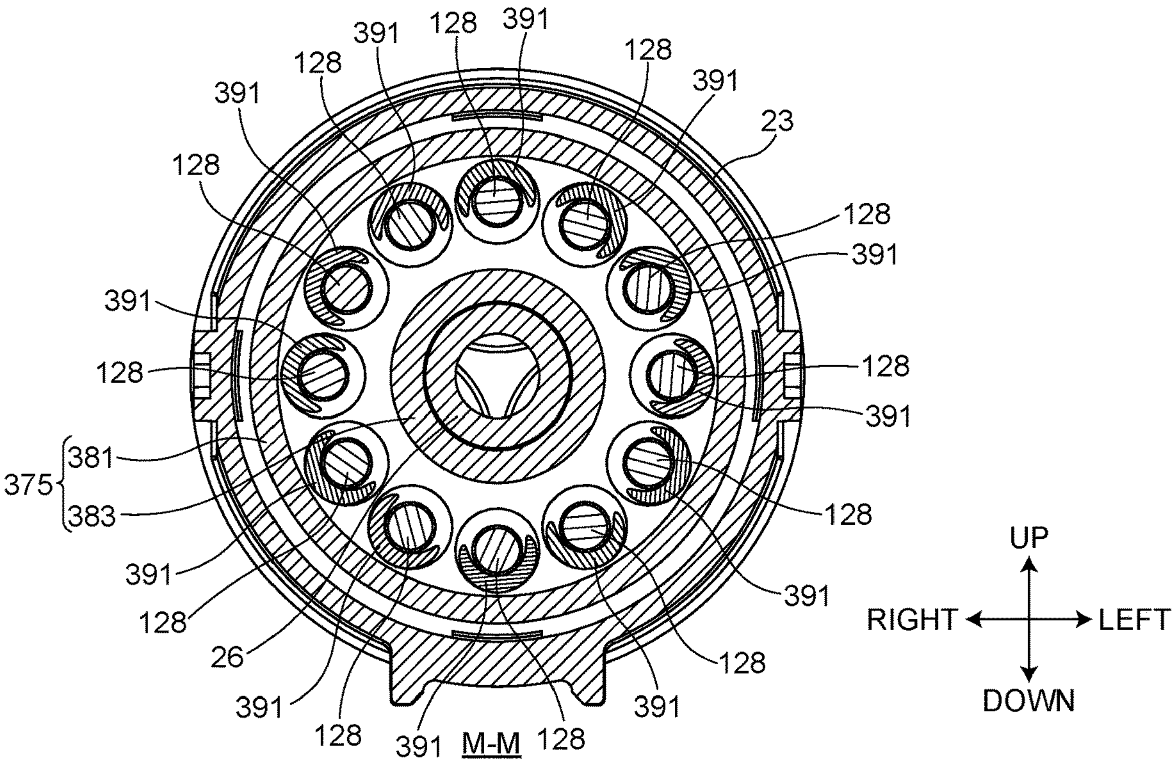
FIG. 49 is a cross-sectional view illustrating the part of the output assembly according to the fourth embodiment.

FIG. 46 is an oblique view, viewed from the front, which illustrates a part of an output assembly 4D according to the embodiment. FIG. 47 is a longitudinal sectional view illustrating the output assembly 4D according to the embodiment. FIG. 48 is a cross-sectional view illustrating the part of the output assembly 4D according to the embodiment, and is a cross-sectional arrow view taken along line L-L in FIG. 47. FIG. 49 is a cross-sectional view illustrating the part of the output assembly 4D according to the embodiment, and is a cross-sectional arrow view taken along line M-M in FIG. 47.

The output assembly 4D includes a hammer case 23 and a bearing box 24. A hammer 375 and an elastic member 378 are disposed in internal space of the output assembly 4D defined by the hammer case 23 and the bearing box 24. In FIG. 46, description of the hammer case 23 is omitted, and the hammer 375 is indicated by a virtual line.

Similarly to the above-described embodiment, the elastic member 378 is disposed in closed space defined by the spindle shaft 64, the hammer 75, and the cam ring 76. The elastic member 378 has a spring constant of 100 [N/mm] or more. Although an upper limit value of the spring constant of the elastic member 378 is not particularly limited, the elastic member 378 has a spring constant of 10000 [N/mm] or less in the embodiment.

The hammer 375 includes a rear outer cylindrical portion 381, a front outer cylindrical portion 382, and an inner cylindrical portion 383. Each of the rear outer cylindrical portion 381, the front outer cylindrical portion 382, and the inner cylindrical portion 383 is disposed so as to surround the rotation axis AX. The rear outer cylindrical portion 381, the front outer cylindrical portion 382, and the inner cylindrical portion 383 are integrated.

The front outer cylindrical portion 382 is disposed forward of the rear outer cylindrical portion 381. A front end of the rear outer cylindrical portion 381 is connected to a rear end of the front outer cylindrical portion 382. The rear outer cylindrical portion 381 has an outer diameter larger than that of the front outer cylindrical portion 382. The rear outer cylindrical portion 381 has an inner diameter larger than that of the front outer cylindrical portion 382.

The inner cylindrical portion 383 is disposed radially inside with respect to the rear outer cylindrical portion 381 and the front outer cylindrical portion 382. A front end of the inner cylindrical portion 383 is connected to the rear end of the front outer cylindrical portion 382.

In the embodiment, the elastic member 378 includes a plurality of coil springs 391 disposed around the rotation axis AX of the spindle 26. A front end of each of the coil springs 391 is in contact with a support surface 390 between a front end of the inner circumferential surface of the rear outer cylindrical portion 381 and a front end of the outer circumferential surface of the inner cylindrical portion 383. The support surface 390 is disposed forward of the flange 65 and the cam ring 76. A rear end of each of the coil springs 391 is in contact with the front surface of the cam ring 76.

Support pins 128 are respectively disposed inside the coil springs 391. The support pins 128 are fixed to the hammer 375. In the embodiment, the support pins 128 are press-fitted into recesses 385 provided on the support surface 390. By disposing the support pins 128 inside the coil springs 391, the coil springs 391 are positioned in both the radial direction and the circumferential direction.

The tool holding shaft 31 supports movable anvils 333 in a movable manner. In the embodiment, each of the movable anvils 333 includes a cylindrical portion 333A and a pin portion 333B disposed inside the cylindrical portion 333A.

A front end of the pin portion 333B protrudes forward from the front end surface of the cylindrical portion 333A. A rear end of the pin portion 333B protrudes forward from the rear end surface of the cylindrical portion 333A.

Effects

As described above, in the embodiment, the elastic member 378 may include a plurality of coil springs 391 disposed around the rotation axis of the spindle 26.

According to the above-described configuration, the elastic member 378 can generate high elastic force.

In the embodiment, the front end of the coil spring 391 may be in contact with the support surface 390 of the hammer 375.

According to the above-described configuration, the front end of the coil spring 391 is stably connected to the hammer 375.

In the embodiment, the output assembly 4D may include the support pin 128 disposed inside the coil spring 391. The support pin 128 may be fixed to the hammer 375.

According to the above-described configuration, the coil spring 391 is positioned in both the radial direction and the circumferential direction.

Other Embodiments

In the above-described embodiments, the impact tool is an impact driver. The impact tool may be an impact wrench.

In the above-described embodiment, the power source of the impact tool may not be the battery pack 20, and may be a commercial power source (AC power source).

Additional aspects of the present teachings include, but are not limited to:

1. An impact tool comprising:
   - a motor;
   - a spindle that includes a spindle shaft and a flange provided at a rear portion of the spindle shaft and that is rotated by a rotational force of the motor;
   - a tool holding shaft at least a part of which is disposed forward of the spindle;
   - a hammer that is supported by the spindle shaft and that impacts the tool holding shaft in a rotation direction; and
   - a cam ring that is coupled to the flange via a ball so as to be rotatable relative to the flange, and coupled to the hammer so as to be movable relative to the hammer in an axial direction but so as not to be rotatable relative to the hammer.

2. The impact tool according to the above aspect 1, further including
   - a movable anvil that is movably supported by the tool holding shaft, wherein
   - the hammer that impacts the movable anvil in the rotation direction without being displaced in the axial direction.

3. The impact tool according to the above aspect 2, wherein
   - the movable anvil moves so as to change between a first state in which at least a part of the movable anvil protrudes radially outward from an outer circumferential surface of the tool holding shaft and a second state in which the movable anvil is positioned radially inside with respect to the outer circumferential surface of the tool holding shaft, and
   - the hammer impacts the movable anvil in the first state, and rotates around the spindle shaft in the second state.

4. The impact tool according to any one of the above aspects 1 to 3, wherein
   - the ball is disposed between a spindle groove provided in the flange and a cam groove provided in the cam ring.

5. The impact tool according to the above aspect 4, wherein
   - a plurality of the spindle grooves are provided in a circumferential direction, and
   - a plurality of the cam grooves are provided in the circumferential direction.

6. The impact tool according to the above aspect 4 or 5, wherein
   - each of the spindle groove and the cam groove has an arc shape,
   - at least a part of the spindle groove is inclined rearward toward one side in a circumferential direction, and
   - at least a part of the cam groove is inclined rearward toward the one side in the circumferential direction.

7. The impact tool according to the above aspect 6, wherein
   - in the relative rotation of the flange and the cam ring, the ball moves toward an end of the spindle groove on the one side in the circumferential direction, so that the cam ring moves forward.

8. The impact tool according to the above aspect 7, wherein
   - the spindle groove includes a first portion inclined rearward from a central portion of the spindle groove toward the end of the spindle groove on the one side in the circumferential direction, and a second portion inclined rearward from the central portion of the spindle groove toward an end of the spindle groove on the other side in the circumferential direction.

9. The impact tool according to the above aspect 8, wherein
   - when the flange and the cam ring start relative rotation due to a decrease in rotational speed of the cam ring in a state in which the flange and the cam ring rotate together in the forward rotation direction, the ball moves through the second portion toward an end of the second portion on the other side in the circumferential direction, so that the cam ring moves forward, and
   - when the flange and the cam ring start relative rotation due to decrease in the rotational speed of the cam ring in a state in which the flange and the cam ring rotate together in a reverse rotation direction, the ball moves through the first portion toward an end of the first portion on the one side in the circumferential direction, so that the cam ring moves forward.

10. The impact tool according to any one of the above aspects 1 to 9, wherein
    - the hammer has a guide portion that guides the cam ring in the axial direction.

11. The impact tool according to the above aspect 10, wherein
    - the cam ring includes a cam slide portion protruding radially outward from an outer circumferential surface of the cam ring, and
    - the guide portion includes a guide groove which is provided on an inner circumferential surface of the hammer and in which the cam slide portion is disposed.

12. The impact tool according to the above aspect 11, wherein
    - the hammer includes:
      - an inner cylindrical portion supported by the spindle;
      - a front outer cylindrical portion disposed radially outside with respect to the inner cylindrical portion and disposed forward of the inner cylindrical portion; and a rear outer cylindrical portion disposed radially outside with respect to the inner cylindrical portion and disposed rearward of the front outer cylindrical portion, and the guide groove is provided to extend in the axial direction on the inner circumferential surface of the rear outer cylindrical portion.

13. The impact tool according to the above aspect 12, wherein the guide groove is provided to extend forward from a rear end of the rear outer cylindrical portion.

14. The impact tool according to the above aspect 12 or 13, wherein a plurality of the guide grooves are provided at intervals around a rotation axis of the hammer.

15. The impact tool according to the above aspect 14, wherein a plurality of the cam slides are provided at intervals around a rotation axis of the cam ring, and one cam slide is disposed in one guide groove.

16. The impact tool according to the above aspect 3, further comprising:

an elastic member disposed between a front surface of the cam ring and a support surface of the hammer disposed forward of the cam ring in the axial direction, wherein the elastic member generates an elastic force for moving the cam ring rearward.

17. The impact tool according to the above aspect 16, wherein the tool holding shaft includes:

a tool holder that holds a tool accessary;

an anvil portion disposed rearward of the tool holder;

a recess recessed forward from a rear end surface of the anvil portion; and an anvil hole which penetrates an outer circumferential surface of the anvil portion and an inner circumferential surface of the anvil portion and in which the movable anvil is disposed, the spindle includes a spindle projection protruding radially outward from a front end of an outer circumferential surface of the spindle, a front end of the spindle including the spindle projection is disposed in the recess, the movable anvil changes from the second state to the first state while being guided by the anvil hole, when the spindle projection and the movable anvil come into contact with each other in the rotation of the spindle, the hammer includes:

an inner cylindrical portion supported by the spindle;

a front outer cylindrical portion disposed radially outside with respect to the inner cylindrical portion and disposed forward of the inner cylindrical portion; and a hammer projection protruding radially inward from an inner circumferential surface of the front outer cylindrical portion, and the hammer rotates around the spindle in the first state, and impacts the movable anvil with the hammer projection in the second state.

18. The impact tool according to the above aspect 17, wherein in a low load state in which a load applied to the tool holding shaft is low, the spindle projection and the movable anvil come into contact with each other, the movable anvil and the hammer projection come into contact with each other, and the tool holding shaft rotates together with the hammer and the spindle via the movable anvil by a rotational force of the motor.

19. The impact tool according to the above aspect 18, wherein in a high load state in which a load applied to the tool holding shaft is high, rotation of the spindle is continued in a state in which rotation of each of the tool holding shaft, the hammer, and the cam ring is stopped, the cam ring receives a force from the ball and moves forward against an elastic force of the elastic member, the spindle projection is moved away from the movable anvil, and the movable anvil moves radially inward to release a lock on the hammer set by the movable anvil.

20. The impact tool according to the above aspect 19, wherein after the lock on the hammer is released, the spindle projection comes into contact with the movable anvil, and the movable anvil moves radially outward, the cam ring rotates while moving rearward by an elastic force of the elastic member, and the hammer rotates by rotation of the cam ring, and impacts the movable anvil in a rotation direction by the hammer projection.

According to the technology disclosed in the present specification, the occurrence of vibration in the axial direction is suppressed in the impact tool.

Furthermore, according to the technology disclosed in the present specification, an increase in size of the impact tool is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impact tool comprising:

a motor;

a spindle that is rotated by a rotational force of the motor;

a tool holding shaft at least a part of which is disposed forward of the spindle;

a movable anvil that is movably supported by the tool holding shaft; and a hammer that is supported by the spindle and impacts the movable anvil in a rotation direction without being displaced in an axial direction, wherein the movable anvil moves only in a radial direction of the spindle.

2. The impact tool according to claim 1, wherein the movable anvil moves so as to change between a first state in which at least a part of the movable anvil protrudes radially outward from an outer circumferential surface of the tool holding shaft and a second state in which the movable anvil is positioned radially inside with respect to the outer circumferential surface of the tool holding shaft.

3. The impact tool according to claim 2, wherein the hammer impacts the movable anvil in the first state and rotates around the spindle in the second state.

4. The impact tool according to claim 2, wherein the tool holding shaft has a recess recessed forward from a rear end surface of the tool holding shaft, the spindle includes a spindle projection protruding radially outward from a front end of an outer circumferential surface of the spindle, a front end of the spindle including the spindle projection is disposed in the recess, and the movable anvil changes from the second state to the first state when the spindle projection and the movable anvil come into contact with each other in the rotation of the spindle.

5. The impact tool according to claim 4, wherein the tool holding shaft includes a tool holder that holds a tool accessory, and an anvil portion disposed rearward of the tool holder, the recess is formed so as to be recessed forward from a rear end surface of the anvil portion, and the movable anvil is movably supported by the anvil portion.

6. The impact tool according to claim 5, wherein the recess is defined by an inner circumferential surface of the anvil portion and a facing surface connected to a front end of the inner circumferential surface of the anvil portion.

7. The impact tool according to claim 6, wherein the anvil portion includes an anvil hole penetrating an outer circumferential surface of the anvil portion and the inner circumferential surface of the anvil portion, and the movable anvil moves in the radial direction while being guided by the anvil hole.

8. The impact tool according to claim 7, wherein the movable anvil has a columnar shape, and is disposed in the anvil hole such that a central axis of the movable anvil and a rotation axis of the tool holding shaft are parallel to each other.

9. The impact tool according to claim 6, further comprising a support ball supported by the front end of the spindle, wherein the support ball is in contact with the facing surface.

10. The impact tool according to claim 9, wherein a support recess having a hemispherical shape is provided on a front end surface of the spindle, and the support ball is disposed in the support recess.

11. The impact tool according to claim 9, wherein the facing surface is a flat surface.

12. The impact tool according to claim 2, wherein the tool holding shaft includes:

a tool holder that holds a tool accessory;

an anvil portion disposed rearward of the tool holder;

a recess recessed forward from a rear end surface of the anvil portion; and an anvil hole which penetrates an outer circumferential surface of the anvil portion and an inner circumferential surface of the anvil portion and in which the movable anvil is disposed, the spindle includes a spindle projection protruding radially outward from a front end of an outer circumferential surface of the spindle, a front end of the spindle including the spindle projection is disposed in the recess, the movable anvil changes from the second state to the first state while being guided by the anvil hole, when the spindle projection and the movable anvil come into contact with each other in the rotation of the spindle, the hammer includes:

an inner cylindrical portion supported by the spindle;

a front outer cylindrical portion disposed radially outside with respect to the inner cylindrical portion and disposed forward of the inner cylindrical portion; and a hammer projection protruding radially inward from an inner circumferential surface of the front outer cylindrical portion, and the hammer rotates around the spindle in the first state, and impacts the movable anvil with the hammer projection in the second state.

13. The impact tool according to claim 12, wherein in a low load state in which a load applied to the tool holding shaft is low, the spindle projection and the movable anvil come into contact with each other, the movable anvil and the hammer projection come into contact with each other, and the tool holding shaft rotates together with the hammer and the spindle via the movable anvil by a rotational force of the motor.

14. The impact tool according to claim 13, wherein in a high load state in which a load applied to the tool holding shaft is high, rotation of the spindle is continued in a state in which rotation of each of the tool holding shaft and the hammer is stopped, the spindle projection is moved away from the movable anvil, and the movable anvil moves radially inward to release a lock on the hammer set by the movable anvil.

15. The impact tool according to claim 14, wherein after the lock on the hammer is released, the spindle projection comes into contact with the movable anvil, the movable anvil moves radially outward, and the hammer projection impacts the movable anvil.

16. The impact tool according to claim 12, wherein two movable anvils are provided, two spindle projections are provided, two hammer projections are provided, and the hammer projections impact the movable anvils twice while the spindle rotates once.

17. An impact tool comprising:

a motor;

a spindle that is rotated by a rotational force of the motor;

a tool holding shaft at least a part of which is disposed forward of the spindle;

a movable anvil that is movably supported by the tool holding shaft;

a hammer that is supported by the spindle and impacts the movable anvil in a rotation direction without being displaced in an axial direction; and a rotation ball disposed between the spindle and the hammer.

18. The impact tool according to claim 17, wherein a plurality of the rotation balls are disposed around a rotation axis of the spindle.

19. The impact tool according to claim 17, wherein the hammer includes:

an inner cylindrical portion having a ball groove in which the rotation ball is disposed;

a front outer cylindrical portion disposed radially outside with respect to the inner cylindrical portion and disposed forward of the inner cylindrical portion; and a hammer projection protruding radially inward from an inner circumferential surface of the front outer cylindrical portion, and the movable anvil is impacted by the hammer projection.

* * * * *